(12) United States Patent
Abe et al.

(10) Patent No.: US 7,607,690 B2
(45) Date of Patent: Oct. 27, 2009

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 352 days.

(21) Appl. No.: 11/507,569

(22) Filed: Aug. 22, 2006

(65) Prior Publication Data

US 2007/0045997 A1    Mar. 1, 2007

(30) Foreign Application Priority Data

| Aug. 24, 2005 | (JP) | ............................. 2005-242897 |
| Sep. 29, 2005 | (JP) | ............................. 2005-284683 |
| Nov. 30, 2005 | (JP) | ............................. 2005-346313 |
| Jan. 20, 2006 | (JP) | ............................. 2006-012804 |
| Aug. 2, 2006  | (JP) | ............................. 2006-211108 |

(51) Int. Cl.
    B60R 21/239 (2006.01)
(52) U.S. Cl. ................................... 280/739
(58) Field of Classification Search .............. 280/739
    See application file for complete search history.

(56) References Cited

U.S. PATENT DOCUMENTS

| 5,016,913 | A  | * | 5/1991  | Nakajima et al. ........... 280/738 |
| 5,246,250 | A  | * | 9/1993  | Wolanin et al. ............. 280/739 |
| 5,492,363 | A  | * | 2/1996  | Hartmeyer et al. .......... 280/739 |
| 6,183,003 | B1 | * | 2/2001  | Matsuhashi et al. ...... 280/728.2 |
| 6,648,371 | B2 | * | 11/2003 | Vendely et al. ............. 280/739 |
| 6,773,030 | B2 | * | 8/2004  | Fischer ....................... 280/739 |
| 6,932,385 | B2 | * | 8/2005  | Hawthorn et al. .......... 280/739 |
| 7,083,192 | B2 | * | 8/2006  | Fischer et al. .............. 280/739 |
| 7,152,875 | B2 | * | 12/2006 | Kai ............................. 280/739 |
| 7,261,319 | B2 | * | 8/2007  | DePottey et al. ........... 280/739 |
| 7,377,546 | B2 | * | 5/2008  | Fischer et al. .............. 280/739 |
| 7,448,646 | B2 | * | 11/2008 | Hall et al. ................... 280/739 |
| 7,458,607 | B2 | * | 12/2008 | Abe ........................... 280/739 |
| 2004/0012179 | A1 |  | 1/2004 | Pinsenschaum et al. |
| 2004/0017069 | A1 |  | 1/2004 | Fischer |
| 2004/0051282 | A1 |  | 3/2004 | Okamoto et al. |
| 2004/0051286 | A1 |  | 3/2004 | Fischer et al. |
| 2004/0145162 | A1 |  | 7/2004 | Abe et al. |
| 2005/0116455 | A1 |  | 6/2005 | Abe et al. |
| 2006/0071461 | A1 |  | 4/2006 | Williams et al. |

(Continued)

FOREIGN PATENT DOCUMENTS

EP        297 20 461 U1    4/1998

(Continued)

*Primary Examiner*—Paul N Dickson
*Assistant Examiner*—Nicole Verley
(74) *Attorney, Agent, or Firm*—Manabu Kanesaka

(57) ABSTRACT

An airbag and an airbag apparatus includes a vent hole operable to close or open to a small extent until a passenger crashes into the airbag, and open or close to a large extent when the passenger crashes into the airbag. An interior of an airbag is partitioned into a first chamber at a center and a second chamber which surrounds the first chamber by an inner panel. A rear panel includes a vent hole for communicating the second chamber and the outside of the airbag. A lid member configured to cover the vent hole may be disposed on an outer surface of the rear panel. A tether may connect the lid member to the inner panel through the vent hole.

13 Claims, 45 Drawing Sheets

U.S. PATENT DOCUMENTS

2006/0071462 A1  4/2006  Smith et al.

FOREIGN PATENT DOCUMENTS

| | | |
|---|---|---|
| EP | 1 318 052 A1 | 6/2003 |
| EP | 1 442 944 A1 | 8/2004 |
| FR | 2 757 465 | 6/1998 |
| JP | H06-127330 | 5/1994 |
| JP | 2000-16228 | 1/2000 |
| JP | 2000-43674 | 2/2000 |
| JP | 2001-277991 | 10/2001 |

* cited by examiner

AIRBAG AND AIRBAG APPARATUS

BACKGROUND OF THE INVENTION

The present invention relates to an airbag apparatus. More specifically, the present invention relates to an airbag including a vent hole for absorbing an impact and a constraining device for constraining discharge of gas from the vent hole.

A technique to provide a vent hole in an airbag for allowing gas to discharge from the inside of the airbag via the vent hole to absorb an impact applied to a passenger or the like of a vehicle when the passenger of the vehicle or the like crashes into the inflated airbag is known to those in the field of airbag apparatus.

Japanese Unexamined Patent Application Publication No. 2000-16228 discloses an airbag in which the vent hole is covered by the a lid member until the gas pressure in the interior of the airbag reaches a predetermined pressure and, when the pressure exceeds the predetermined pressure, the lid member is pushed and opened by the gas pressure thereby opening the vent hole.

In the same document, an airbag for a driver's seat for a vehicle is exemplified. The airbag in the same document is formed by stitching two circular sheet members (panels) together along the peripheries thereof, which defines a single chamber. A vent hole is provided on a sheet member on the side opposite from the vehicle passenger side of the airbag, and a lid member is provided so as to cover the vent hole.

In the airbag of the same document, when the airbag is inflated, the vent hole is covered by the lid member and the gas is constrained from being discharged from the vent hole until the gas pressure in the interior of the airbag reaches the predetermined gas pressure, the pressure in the interior of the airbag is quickly increased to a high pressure, and hence the airbag is quickly deployed.

When the gas pressure in the interior of the airbag exceeds the predetermined pressure, the lid member is pushed and opened and the vent hole is opened. Therefore, in a case in which the vehicle passenger crashes into the inflated airbag, gas is flowed out from the interior of the airbag via the vent hole, and an impact applied to the vehicle passenger is absorbed.

In the 2000-16228 publication, when the pressure in the interior of the airbag is increased to a high level equal to or higher than the predetermined pressure, there may be a case in which the vent hole is opened, even in a stage before the passenger crashes into the airbag. In such circumstances, gas is needlessly discharged from the vent hole and may be detrimental to the purpose of protecting the passenger.

Accordingly, an object of the present invention is to provide an airbag and an airbag apparatus in which a vent hole is maintained in a closed or a slightly opened state until a passenger crashes into the airbag and the vent hole is opened or brought into a largely opened state when the passenger crashes into the airbag.

SUMMARY OF THE INVENTION

An airbag according to the present invention includes a vent hole and a constraining device for constraining discharge of gas from the vent hole. The vent hole is provided in a surface of the airbag on the opposite side from a passenger-facing surface or in a side surface of the airbag. The constraining device includes a lid member arranged outside the airbag for covering the vent hole and a joint member which passes through the vent hole and the interior of the airbag for connecting the lid member and the passenger-facing surface. The vent hole is closed or opened to a small extent by the lid member which is pulled toward the interior of the airbag via the joint member and is superimposed on the vent hole when the airbag is inflated, and the vent hole is opened or opened to a large extent by the lid member which is moved apart from the vent hole when the passenger comes into contact with the inflated airbag thereby moving the passenger-facing surface backward.

According to another aspect, the vent hole is formed into a slit shape. In the airbag, the joint member may be connected at one end to the lid member and at the other end to the passenger-facing surface. In this case, the lid member and the passenger-facing surface can be connected easily irrespective of the position of the vent hole.

Further, the airbag may include an internal member connecting the passenger-facing surface of the airbag and the surface on the opposite side, wherein the joint member is connected to the internal member.

In addition, one aspect of the airbag may include the internal member comprising an inner panel configured to partition the interior of the airbag into a first chamber at a center and a second chamber surrounding the first chamber. The inner panel may be formed with a communicating section for communicating the first and the second chambers. In addition, the airbag may be adapted in such a manner that the first chamber is inflated first by gas introduced into the first chamber and then the second chamber is inflated by the gas flowing from the first chamber to the second chamber via the communicating section. The vent hole may be operable to communicate the second chamber and the outside of the airbag.

Another aspect may include the internal member comprising a suspension belt connected at one end to the passenger-facing surface of the airbag and at the other end to the surface on the opposite side of the passenger-facing surface.

Furthermore, another aspect may include the internal member being configured to extend across the interior of the airbag and connect the side portions of the airbag when the airbag is inflated and the joint member is connected to the internal member.

Another aspect of the airbag may comprise the joint member and the internal member being integrally connected.

Furthermore, a run-through member of the joint member may be provided on the internal member, wherein the joint member is connected at one end to the lid member and at the other end to the surface on the opposite side from the passenger-facing surface of the airbag. A longitudinally midsection of the joint member may be inserted into the run-through member.

In another aspect, the run-through member for the joint member is provided on the lid member, the joint member is connected to the internal member at both ends, and the longitudinally midsection of the joint member is inserted into the run-through member.

Furthermore, in another aspect, the joint member is connected at one end to the lid member, and at the other end to the passenger-facing surface.

Another aspect may include the run-through member for the joint member being disposed on the inner surface of the passenger-facing surface of the airbag. Further, the joint member may be connected at one end to the lid member and the longitudinally midsection of the joint member may be inserted through the run-through member.

According to another aspect, a plurality of the passenger-side run-through members is provided at positions different from each other on the passenger-facing surface as the run-through member. In addition, non-passenger-side run-through members are provided on the surface on the opposite side from the passenger-facing surface. Furthermore, the midsection of the joint member is inserted into the passenger-side run-through members and the non-passenger-side run-through members alternately.

A further aspect of the airbag may include the lid member not connected to the airbag on the side opposite from the passenger, and at least the passenger-side of the lid member is connected to a periphery of the vent hole of the airbag.

According to another aspect, one end of the joint member is split into plurality of branches, the respective branches being connected to the lid member, and the connected positions of the respective branched portions are different from each other.

A further aspect of the airbag may include the joint member and the lid member being integrally configured.

Furthermore in another aspect, an auxiliary lid member covers the vent hole when the vent hole is closed by the lid member and releases the vent hole when the lid member, closing of the vent hole, is released.

Another aspect of the airbag may include a plurality of vent holes, the plurality of vent holes being covered by a common lid member, wherein the joint member is connected to the lid member via at least one of the vent holes.

Another aspect of the airbag may include at least a portion of the peripheral edge of the lid member not being connected to the airbag. In addition, a remaining portion of the peripheral edge may be connected to the airbag so as to surround the plurality of vent holes. The joint member may be connected to the lid member via a vent hole located at a position closest to the portion of the peripheral edge of the lid member that is not connected to the airbag.

Furthermore, a constantly opened vent hole may be provided that constantly communicates the inside and the outside of the airbag.

In the invention, the lid member may be connected to the airbag at least at one end and is not connected to the airbag at the other end, and the joint member may be connected to the lid member at least via the vent hole located at a position closest to the other end of the lid member. In this case, it is preferable to connect the joint member to the lid member at least via the vent hole which is located at the position closest to the other end of the lid member.

In this configuration, since the other end of the lid member is pulled inwardly of the airbag by the joint member when the airbag is inflated, the lid member is brought into tight contact with the outer surface of the airbag over a wide range from the one end to the other end thereof. Therefore, preferable closability of the lid member with respect to the respective vent holes is achieved without joining the lid member and the passenger-facing surface by passing the joint members through all the vent holes.

In addition, another aspect of an airbag may include a gas generator operable to supply gas to the airbag.

In the airbag and the airbag apparatus according to the present invention, when the airbag is inflated, in a stage before the passenger crashes into the airbag, the lid member is pulled toward the interior of the airbag via the joint member and hence is superimposed on the vent hole, whereby the vent hole is closed or brought into a slightly opened state. Therefore, discharge of gas from the vent hole is constrained and the airbag is quickly inflated.

When the passenger crashes into the inflated airbag, the passenger-facing surface of the airbag is pressed by the passenger and hence is moved backward, so that a force to pull the lid member inwardly of the airbag is released. Accordingly, the lid member is moved apart from the vent hole and hence the vent hole is opened or brought into a largely opened state, and the gas is discharged toward the outside of the airbag through the vent hole, so that an impact to be applied to the passenger is absorbed.

It may be preferable that the vent hole is formed into a slit shape. By forming the vent hole into the slit shape, an effect of constraining or preventing gas leakage from the vent hole when the vent hole is covered by the lid member may be improved.

In one aspect, the joint member connects the lid member and the passenger-facing surface directly. In another aspect, the joint member may connect the lid member and the passenger-facing surface indirectly.

In one aspect, the interior member, which connects the passenger-facing surface and the opposite side thereof of the airbag in the inflated state, is disposed in the interior of the airbag and the joint member is connected to the internal member. In this configuration, the internal member is deployed toward the passenger and the lid member is pulled by the internal member inwardly of the airbag via the joint member, thereby being superimposed on the vent hole in association with inflation of the airbag. Then, when the airbag receives the passenger, the passenger-facing surface is moved backward and the internal member is loosened. Because the force operable to pull the lid member inwardly of the airbag is released the lid member is moved apart from the vent hole.

In one aspect, gas is introduced into the first chamber located at the center of the airbag. Accordingly, the first chamber, surrounded by an inner panel that serves as an internal member, is inflated, the inner panel being deployed toward the passenger.

Because the first chamber is small in capacity in comparison with the entire airbag and because the first chamber is not communicated to the vent hole directly, the first chamber is inflated very quickly such that the lid member is pulled inwards of the airbag by the inner panel via the joint member, the lit member being superimposed on the vent hole in the early stage of the airbag deployment such that the vent hole is closed or opened to a small extent. Consequently, discharge of the gas in the second chamber outside the airbag via the vent hole is constrained, and the internal pressure of the second chamber is quickly increased to a high pressure, so that earlier inflation and deployment of the entire airbag is ensured.

In one aspect, because the internal member is a suspension belt that connects the passenger-facing surface of the airbag and the opposite side thereof, the configuration may be simplified.

Furthermore, because the internal member is disposed so as to extend across the interior of the airbag and connect the side portions of the airbag, the vent hole may be flexibly arranged.

Furthermore, because the internal member and the joint member are formed integrally, sewing is not necessary and hence manufacture of the airbag is facilitated.

According to the present invention, crushing of the airbag (backward movement of the passenger-facing surface) can be sensed over a relatively large area of the passenger-facing surface. For example, even when the passenger crashes into the airbag at a position shifted from the center of the passenger-facing surface and a portion of the passenger-facing surface on the relatively outer peripheral side is moved backwards, the internal member being extended across the interior of the airbag and connecting the side portions of the airbag may move backward in association with the backward movement of the passenger-facing surface, whereby the force operating to pull the lid member inwardly of the airbag opens the vent hole.

According to one aspect, even when the amount of backward movement of the passenger-facing surface is small, and hence the amount of loosening of the internal member is small, the amount of movement of the lid member apart from the vent hole can be increased.

Furthermore, since the midsection of the joint member is slidably connected to the lid member via the run-through member, an application of an excessive force to the connected portion between the joint member and the lid member can be prevented or constrained.

In addition, the lid member and the passenger-facing surface can be connected easily irrespective of the position of the vent hole.

Additionally, even when the amount of backward movement of the passenger-facing surface is small, the amount of movement of the lid member apart from the vent hole can be increased.

According to another aspect, because the run-through members are provided respectively at positions different from each other on the passenger-facing surface, the lid member can be moved apart from the vent hole even when the passenger-facing surface is partly moved backward.

According to another aspect, gas discharged through the vent hole flows toward the opposite side from the passenger.

The present invention allows a wide range of the amount of lid member material that may be pulled in order to bring the lid member into a tight contact with the vent hole when the airbag is inflated.

In the present invention, the joint member and the lid member may be configured integrally. This configuration enables simplification of the manufacturing process of the respective component and the sewing operation of the entire airbag.

Furthermore, when, by operation of the lid member, the vent hole is in a closed state, the auxiliary lid member may also cover the vent hole, thereby achieving a desired closability of the vent hole.

When the lid member closing of the vent hole by is released, the auxiliary lid member opens the vent hole. Accordingly, gas in the airbag is discharged from the vent hole.

In some aspects, because multiple vent holes may be covered by a single lid member, fewer lid covers may be required. Accordingly, simplification of the airbag sewing operation and cost reduction of the members can be achieved.

In this case, it is preferable that at least a part of the peripheral edge of the lid member is not connected to the airbag and a remaining portion thereof is connected to the airbag so as to surround the plurality of vent holes, the joint member is connected to the lid member via a vent hole located at a position closest to the portion of the peripheral edge of the lid member which is not connected to the airbag member.

In this configuration, since the portion of the lid member near the opening is pulled by the joint member and hence is brought into tight contact with the outer surface of the airbag when the airbag is inflated, preferable closability of the lid member with respect to the opening is achieved.

In the present invention, it is also possible to provide the constantly opened vent hole for constantly communicating the inside and the outside of the airbag in addition to the vent hole with the lid member. In the airbag provided with the constantly-opened vent hole, gas is discharged toward the outside of the airbag mainly through the constantly-opened vent hole even in the state in which the airbag is inflated. When the passenger pushes and crushes the airbag, and causes a change in thickness of the airbag, the vent hole with the lid member is also brought into an opened sate. Therefore, the gas is discharged quickly from both of the opened vent hole with the lid member and the constantly-opened vent hole.

DETAILED DESCRIPTION OF PREFERRED EMBODIMENTS

Figure 1:
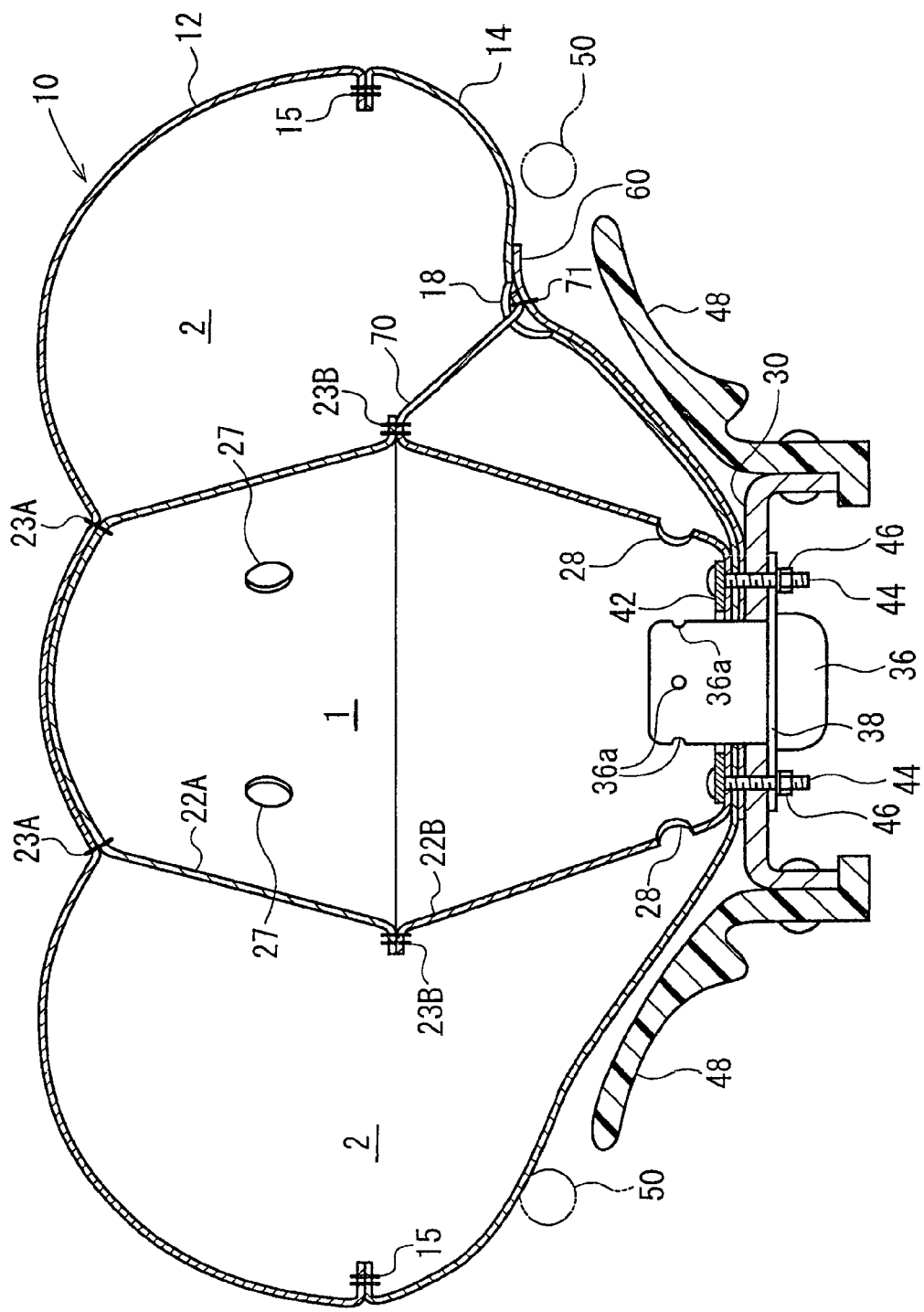
FIG. 1 is a cross-sectional view of an airbag and an airbag apparatus according to an embodiment.
Figure 2:
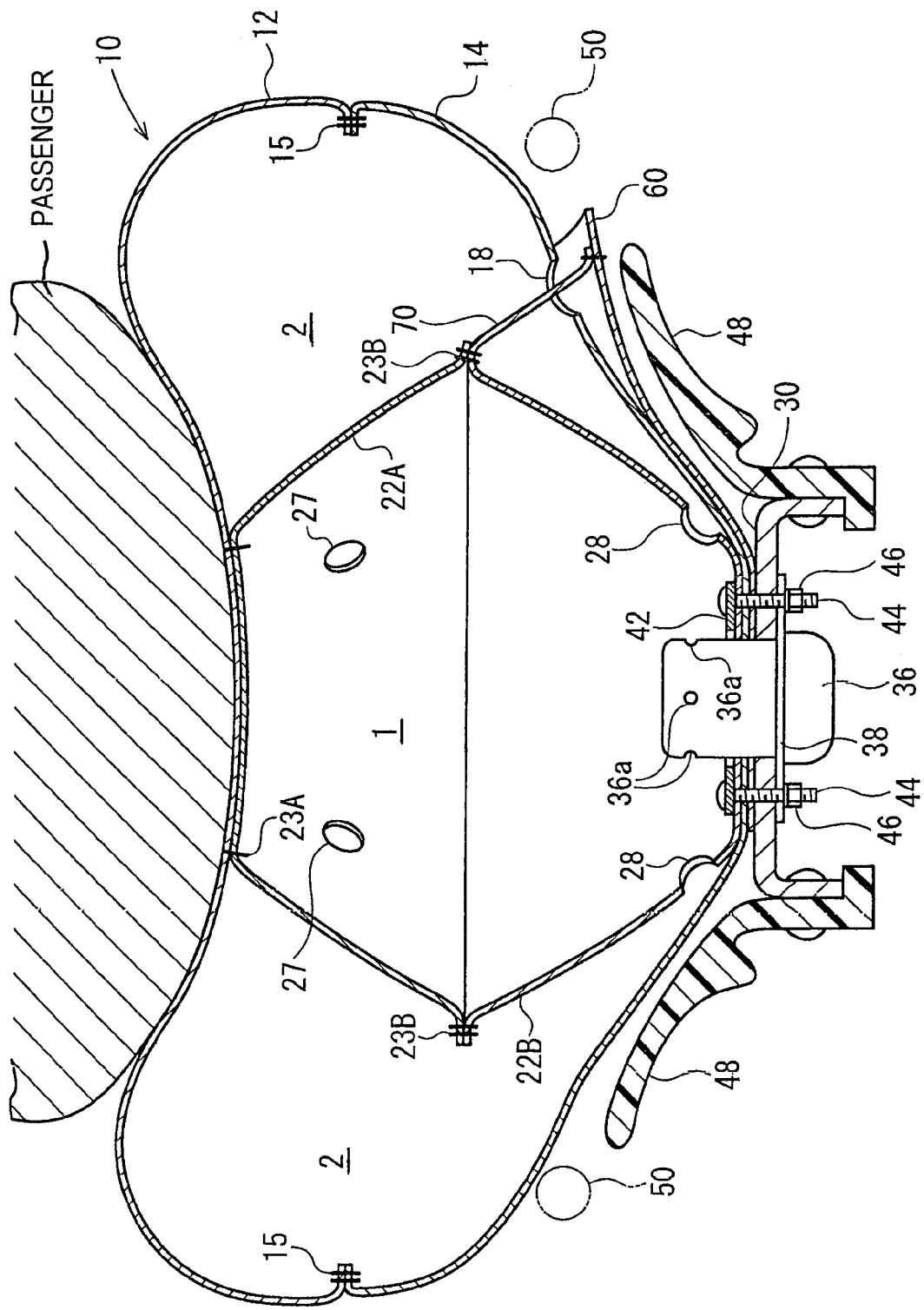
FIG. 2 is a cross-sectional view of the airbag and the airbag apparatus shown in FIG. 1 when a passenger is received.
Figure 3:
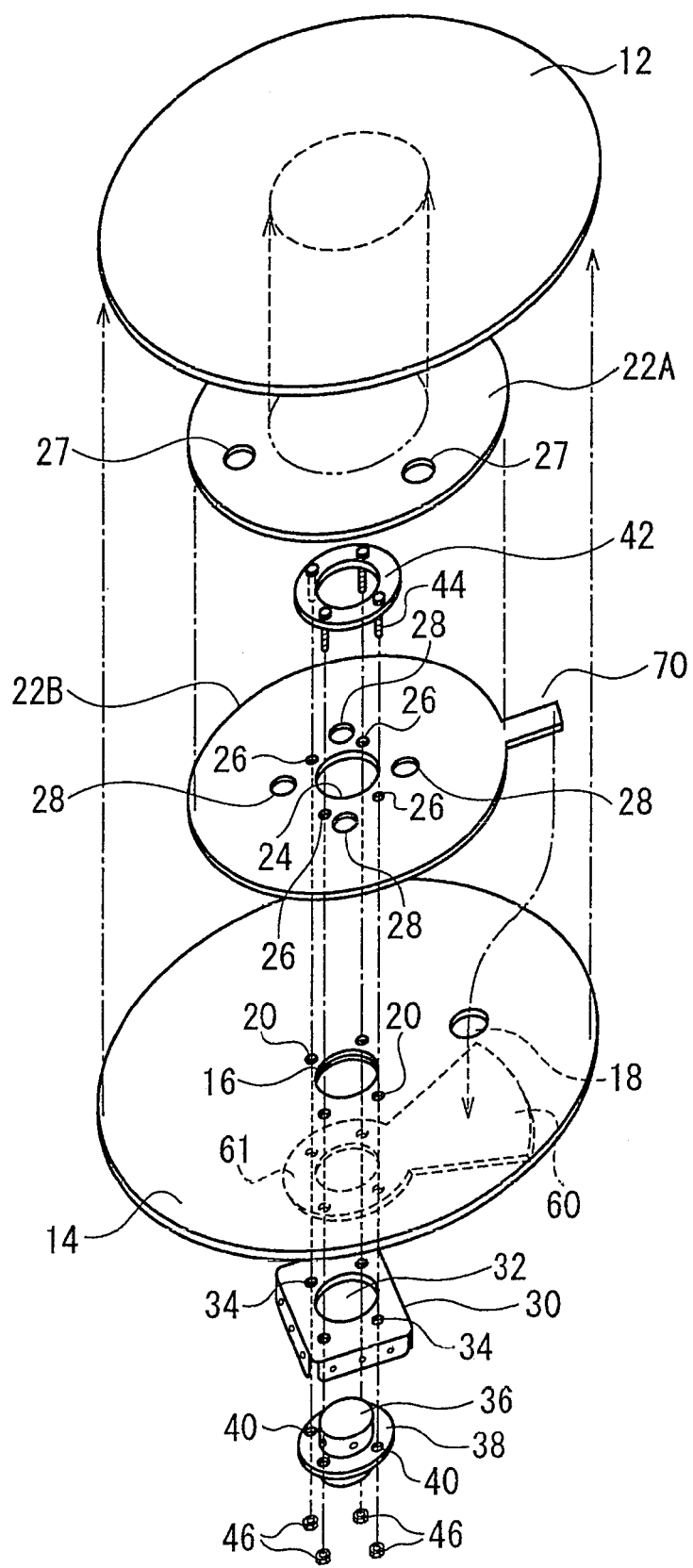
FIG. 3 is an exploded perspective view of the airbag and the airbag apparatus shown in FIG. 1.
Figure 4:
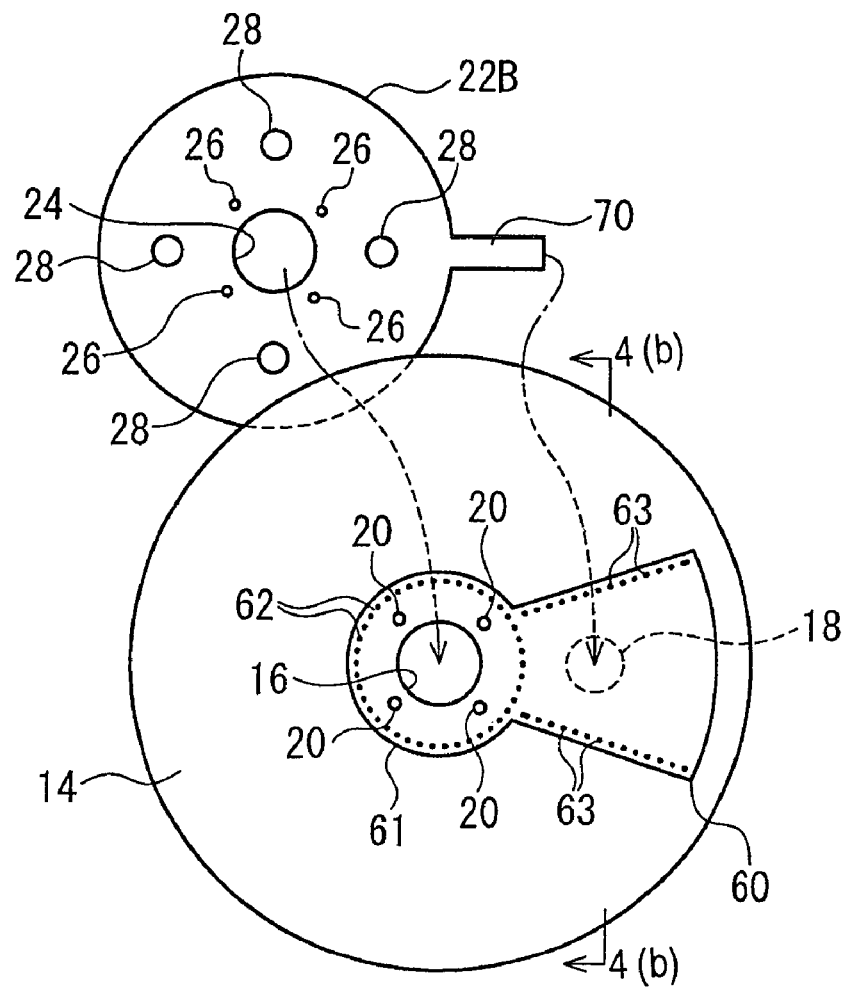
FIG. 4(a) shows a plan view of a rear panel of the airbag shown in FIG. 1.
FIG. 4(b) shows a cross-sectional view of a rear panel-of the airbag taken along line 4(b)-4(b) in FIG. 4(a).
Figure 4:
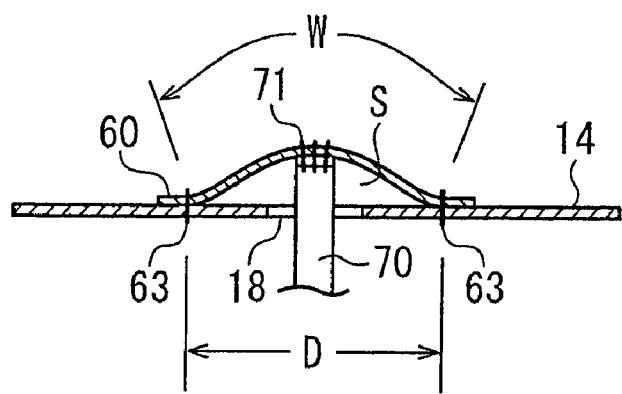

Referring now to the drawings, FIGS. 1 and 2 are cross-sectional views of an airbag and an airbag apparatus according to an embodiment. FIG. 3 is an exploded perspective view of the airbag and the airbag apparatus. FIG. 4(a) is a plan view (exploded view) of a rear panel and a second inner panel of the airbag. FIG. 4(b) is a cross-sectional view taken along the line 4(b)-4(b) in FIG. 4(a). FIG. 1 shows a state before a passenger crashes into the airbag, and FIG. 2 shows a state after the passenger has crashed into the airbag.

In this embodiment, an airbag 10 is an airbag for a driver's seat of a vehicle.

The airbag 10 includes a front panel 12 which constitutes a passenger-facing surface, a rear panel 14 which constitutes an outer surface on the side opposite from the passenger-facing surface, first and second inner panels 22A, 22B as internal member for partitioning the interior of the airbag 10 into a first chamber 1 and a second chamber 2, a vent hole 18 for communicating the second chamber 2 and the outside of the airbag 10, a lid member 60 for constraining discharge of gas from the vent hole 18, a tether 70 as joining member for connecting the lid member 60 to the inner panel 22B.

The front panel 12, the rear panel 14, the first and second inner panels 22A, 22B are each formed of a circular woven cloth. The front panel 12 and the rear panel 14 have substantially the same diameter, and are formed into a bag shape by being stitched together along the outer peripheries thereof via a seam 15. The seam 15 extends along the outer peripheries of the front panel 12 and the rear panel 14 in an annular shape. The seam 15 is formed of a sewing thread or the like, but is not limited thereto.

The rear panel 14 is formed with an opening 16 for an inflator (gas generator) and the vent hole 18. The opening 16 is arranged at a center of the rear panel 14. A patch cloth 61 formed of an annular woven cloth is attached to the peripheral edge of the opening 16 from the outside of the airbag 10. Reference numeral 62 (FIG. 4(a)) designates a seam stitching the patch cloth 61 and the rear panel 14. The seam 62 extends into an annular shape along the outer periphery of the patch cloth 61. Bolt insertion holes 20 are disposed around the opening 16 so as to penetrate through the patch cloth 61 and the rear panel 14. The vent hole 18 is arranged between the outer periphery of the patch cloth 61 and the outer peripheral edge (seam 15) of the rear panel 14.

The lid member 60 is superimposed on the vent hole 18 from the outside of the airbag 10. In this embodiment, the lid member 60 is provided integrally with the patch cloth 61, and extends from the outer peripheral edge of the patch cloth 61 toward the outer peripheral side of the rear panel 14 in a tongue shape.

As shown in FIG. 4(a), a pair of side edge portions of the periphery of the lid member 60 extend from the outer peripheral edge of the patch cloth 61 toward the outer peripheral side of the rear panel 14. The pair of side edge portions is connected to the rear panel 14 respectively via the seams 63. The respective seams 63 are joined to the seam 62 at the center side of the rear panel 14. The side edge portion on the distal end side (the outer peripheral side of the rear panel 14) of the lid member 60 is not connected to the rear panel 14. The vent hole 18 is positioned between the seams 63.

As shown in FIG. 4(b), a distance D between a stitched position of one of the side edge portions of the lid member 60 with respect to the rear panel 14 and a stitched position of the other side edge portion with respect to the rear panel 14 in a state in which the rear panel 14 is extended flatly (the distance between the seams 63) is narrower than a distance W between the both side edges of the lid member 60 in a state of being extended flatly (that is, the width of the lid member 60). Therefore, even when the rear panel 14 is extended flatly, the lid member 60 still remains sagged portion as shown in the drawing. When the lid member 60 is not pulled toward the inside of the airbag 10 by the tether 70, a space S is formed between the lid member 60 and the rear panel 14.

However, the configuration of the lid member 60 and the connecting structure with respect to the rear panel 14 is not limited thereto. For example, the lid member 60 may be provided separately from the patch cloth 61.

The first inner panel 22A and the second inner panel 22B are provided inside the airbag 10. The first and second inner panels 22A, 22B are arranged substantially concentrically with the front panel 12 and the rear panel 14, and the outer peripheral edges thereof are stitched by a tear seam 23B as a first connecting means. The interior of the airbag 10 is partitioned into a first chamber 1 at the center and a second chamber 2 which surrounds the first chamber 1 by the first and the second inner panels 22A, 22B. The first chamber 1 is located inside the inner panels 22A, 22B.

The center portion of the first inner panel 22A on the front panel 12 side (a portion at the distal end side of the inner panel 22A in a state in which the airbag 10 is inflated) is connected to the center portion of the front panel 12 by the seam 23A.

An opening 24 for an inflator, which is arranged substantially concentric with the opening 16 for the inflator of the rear panel 14 is provided at a center of the second inner panel 22B on the rear panel 14 side (the portion on the rear end side of the second inner panel 22B in a state in which the airbag 10 is inflated). Bolt insertion holes 26 which are superimposed on the bolt insertion holes 20 of the rear panel 14 around the opening 24 of the inner panel 22B.

Referring back to FIG. 3, the first and second inner panels 22A, 22B are provided with communication ports 27, 28 as communication portion for communicating the first chamber 1 and the second chamber 2. In this embodiment, the communication port 28 of the second inner panel 22B is provided in the relatively vicinity of the opening 24 for an inflator 36 arranged in the first chamber 1 via the openings 16, 24. The communication port 28 is arranged on a line extending from the inflator 36 in a direction of gas injection from the inflator 36, that is, so as to oppose the gas injection port 36a of the inflator 36. However, arrangement of the communication ports 27, 28 are not limited thereto.

A reinforcing patch or the like can be mounted to peripheral edges of the openings 16, 24, the communication ports 27, 28, or the vent hole 18.

In this embodiment, the second inner panel 22B and the lid member 60 are connected by the tether 70 as the connecting member. In this embodiment, the tether 70 is provided integrally with the second inner panel 22B and one end thereof is continued to the outer peripheral edge of the second inner panel 22B. The other end of the tether 70 passes through the vent hole 18 and is stitched to a surface of the lid member 60 opposing the vent hole 18. Reference numeral 71 designates a seam stitching the tether 70 to the lid member 60.

However, the tether 70 may be provided integrally with the first inner panel 22A or the lid member 60, and may be provided separately from these members. The tether 70 may be connected to positions of the respective inner panels 22A, 22B other than the outer peripheral edges.

A retainer 30 for mounting the airbag 10 is provided with an inflator mounting port 32 at a center thereof and bolt insertion holes 34 around thereof.

The inflator 36 has a substantially cylindrical shape, and is provided with a gas injection port 36a on a side peripheral surface on the distal end side in the direction of cylinder axis. In this embodiment, four gas injection ports 36a are provided on the inflator 36 at regular intervals in the peripheral direction. The inflator 36 is adapted to inject gas from the gas injection ports 36a in the radial directions. A flange 38 for fixing the inflator is provided so as to project from a side peripheral surface of a midsection of the inflator 36 in the direction of cylinder axis (rear end side of the gas injection ports 36a). The flange 38 is formed with bolt insertion holes 40. The inflator 36 is fitted to the inflator mounting port 32 on the distal end side.

When mounting the airbag 10 to the retainer 30, a peripheral edge of the opening 24 for an inflator formed on the second inner panel 22B is aligned with the peripheral edge of the opening 16 for an inflator formed on the rear panel 14, and then aligned with the peripheral edge of the inflator mounting port 32 of the retainer 30. Then, the stud bolts 44 of the holding ring 42 are passed through the respective bolt insertion holes 26, 20, 34, 40 of the second inner panel 22B, the rear panel 14, the retainer 30 and the flange 38, and nuts 46 are tightened on the distal ends thereof, so that the second inner panel 22B, the rear panel 14, and the inflator 36 are fixed to the retainer 30.

Accordingly, the peripheral edge of the opening 24 for an inflator formed on the second inner panel 22B is connected to the peripheral edge of the opening 16 for an inflator formed on the rear panel 14, and the outer peripheral edges of the first and second inner panels 22A, 22B are connected to each other, whereby the center portion of the first inner panel 22A is connected to the front panel 12.

Then, the airbag 10 is folded and a module cover 48 is mounted to the retainer 30 so as to cover the folded body of the airbag 10 to configure an airbag apparatus. The airbag apparatus is installed in a steering wheel 50 of an automotive vehicle.

Upon collision of a vehicle on which the airbag apparatus configured as described above is mounted or the like, the inflator 36 is activated to inject gas in the airbag 10. The airbag 10 is inflated by the gas and pushes and opens the module cover 48, thereby being deployed in a cabin.

The airbag 10 is inflated first from the first chamber 1 by being supplied with the gas from the inflator 36 into the first chamber 1. At this time, the first and second inner panels 22A, 22B are deployed toward the passenger in association with the inflation of the first chamber 1, and the lid member 60 is pulled inwardly of the airbag 10 by the inner panels 22A, 22B via the tether 70, and is superimposed on the vent hole 18, and hence closes the vent hole 18. Subsequently, the gas is flowed from the first chamber 1 to the second chamber 2 via the communication ports 27, 28, and the second chamber 2 is inflated.

The airbag 10 is inflated very quickly since the first chamber 1 is small in capacity in comparison with the entire airbag 10 and is not communicated with the vent hole 18 directly. Therefore, the lid member 60 is pulled inwardly of the airbag in the early stage, and is superimposed on the vent hole 18, and hence the vent hole 18 is closed. Accordingly, the discharge of gas in the second chamber 2 is constrained from being discharged from the airbag via the vent hole 18, and hence the internal pressure of the second chamber 2 is also brought into a high pressure. Consequently, earlier inflation of the entire airbag 10 is ensured.

In this embodiment, because the communication port 28 which communicates the first chamber 1 and the second chamber 2 is arranged on an extension of the inflator 36 arranged in the first chamber 1 in the direction of gas injection, that is, so as to oppose the gas injection port 36a of the inflator 36 when the inflator 36 is operated, gas is injected from the gas injection port 36a toward the communication port 28. Therefore, the gas from the inflator 36 can easily pass through the communication port 28 and flow into the second chamber 2. Accordingly, further earlier inflation of the second chamber 2 is ensured.

Subsequently, when the passenger crashes into the inflated airbag 10, the front panel 12 of the airbag 10 is pressed by the passenger as shown in FIG. 2, and is moved backward toward the rear panel 14, so that the inner panels 22A, 22B are sagged, whereby a force to pull the lid member 60 inwardly of the airbag 10 is released. Accordingly, the lid member 60 is moved apart from the vent hole 18 by a gas pressure in the airbag 10, and the vent hole 18 is opened. Consequently, the gas is discharged from of the airbag 10 through the vent hole 18, and an impact to be applied to the passenger is absorbed.

Figure 5:
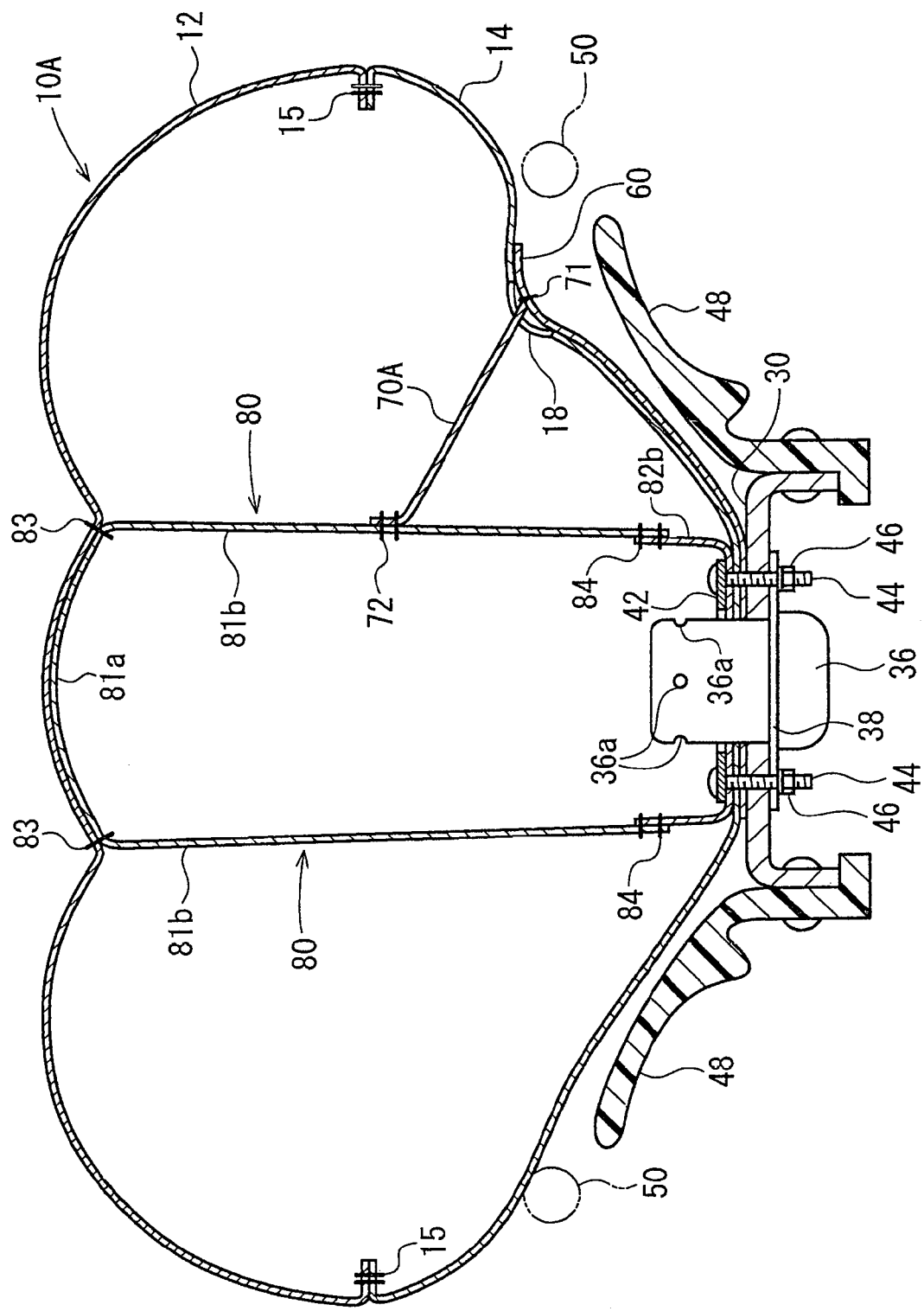
FIG. 5 is a cross-sectional view of the airbag and the airbag apparatus according to an embodiment.
Figure 6:
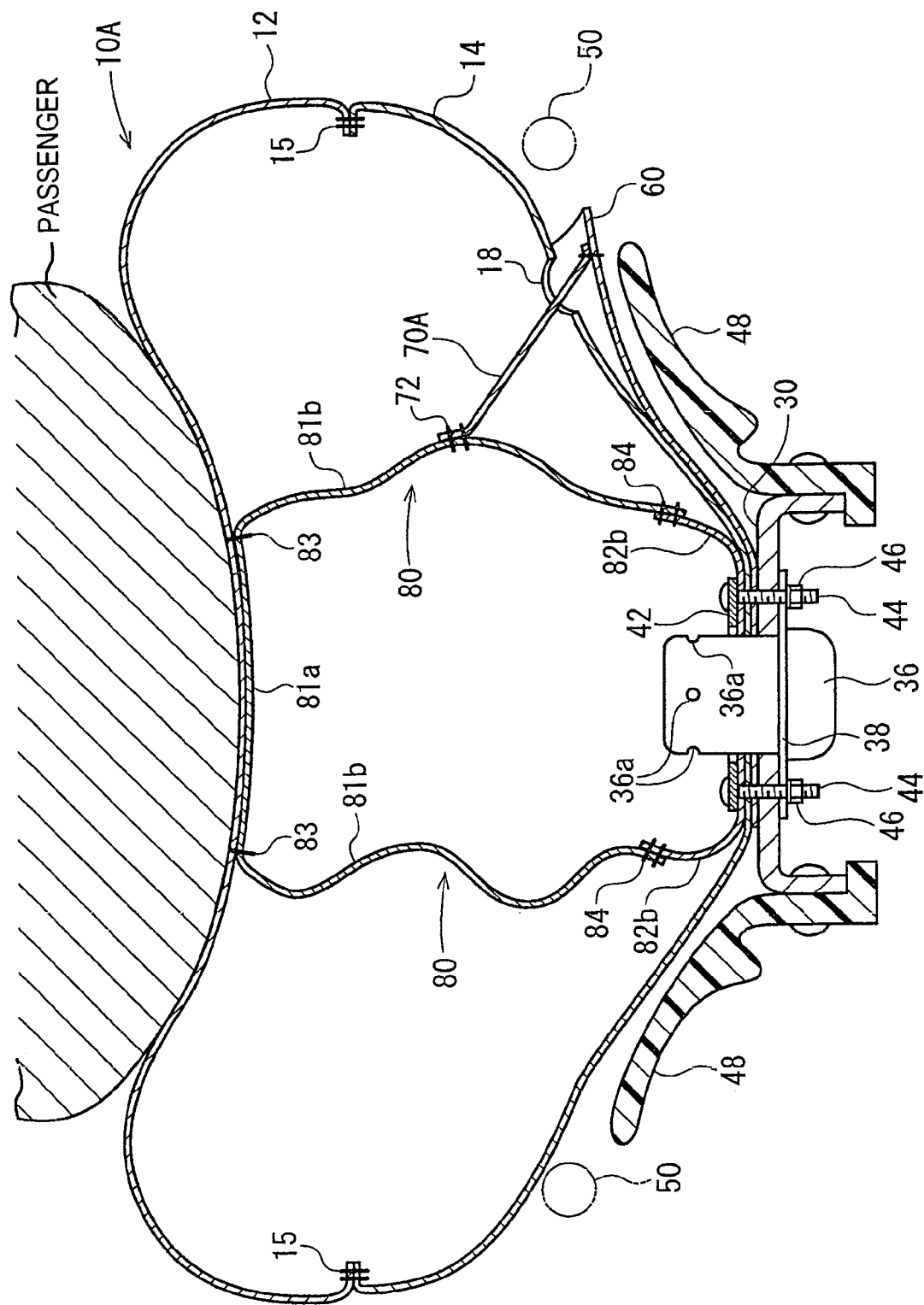
FIG. 6 is a cross-sectional view of the airbag and the airbag apparatus shown in FIG. 5 when the passenger is received.
Figure 7:
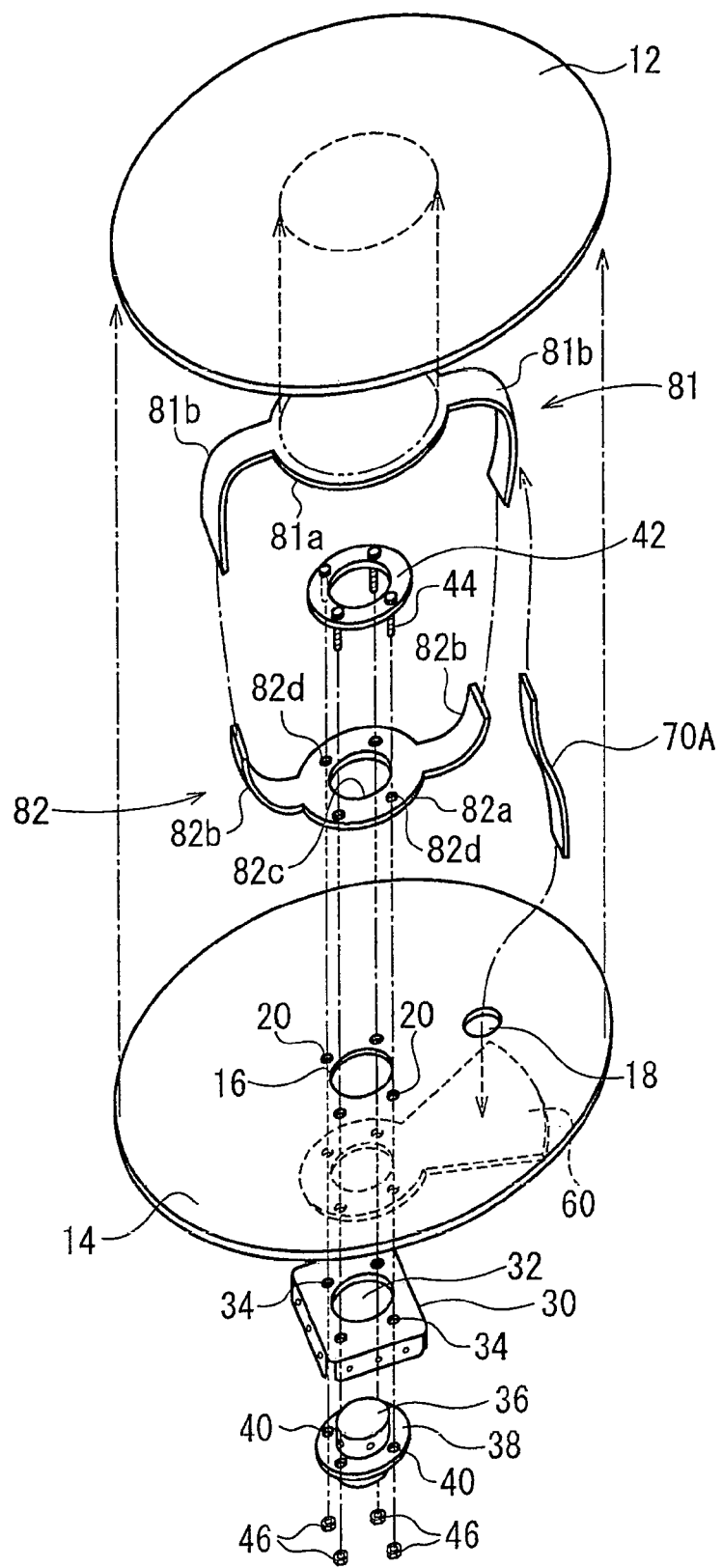
FIG. 7 is an exploded perspective view of the airbag and the airbag apparatus in FIG. 5.

FIG. 5 and FIG. 6 are cross-sectional views of an airbag and an airbag apparatus according to another embodiment, and FIG. 7 is an exploded perspective view of this airbag and the airbag apparatus. FIG. 5 shows a state before the passenger is crashed into the airbag, and FIG. 6 shows a state after the passenger is crashed into the airbag.

In this embodiment, an airbag 10A includes a front panel 12 which constitutes a passenger-facing surface, a rear panel 14 which constitutes an outer surface on the opposite side from the passenger-facing surface, a suspension belt 80 as an internal member for connecting the front panel 12 and the rear panel 14 in the interior of the airbag 10A, a vent hole 18 for communicating the outside and inside of the airbag 10A, a lid member 60 for constraining discharge of gas from the vent hole 18, and a tether 70A as a joining member for connecting the lid member 60 with the suspension belt 80.

In this embodiment, an outer shell of the bag-shaped airbag 10A is formed by stitching the front panel 12 and the rear panel 14 along the outer peripheral edges by the seam 15 and a suspension belt 80 is provided in the interior thereof. In this embodiment as well, the rear panel 14 is provided with an opening 16 for an inflator (gas generator), the vent hole 18, and bolt insertion holes 20 for fixing the rear panel 12 to the retainer 30. The lid member 60 is superimposed on the vent hole 18 from the outer side of the rear panel 14.

In this embodiment, the suspension belt 80 includes a first suspension belt member 81 on the side of the front panel 12 and a second suspension belt member 82 on the side of the rear panel 14.

The first suspension belt member 81 includes a base strip portion 81a arranged at a center of the front panel 12, and 2 string members 81b, 81b extending radially from the outer periphery of the base strip portion 81a. The base strip portion 81a is formed of a circular woven cloth smaller in diameter than the front panel 12, and the string members 81b, 81b are arranged in a positional relationship so as to be situated on the opposite side with respect to the center of the base strip portion 81a. The base strip portion 81a is arranged substantially concentrically with the front panel 12, and is stitched to the center of the front panel 12 by a seam 83.

The second suspension belt member 82, in this embodiment, includes a base strip 82a arranged at the center of the rear panel 14 and two string members 82b, 82b extending radially from the outer periphery of the base strip portion 82a. The base strip portion 82a is formed of a circular woven cloth smaller in diameter than the rear panel 14, and the string members 82b, 82b are arranged in a positional relationship so as to be situated on the opposite side with respect to the center of the base strip portion 82a. An opening 82c for an inflator which is superimposed with the opening 16 for an inflator of the rear panel 14 is provided at a center thereof. Bolt insertion holes 82d which are aligned with the bolt insertion holes 20 are provided around the opening 82c.

The distal portions of the respective string members 81b, 82b of the suspension belt members 81, 82 are stitched to each other by a seam 84.

In this embodiment, an end of the tether 70A is stitched to a midsection of a continuous member having the string members 81b, 82b (hereinafter the continuous member may be referred to as a suspension belt 80). Reference numeral 72 designates a seam which stitches one end side of the tether 70A to the suspension belt 80. The other end side of the tether 70A passes through the vent hole 18 and is stitched to the surface of the lid member 60 which opposes the vent hole 18. Reference numeral 71 designates a seam which connects the other end side of the tether 70A to the lid member 60.

When mounting the airbag 10A to the retainer 30, the peripheral edge of the opening 82c for an inflator formed on the base strip portion 82a is aligned with the peripheral edge of the opening 16 for an inflator of the rear panel 14 and then aligned with the peripheral edge of the inflator mounting port 32 of the retainer 30, respectively. Then, the stud bolts 44 of the holding ring 42 are passed through the respective bolt insertion holes 82d, 20, 34 and 40 of the base strip portion 82a, the rear panel 14, the retainer 30 and the flange 38, and the nuts 46 are tightened on the distal ends thereof, so that the base strip portion 82a, the rear panel 14 and the inflator 36 are fixed to the retainer 30.

Accordingly, the string member 82b is connected to the rear panel 14 via the base strip portion 82a, and the string members 82b, 81b are connected by the seam 84, and the string member 81b is connected to the front panel 12 via the base strip portion 81a.

The airbag 10A includes the suspension belt 80 instead of providing the inner panels 22A, 22B as the interior member in the airbag 10 shown in FIGS. 1 to 4 and described above. The configurations of the airbag 10A are the same as the above-described embodiment shown in FIG. 1 to 4(b). In FIGS. 5 to 7, the same reference numerals as those shown in FIGS. 1 to 4(b) designate the same parts.

In the airbag apparatus-provided with the airbag 10A, when the inflator 36 is activated and injects gas and the airbag 10A is inflated upon vehicle collision or the like, the suspension belt 80 is deployed toward the passenger in association with the inflation, and the lid member 60 is pulled inwardly of the airbag 10 by the suspension belt 80 via the tether 70A and is superimposed on the vent hole 18, thereby closing the vent hole 18. Accordingly the inner pressure of the airbag 10A is quickly increased to a high pressure, and hence the earlier inflation and deployment of the airbag 10A is ensured.

Subsequently, as shown in FIG. 6, when the passenger is crashed into the inflated airbag 10A, the front panel 12 of the airbag 10A is pressed by the passenger and is moved backward toward the rear panel 14, so that the suspension belt 80 is sagged, whereby a force to pull the lid member 60 inwardly of the airbag 10A is released. Accordingly, the lid member 60 is moved apart from the vent hole 18 by a gas pressure in the airbag 10A, and the vent hole 18 is opened. Consequently, the gas is discharged from the airbag 10A through the vent hole 18, and an impact to be applied to the passenger is absorbed.

Since the suspension belt 80 for connecting the front panel 12 and the rear panel 14 of the airbag 10A is used as an interior member of the airbag 10A, the configuration is simple.

Figure 8:
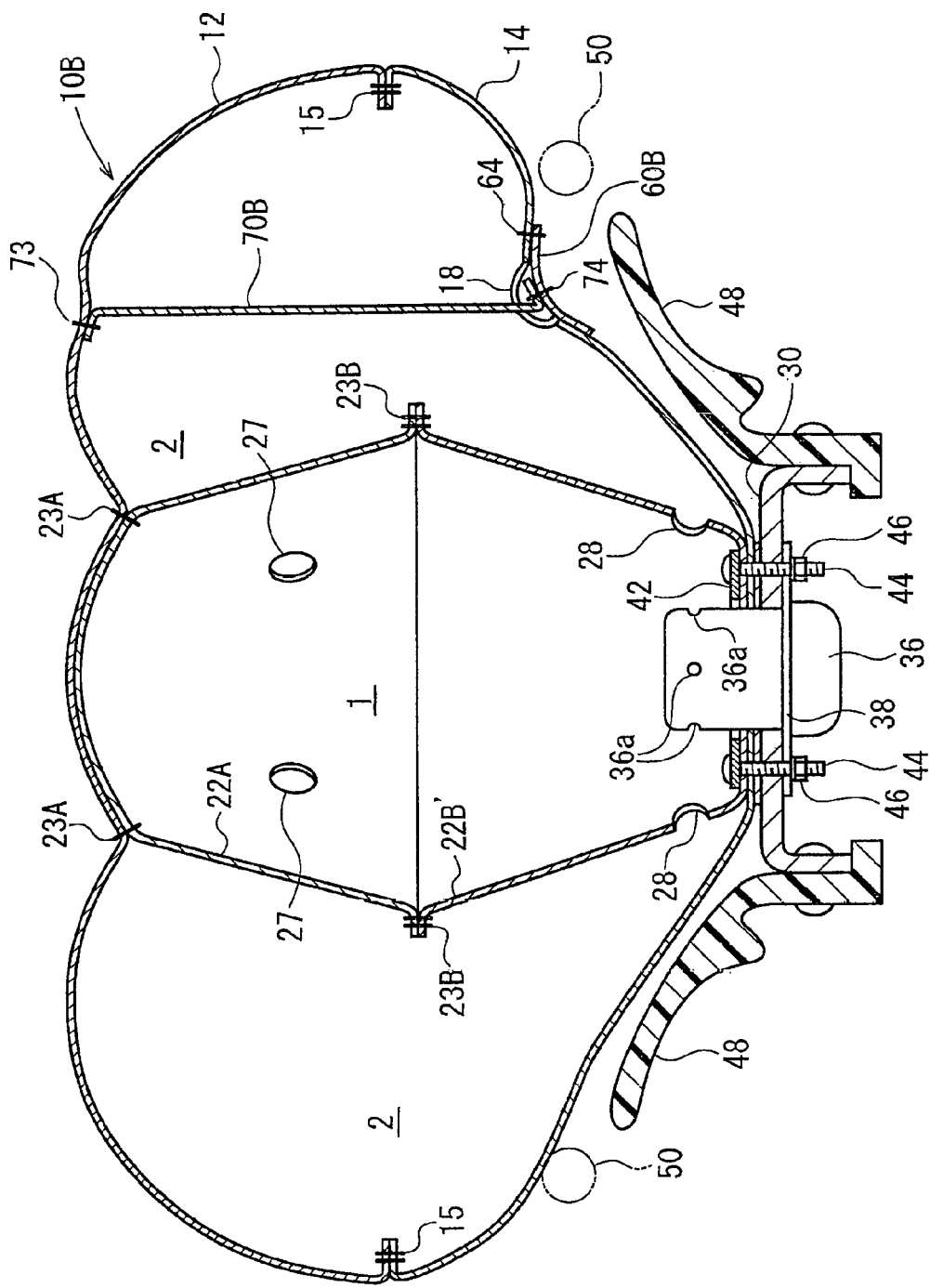
FIG. 8 is a cross-sectional view of the airbag and the airbag apparatus according to the embodiment.
Figure 9:
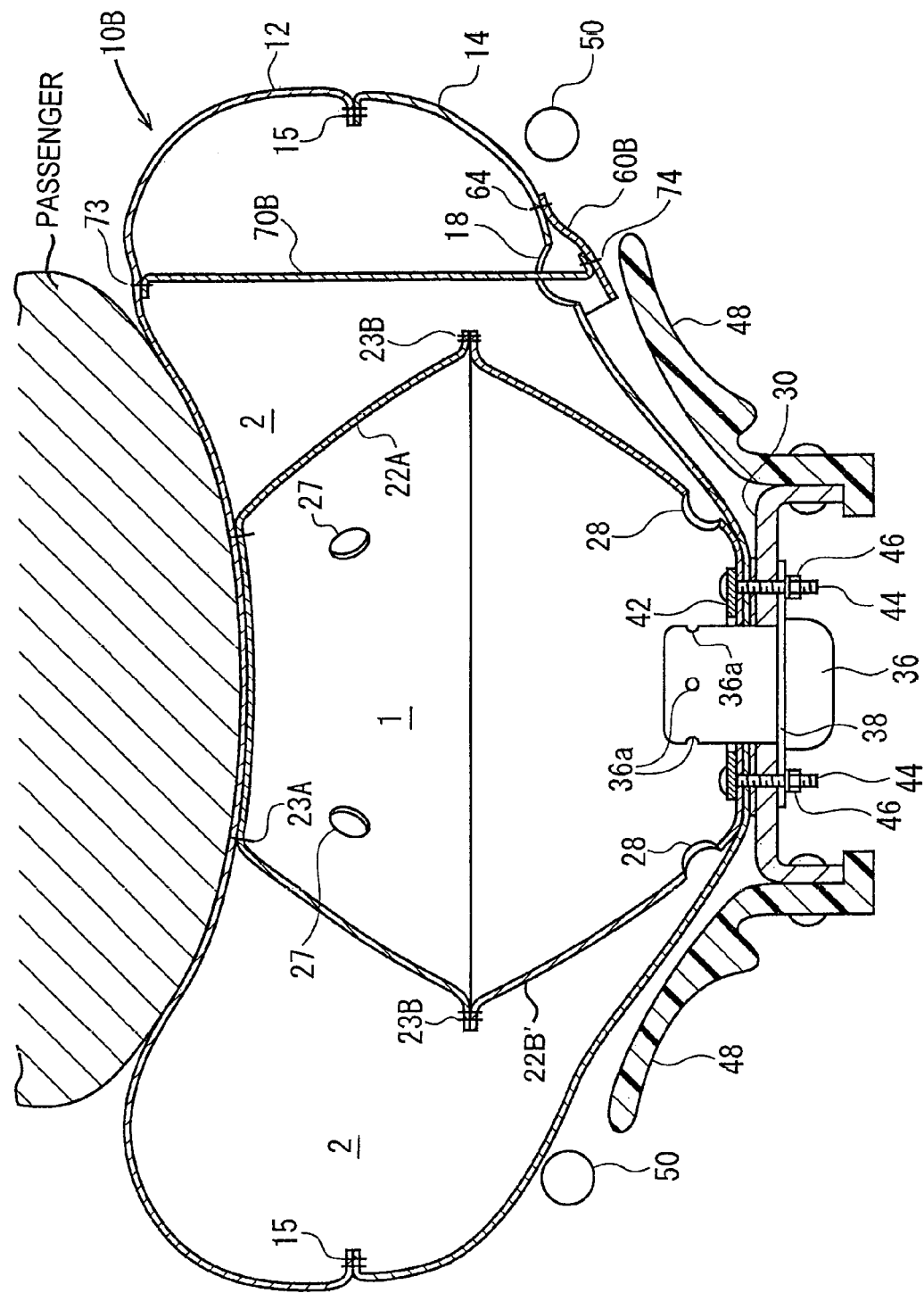
FIG. 9 is a cross-sectional view of the airbag and the airbag apparatus shown in FIG. 8 when the passenger is received.
Figure 10:
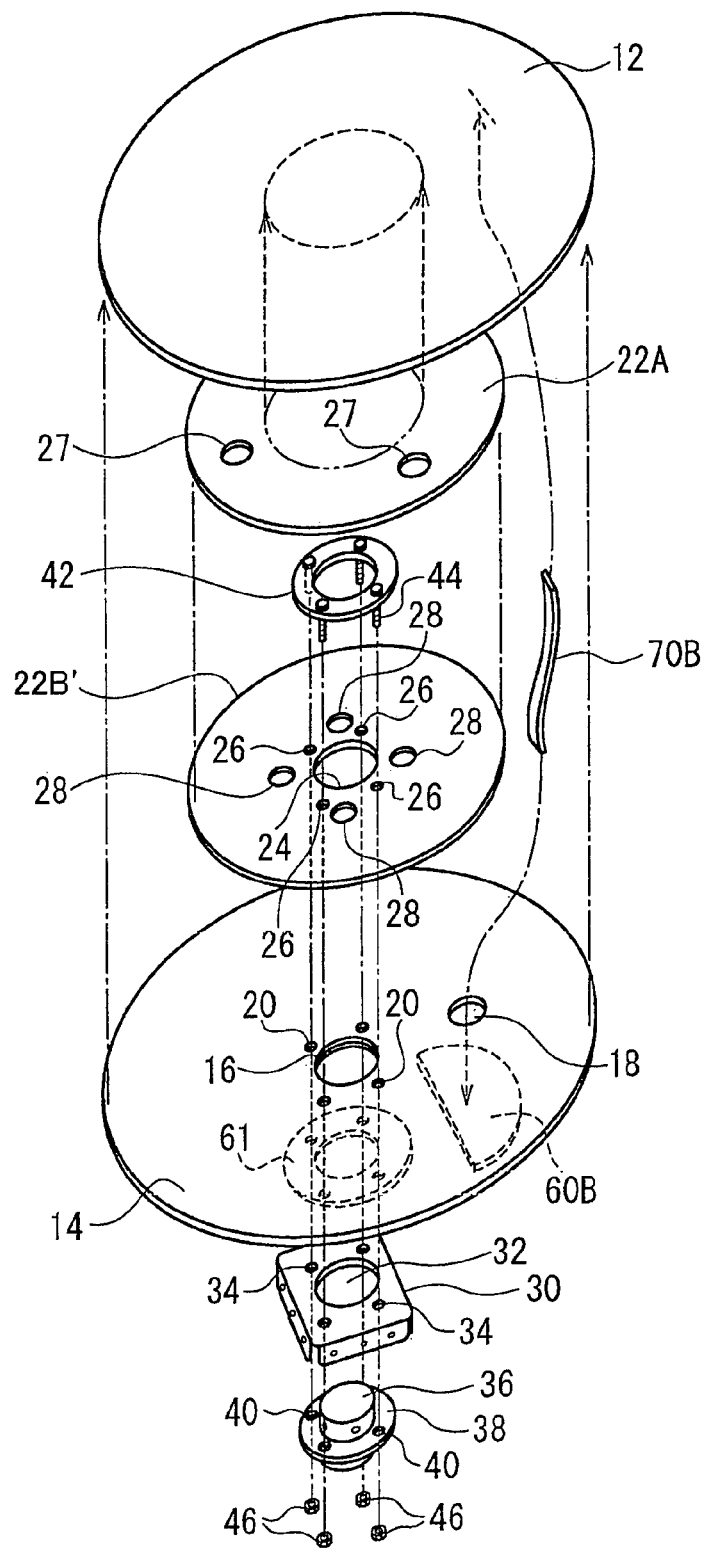
FIG. 10 is an exploded perspective view of the airbag and the airbag apparatus shown in FIG. 8.

In the respective embodiments shown above, the lid member 60 is connected to the inner panels 22A, 22B or the suspension belt 80 via the tethers 70, 70A. However, the lid member 60 may be connected to the passenger-facing surface (front panel 12) of the airbag. FIG. 8 and FIG. 9 are cross-sectional views of the airbag and the airbag apparatus configured in this manner, FIG. 10 is an exploded perspective view of the airbag and the airbag apparatus, FIG. 11(a) is a plan view of the rear panel of the airbag, FIG. 11(b) is a cross-sectional view taken along the line 11(b)-11(b) in FIG. 11(a). FIG. 8 shows a state before the passenger crashes into the airbag, and FIG. 9 shows a state after the passenger crashes into the airbag.

An airbag 10B in this embodiment includes a front panel 12 which constitutes the passenger-facing surface, the rear panel 14 which constitutes the outer surface on the opposite side of the passenger-facing surface, the first and second inner panels 22A, 22B' which partitions the interior of the airbag 10B into the first chamber 1 and the second chamber 2, the vent hole 18 which communicates the second chamber 2 and the outside of the airbag 10, a lid member 60B for covering the vent hole 18 from the outside of the airbag 10B, and a tether 70B as a joint member for connecting the lid member 60B to the front panel 12.

The configurations of the front panel 12, the rear panel 14 and the first and second inner panels 22A, 22B' in this embodiment are the same as in the embodiments shown in the above-described embodiment shown in FIG. 1 to FIG. 4(*b*) except for the point that the second inner panel 22B' is configured as the second inner panel 22B from which the tether 70 is omitted.

In this embodiment as well, the patch cloth 61 is attached to the peripheral edge of the opening 16 for an inflator at the center of the rear panel 14. However, in this embodiment, the patch cloth 61 is provided separately from the lid member 60B. A vent hole 18 is provided at a position near the intermediate area between the outer peripheral edge of the patch cloth 61 and the outer peripheral edge of the rear panel 14.

Figure 11:
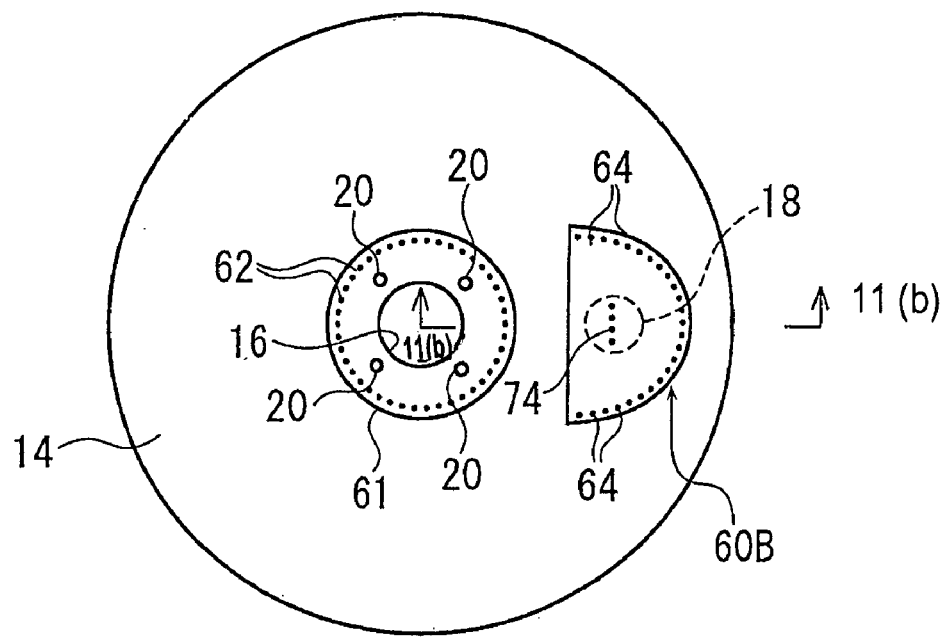
FIG. 11(a) shows a plan view of the rear panel of the airbag shown in FIG. 8.
FIG. 11(b) shows a cross-sectional view of the rear panel of the airbag taken along line 11(b)-11(b) in FIG. 11(a).
Figure 11:
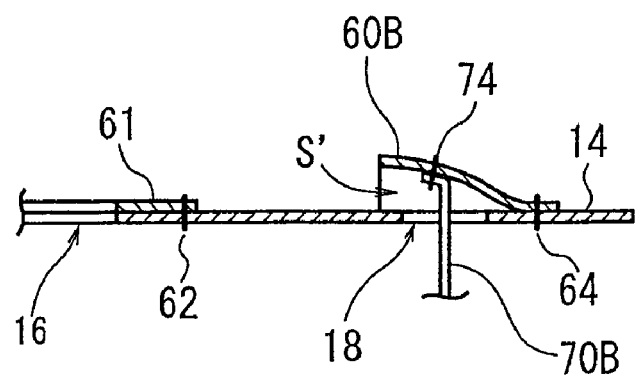

As shown in FIG. 11(*a*), in this embodiment, the lid member 60B is a substantially semi-circular panel, and an outer periphery is defined by an arcuate side extending in a substantially U-shape, and a chord-shaped side connecting both ends thereof. The lid member 60B is, as shown in the drawing, the chord-shaped side is aligned with the vent hole 18 from the outer side of the rear panel 14 in a posture in which the chord-shaped side faces the center side of the rear panel 14, and the edge portion along the arcuate side out of the peripheral edge thereof is stitched to the peripheral portion (rear panel 14) of the vent hole 18 by the seam 64. The seam 64 extends in the substantially U-shape along the arcuate side, and the vent hole 18 is positioned on the center side of the lid member 60B with respect to the seam 64. A portion along the chord-shaped side out of the outer peripheral edge of the lid member 60B is not connected to the rear panel 14.

The distance between the stitched position of one end of the chord-shaped side with respect to the rear panel 14 and the stitched position of the other end with respect to the rear panel 14 in a state in which the rear panel 14 is flatly extended is narrower than the distance between the ends of the chord-shaped side (that is, the width of the lid member 60B) in the state in which the lid member 60B is flatly extended. Therefore, even when the rear panel 14 is expanded flatly, the lid member 60B remains in a sagged state, and when the lid member 60B is not pulled inwardly of the airbag 10B by the tether 70B, a space S' is generated between the lid member 60 and the rear panel 14. As shown in FIG. 11B, the space S' is opened toward the center side of the rear panel 14.

In this embodiment, in the inner side of the airbag 10B, one end of the tether 70B is stitched to the front panel 12. Reference numeral 73 designates a seam which stitches one end of the tether 70B to the front panel 12. The other end of the tether 70B passed through the vent hole 18 and is stitched to the lid member 60B on the outside of the airbag 10B. Reference numeral 74 designates a seam which stitches the other end of the tether 70B to the id member 60B.

Other configurations of the airbag 10B are the same as the airbag 10 shown in FIGS. 1 to 4(*b*). The configuration of the airbag apparatus provided with the airbag 10B is also the same as the airbag apparatus shown in FIGS. 1 to 4(*b*). The mounting procedure of the airbag 10B to the retainer 30 is the same as the airbag 10, and hence the description is omitted. In FIG. 8 to FIG. 11(*b*), the same reference numerals as in FIGS. 1 to 4(*b*) designate the same parts.

In the airbag apparatus provided with the airbag 10B, when the inflator 36 is activated to inject gas and hence the airbag 10B is inflated upon vehicle collision or the like, the lid member 60B is pulled inwardly of the airbag 10B by the front panel 12 via the tether 70B, and is superimposed on the vent hole 18 in association with protrusion of the front panel 12 toward the passenger, and hence closes the vent hole 18. Accordingly, the internal pressure of the airbag 10B is quickly brought into a high pressure, and earlier inflation of the airbag 10B is ensured.

Subsequently, when the passenger is crashed into the inflated airbag 10B, since the front panel 12 is pressed by the passenger and is moved backward toward the rear panel 14, as shown in FIG. 9, a force to pull the lid member 60B inwardly of the airbag 10B is released. Accordingly, the lid member 60B is moved apart from the vent hole 18 by the gas pressure in the airbag 10B, and the vent hole 18 is opened. Accordingly, the gas is discharged from the vent hole 18 to the outside of the airbag 10B, and hence an impact to be applied to the passenger is absorbed.

In this embodiment, since the space S' between the lid member 60B and the rear panel 14 is opened toward the center of the rear panel 14, the gas passed through the vent hole 18 is discharged toward the center of the rear panel 14 through the space S'.

In FIG. 8 to FIG. 11(*b*), the tether 70B as a separate member is employed. However, even when the second inner panel 22B with the tether 70 is employed as the airbag 10B' shown in FIG. 12 and FIG. 13, the gas passed through the vent hole 18 when the airbag 10B' is inflated is discharged toward the center of the rear panel 14.

Figure 12:
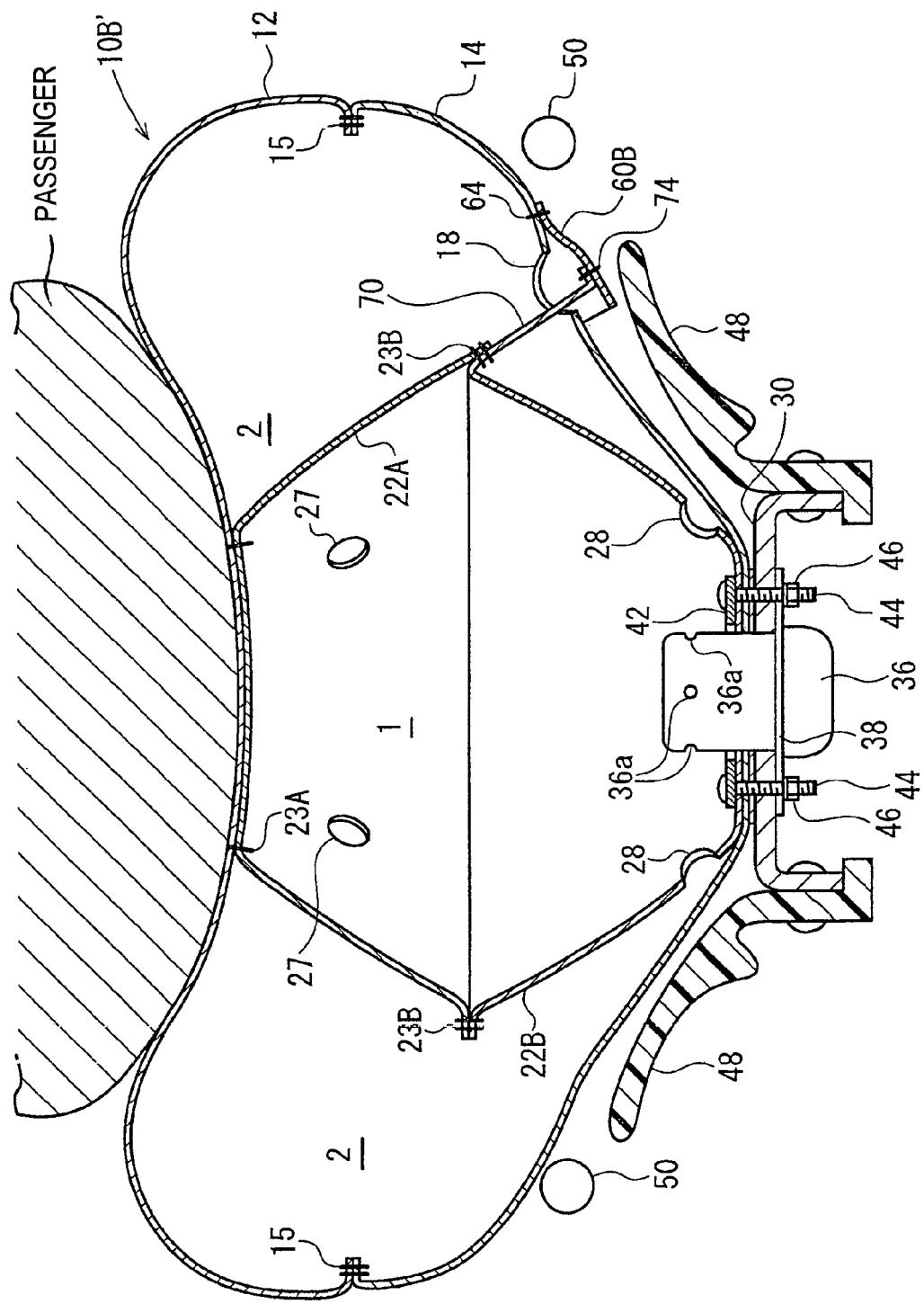
FIG. 12 is a cross-sectional view of the airbag according to another embodiment.
Figure 13:
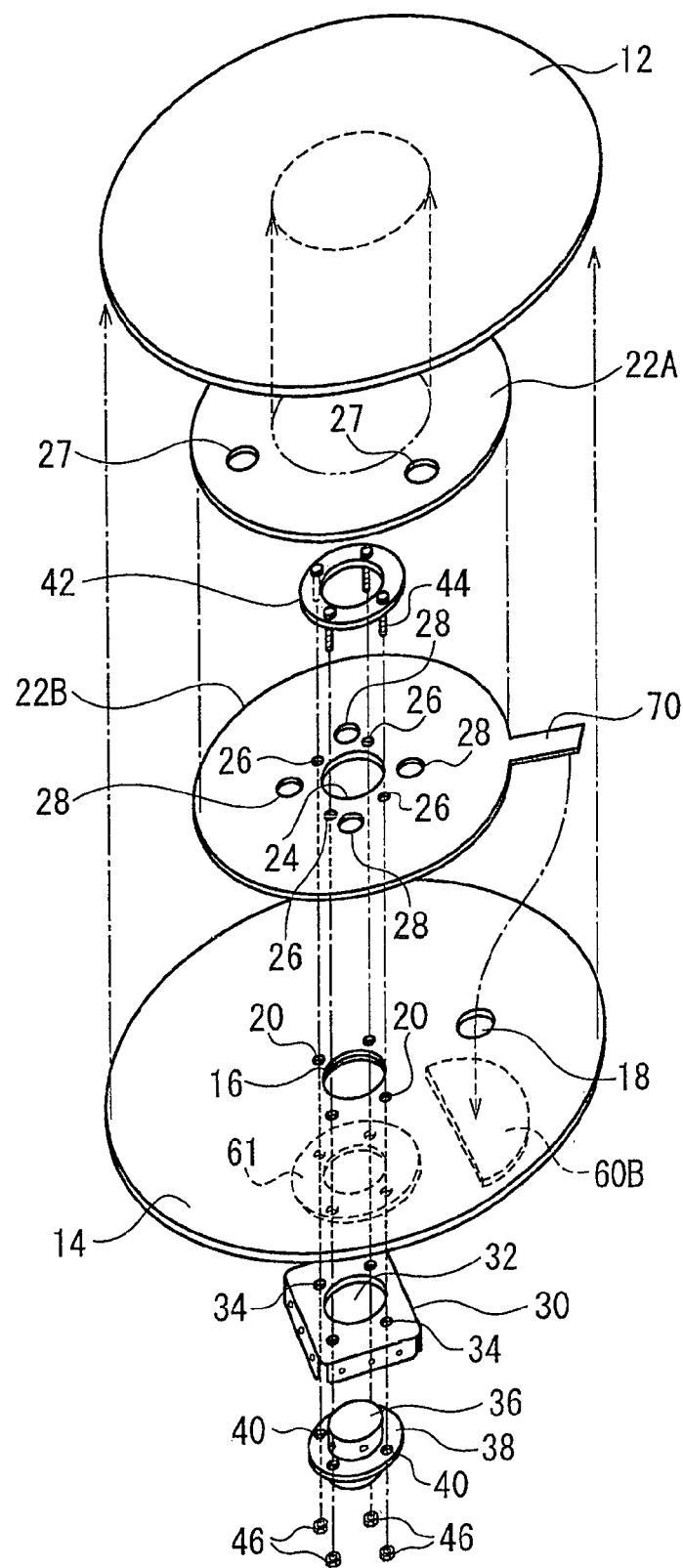
FIG. 13 is an exploded perspective view of the airbag shown in FIG. 12.

FIG. 12 and FIG. 13 are the same as FIG. 9 and FIG. 10 except for the point that the second inner panel 22B with the above-described tether 70 instead of the tether 70A and the second inner panel 22B', and the same reference numerals represents the same parts.

Figure 14:
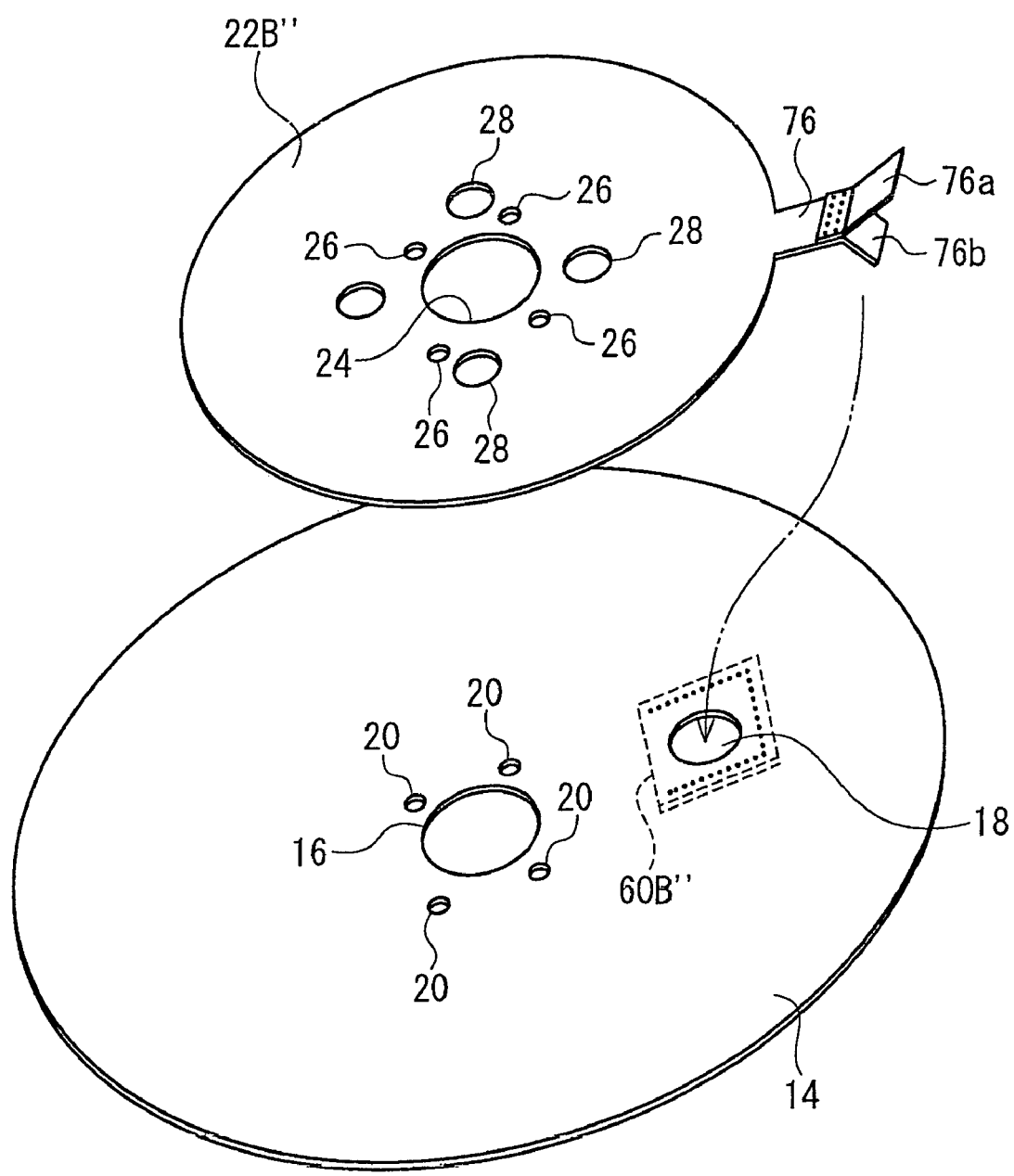
FIG. 14 is an exploded perspective view of a principal portion of the airbag according to another embodiment.
Figure 15:
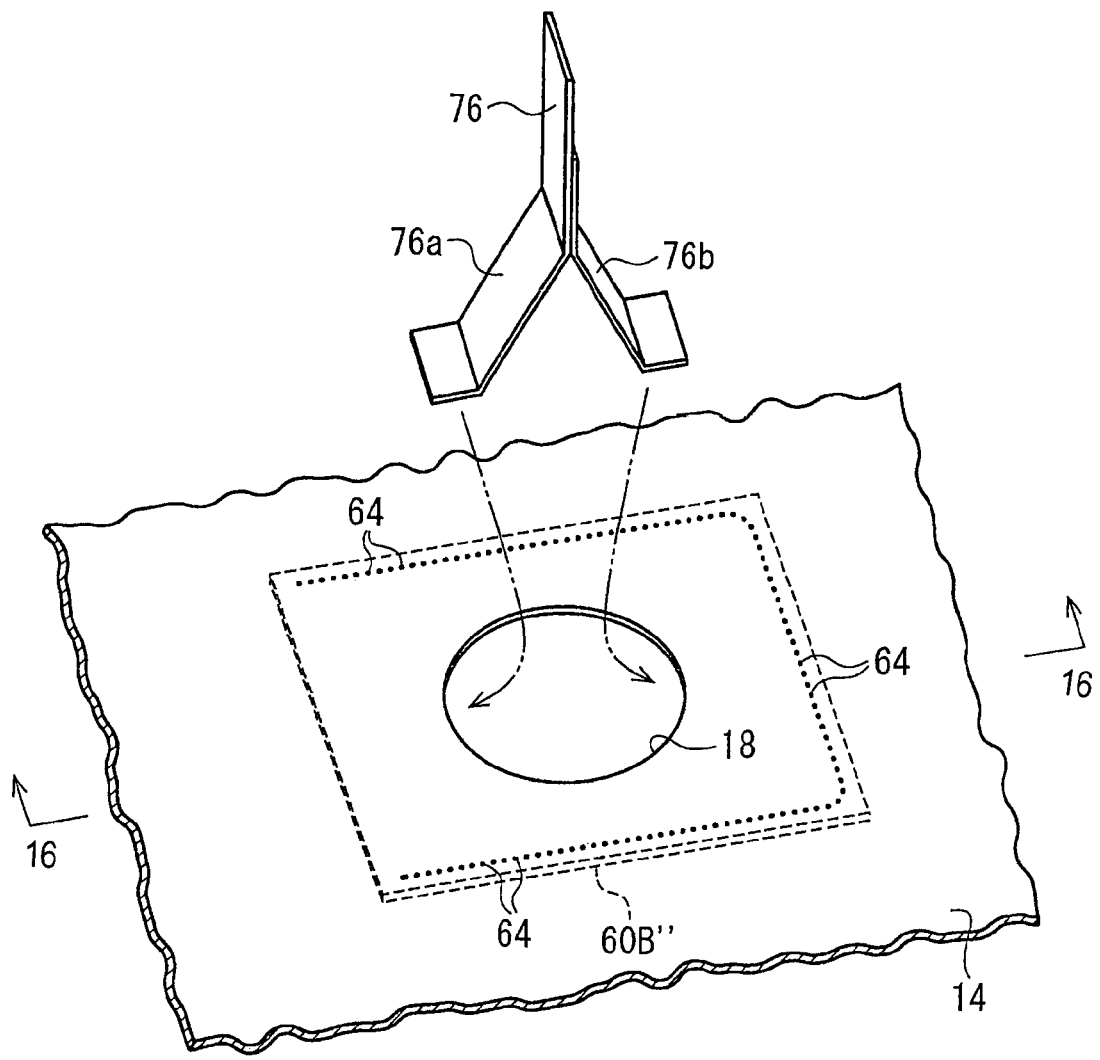
FIG. 15 is an exploded perspective view of a principal portion of the airbag shown in FIG. 14.
Figure 16:
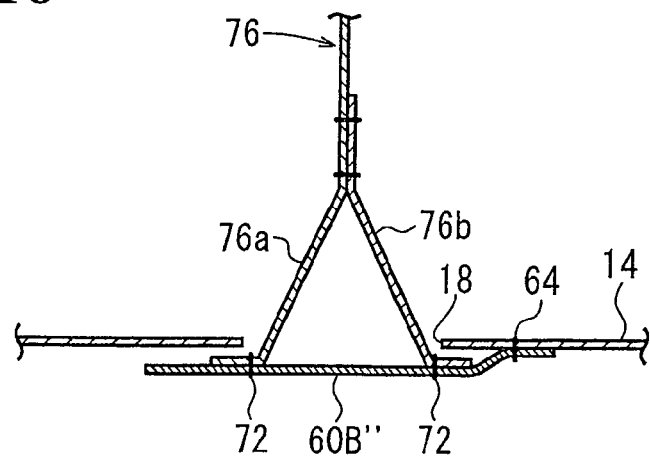
FIG. 16 is a cross-sectional view of the airbag taken along line 16-16 in FIG. 15 after the tether is stitched.

In this embodiment, as shown in FIGS. 14, 15 and 16, it is also possible to split a distal end of the tether (one end on the side of the lid member) into a plurality of branches, and connect the distal ends of the respective branches to the lid member.

In FIG. 14 to FIG. 16, a tether 76 is integrally connected to the second inner panel 22B". Two pieces of branch tethers 76a, 76b are formed at the distal end of the tether 76 by stitching a separate cloth strip to a distal side of the tether 76. The respective branch tethers 76a, 76b are stitched to the lid member 60B". The lid member 60B" is stitched at three sides thereof to the rear panel 14 in the same manner as the above-described lid member 60B by the seam 64. The lid member 60B" has a substantially square shape, and one side opposing the center of the rear panel 14 is not stitched with respect to the rear panel 14, and is kept free. When the airbag is inflated and the lid member 60B" is moved apart from the rear panel 14, gas from the vent hole 18 is discharged toward the center of the rear panel 14 through the side portion opposing the center of the rear panel.

In this embodiment, the bifurcated branch tethers 76a, 76b are stitched to different stitched positions on the lid member 60B". Therefore, a force of the tether 76 to pull the lid member 60B" in the initial stage of inflation of the airbag is dispersed over a wide range of the lid member 60B", and the lid member 60B" is superimposed on the peripheral edge of the vent hole 18 so as to be tightly adhered uniformly thereto. In this embodiment, the bifurcated branch tether 76a, 76b assume an inverted V-shape, and works as a guide for guiding the tether 76 to the center of the vent hole 18. Accordingly, the lid member 60B" can close the entire vent hole 18 hermetically.

FIG. 14 to FIG. 16 shows only a second inner panel 22B" with the tether 76 and a rear panel 14 with the lid member 60B". Other configurations of the airbag shown in FIG. 14 to FIG. 16 are the same as the airbag 10B' shown in FIG. 12 and FIG. 13.

In FIG. 14 to FIG. 16, the distal end side of the tether 76 is branched into two sheets. However, it may be branched into three or more sheets.

Figure 17:
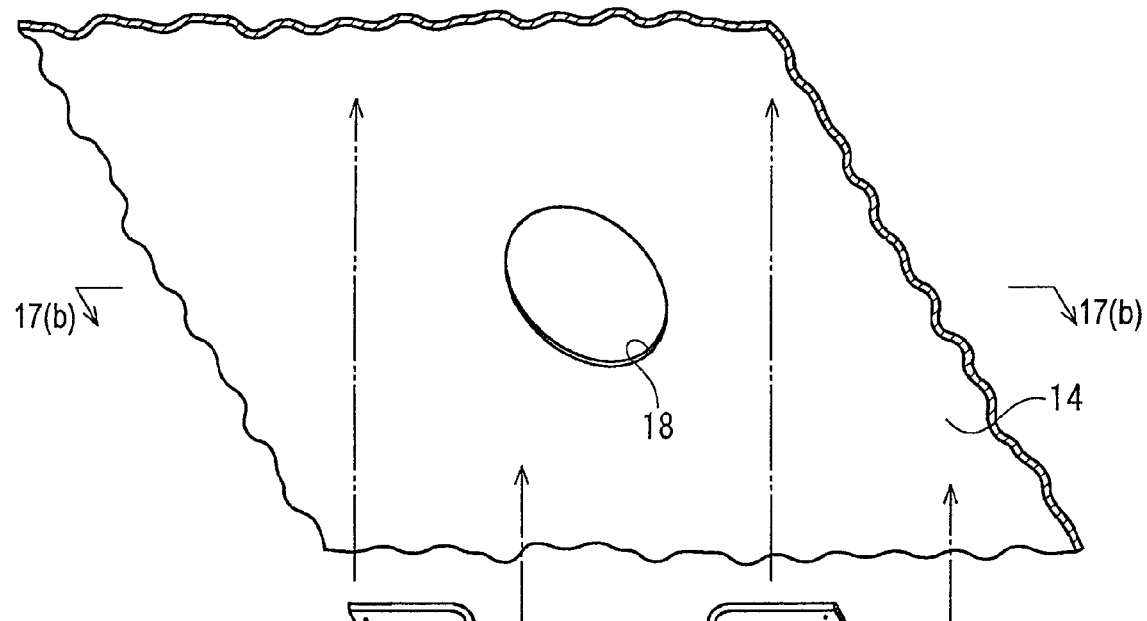
FIG. 17(a) is an exploded perspective view of a principal portion of the airbag according to still another embodiment.
FIG. 17(b) is a cross-sectional view taken along 17(b)-17(b) in FIG. 17(a).
Figure 17:
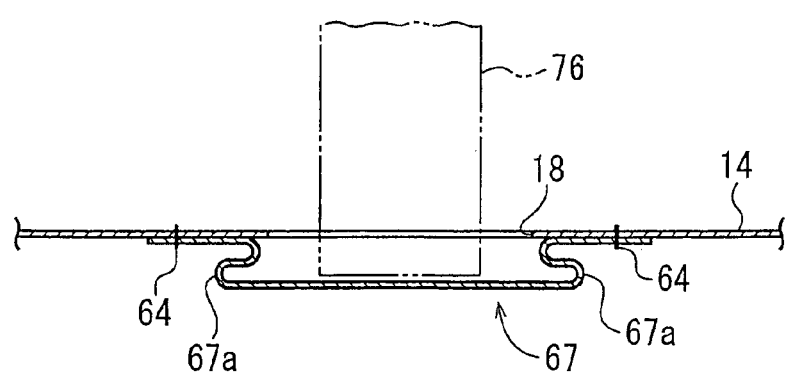
Figure 18:
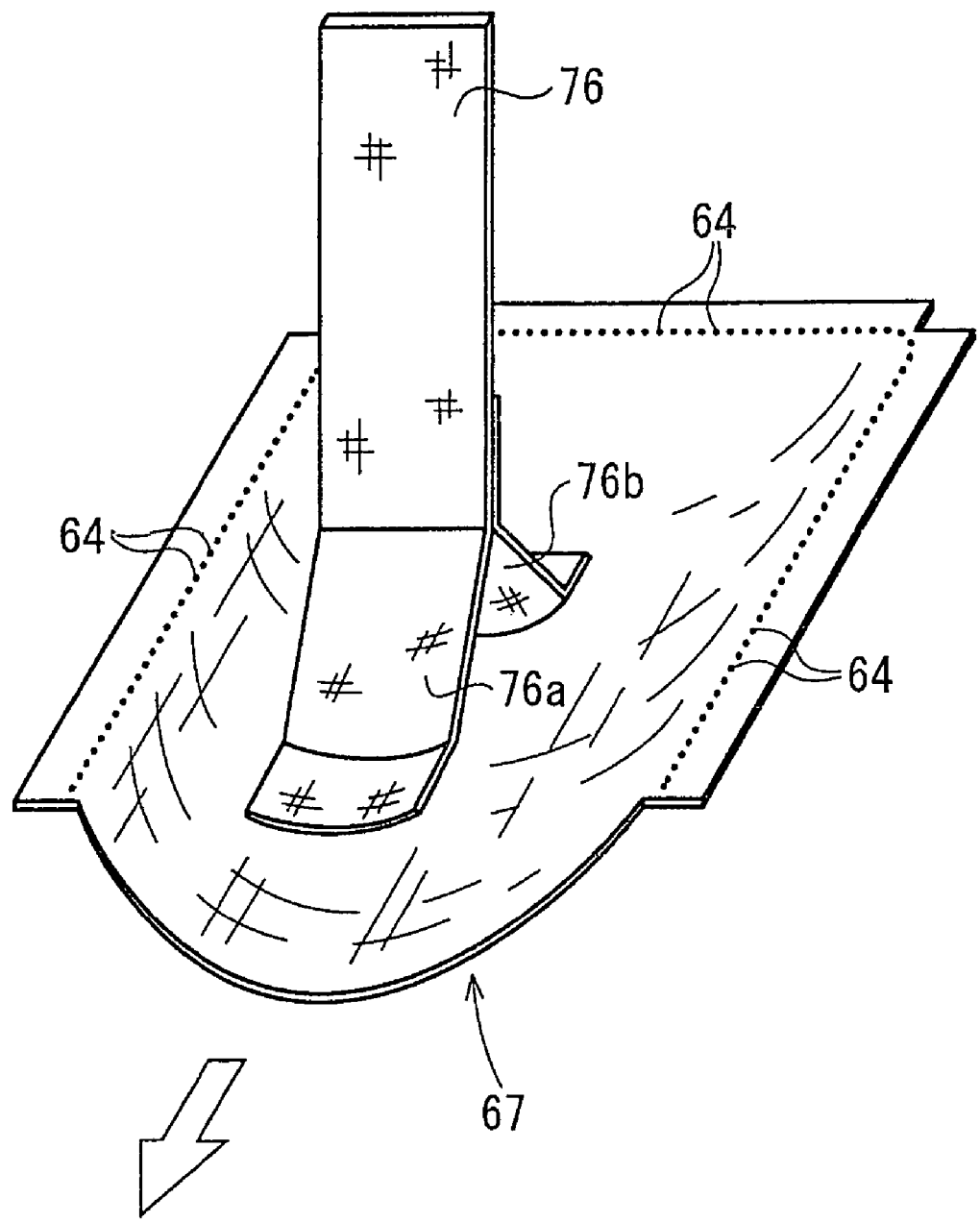
FIG. 18 is a perspective view of a principal portion of the airbag shown in FIG. 17A.

In the present invention, as shown in FIG. 17(a) to FIG. 18, a lid member 67 with a tuck 67a may be stitched to the rear panel 14.

The lid member 67 has a substantially square shape and is provided with the tuck 67a along a pair of opposed sides. The respective opposed sides along which the tuck 67a extends out of the four sides of the lid member 67 and one side which is orthogonal thereto is stitched to the rear panel 14 by the seam 64. A remaining one side is not stitched to the rear panel 14, and is kept free. This free side is positioned on the side of the center of the rear panel 14. The tether 76 is stitched to the lid member 67.

When the airbag is inflated and gas is discharged from the vent hole 18, as shown in FIG. 18, the lid member 67 starts to be swelled so as to stretch the tuck 67a, and hence the gas can be discharged smoothly.

It is clear that a tether other than the tether 76 may be connected to the lid member 67.

Figure 19:
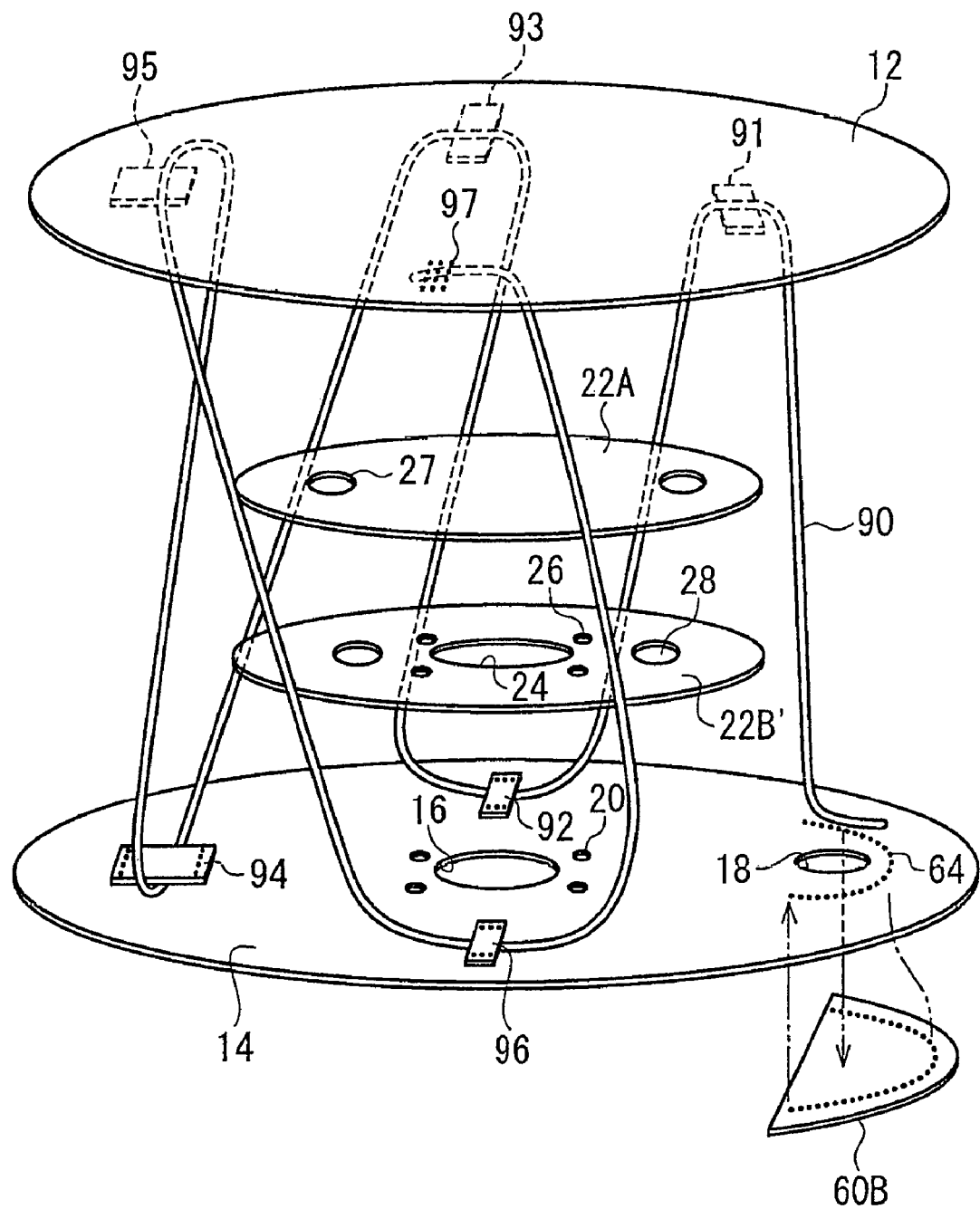
FIG. 19 is an exploded perspective view of the principal portion of the airbag according to still another embodiment.
Figure 20:
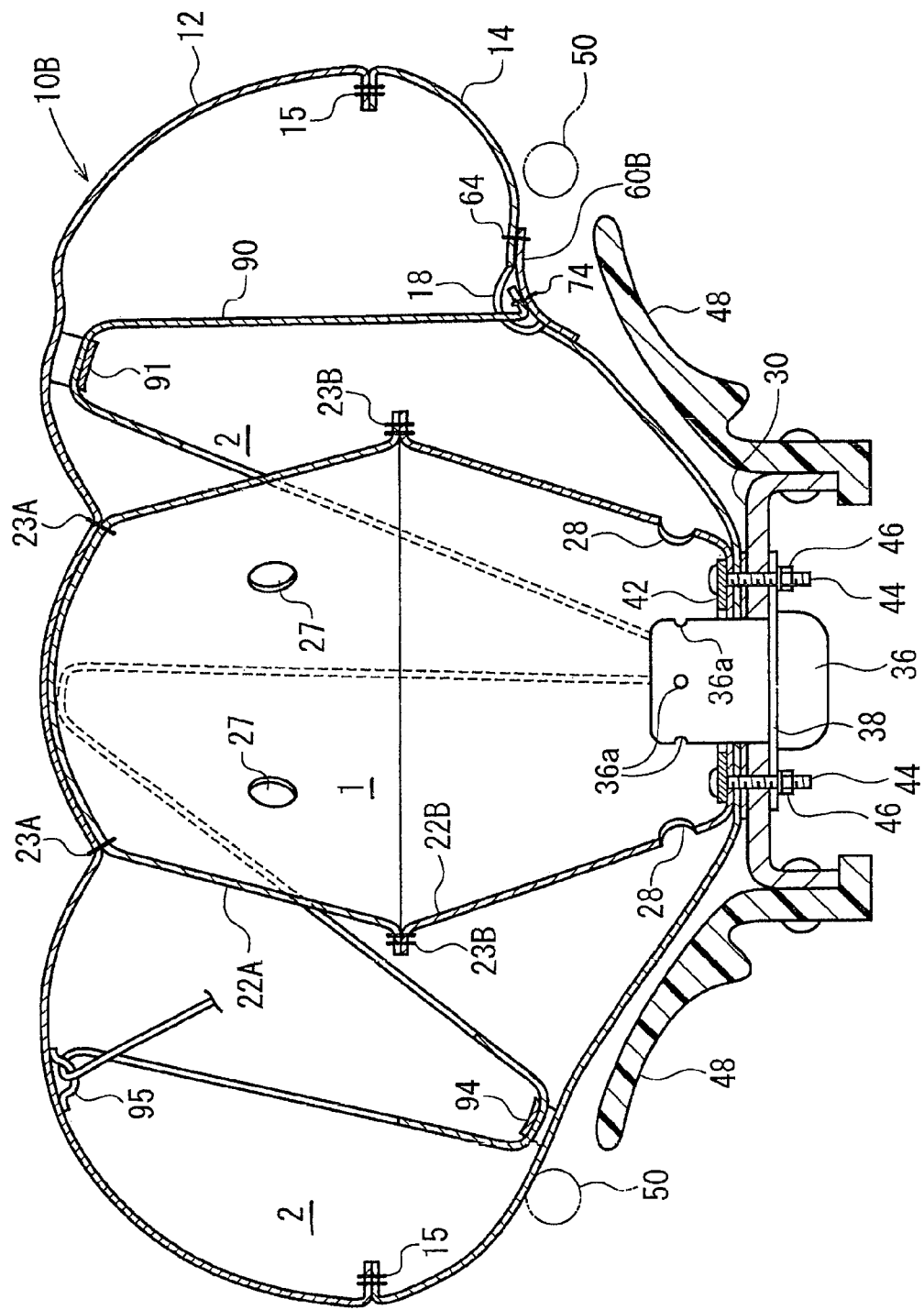
FIG. 20 is a cross-sectional view of the airbag shown in FIG. 19.

In the present invention, it is also applicable to extend a tether 90 in the form of a long string alternately between the front panel 12 and the rear panel 14 as a joint member as shown in FIG. 19 and FIG. 20.

In FIG. 19 and FIG. 20, run-through members 91, 93, 95 for the tether 90 are provided on the front panel 12 at three different positions and run-through members 92, 94, 96 are provided on the rear panel 14 at three different positions. The respective run-through members 91 to 96 are formed of small cloth having a substantially rectangular shape. A pair of sides of the rectangular small cloth are stitched to the front panel 12 or the rear panel 14. The tether 90 is passed through a space between the cloth and the panel 12 or 14 through a remaining pair of sides of the cloth.

The distal end of the tether 90 is stitched to the lid member 60B by a seam 74. The tether 90 is inserted through the run-through members 91, 92, 93, 94, 95 and 96 in this order so as to be capable of sliding movement, and an extremity thereof is stitched to the front panel 12 by a seam 97.

Other configurations of an airbag 10C are the same as the airbag 10" in FIG. 8 to FIG. 11(b) described above. In FIG. 19 and FIG. 20, the same reference numerals as those in FIG. 8 to FIG. 11(b) designate the same parts.

In the airbag apparatus provided with the airbag 10C, when the inflator 36 is activated to inject gas and the airbag 10C is inflated upon vehicle collision or the like, the lid member 60B is pulled inwardly of the airbag 10C by the front panel 12 via the tether 90 and hence is superimposed on the vent hole 18 in association with initiation of protrusion of the front panel 12 toward the passenger as shown in FIG. 20, so that the vent hole 18 is closed.

Subsequently, when the passenger crashes into the inflated airbag 10C, the front panel 12 is pressed by the passenger and is moved backward toward the rear panel 14 in the same manner shown in FIG. 9, although it is not shown in the drawing. Therefore, a force to pull the lid member 60B inwardly of the airbag 10C is released, and the lid member 60B is moved apart from the vent hole 18, and hence the vent hole 18 is opened.

In this embodiment, since the run-through members 91, 93, 95 are provided on the front panel 12 at the different plurality of positions, even when the passenger hits against only an area in the vicinity of at least any one of the run-through members 91, 93, 95 and hence only the corresponding part of the front panel 12 is pushed into the airbag 10C, a force of the tether 90 which pulls the lid member 60B is alleviated, and the lid member 60B is opened.

In the embodiment shown in FIG. 19 and FIG. 20, the same number of the run-through members 92, 94, 96 as the run-through members 91, 93, 95 of the front panel 12 are provided on the rear panel 14. However, it is also possible to provide the run-through member of the rear panel 14 one less than the number of the run-through members of the front panel 12 and stitch the extremity of the tether 90 to the rear panel 14. The extremity of the tether 90 may be connected to the inner panel 22A or 22B other than the front panel 12 and the rear panel 14.

The lid member with a tuck may also be used in this embodiment.

In the present invention, a configuration in which the lid member covers the vent hole partly until the airbag is inflated to a predetermined extent and the vent hole is largely opened when the airbag is inflated more than the predetermined extent may also be employed.

Figure 21:
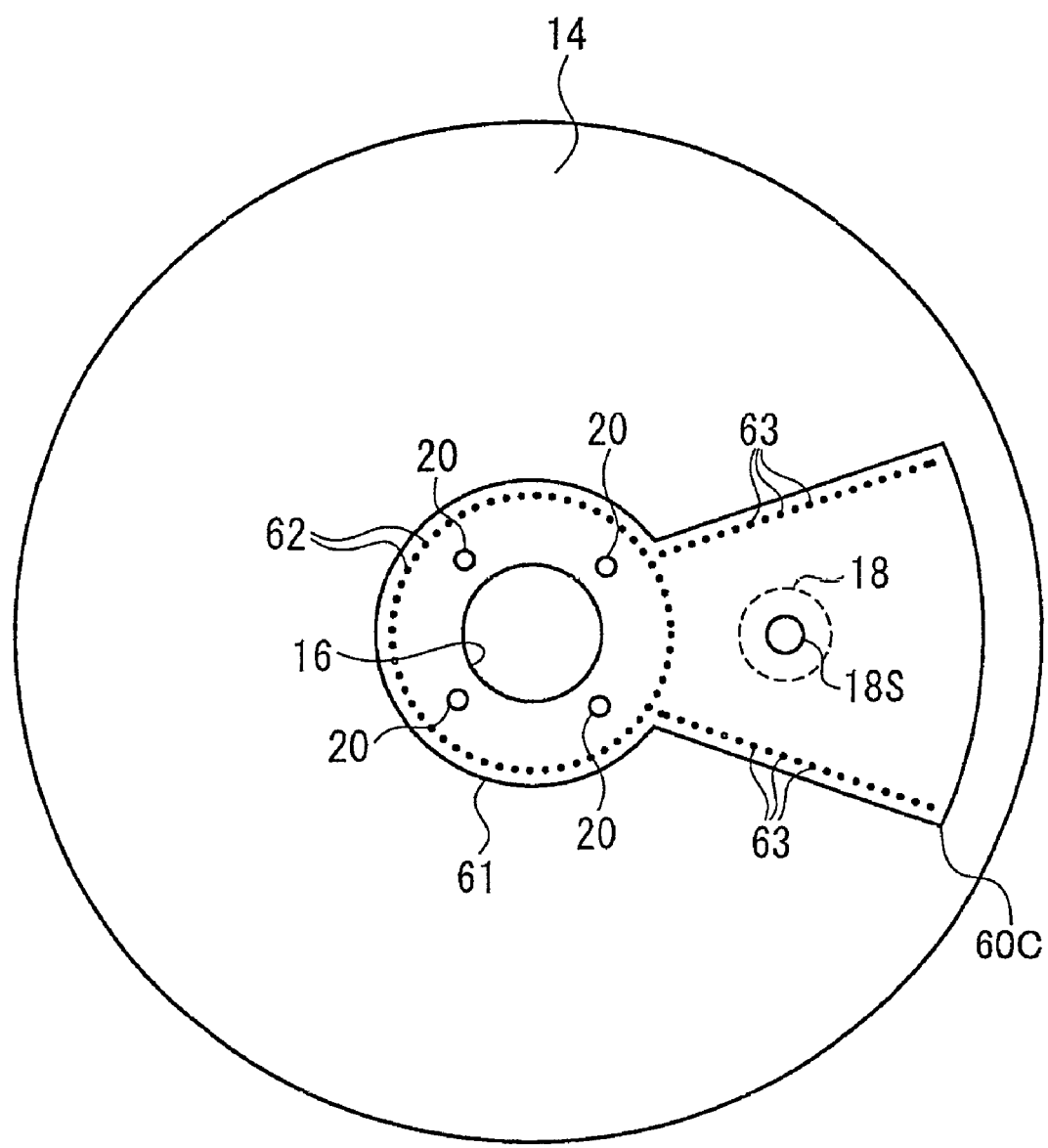
FIG. 21 is a plan view of the rear panel of the airbag according to the embodiment.

For example, an auxiliary vent hole 18S formed of an opening which is smaller in diameter than the vent hole 18 may be provided on the rear panel at a portion which superimposes on the vent hole 18 as the lid member 60C shown in FIG. 21. The interior of the airbag is constantly communicated with the outside of the airbag via the auxiliary vent hole 18S and the vent hole 18 described above. Other configurations in FIG. 21 are the same as the above-described embodiment.

When the passenger hits against the airbag in the initial stage of inflation of the airbag, gas in the airbag is flowed out through the auxiliary vent hole 18S and hence an impact is absorbed.

The respective embodiments shown above are exemplified by an application for the airbag and the airbag apparatus for a driver's seat of the vehicle. However, it is also applicable to various types of airbag and airbag apparatus.

FIGS. 22(a), 22(b), 23(a), and 23(b) show an example of a passenger airbag in which the present invention is applied.

A passenger airbag 100 is folded and stored in a container 101, and is inflated by an inflator 102. The passenger airbag is installed in an instrument panel 103. The container 101 is covered by the lid 104 from above. Reference numeral 105 designates a windshield.

The passenger airbag 100 is provided with a vent hole 110 on the side surface, which is covered by a lid member 120 from the outside thereof. The lid member 120 is formed of a cloth as the airbag 100, three sides thereof are stitched to the airbag 100, and a remaining side thereof on the side of the windshield 105 is kept free with respect to the airbag 100.

An end of a tether 130 configured as a joint member is connected to a passenger-facing surface 100f out of the inner surfaces of the airbag 100, and the other end of the tether 130 passes through the vent hole 110 and connected to the lid member 120 by stitching. A run-through member 131 is provided on a windshield-opposing surface 100e out of the inner surfaces of the airbag 100, and the tether 130 is inserted through the run-through member 131.

Figure 22:
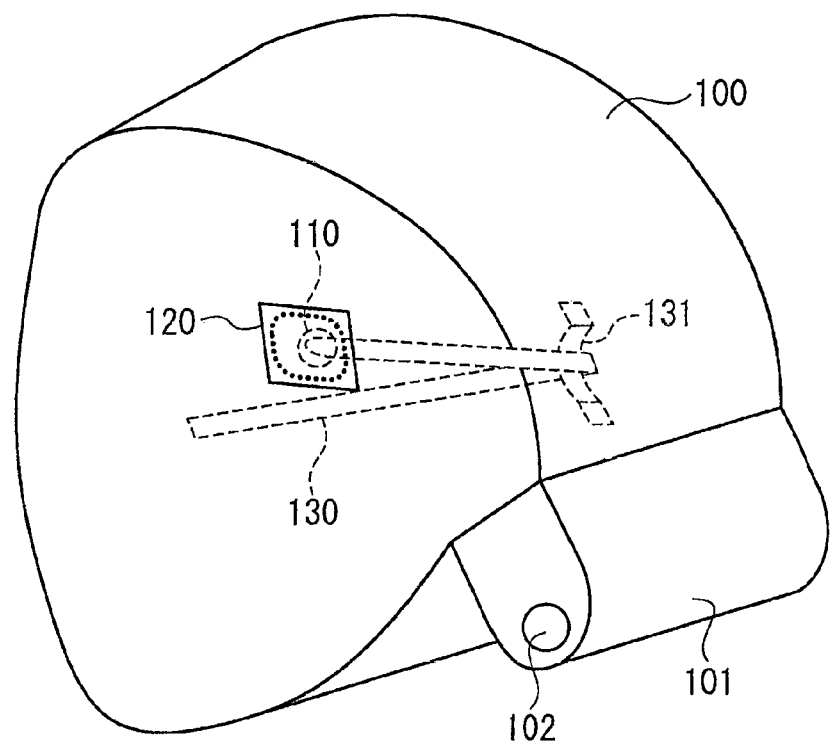
FIG. 22(a) is a perspective of an inflated passenger airbag according to the embodiment.
FIG. 22(b) is a side view of an inflated airbag receiving a passenger according to the embodiment.
Figure 22:
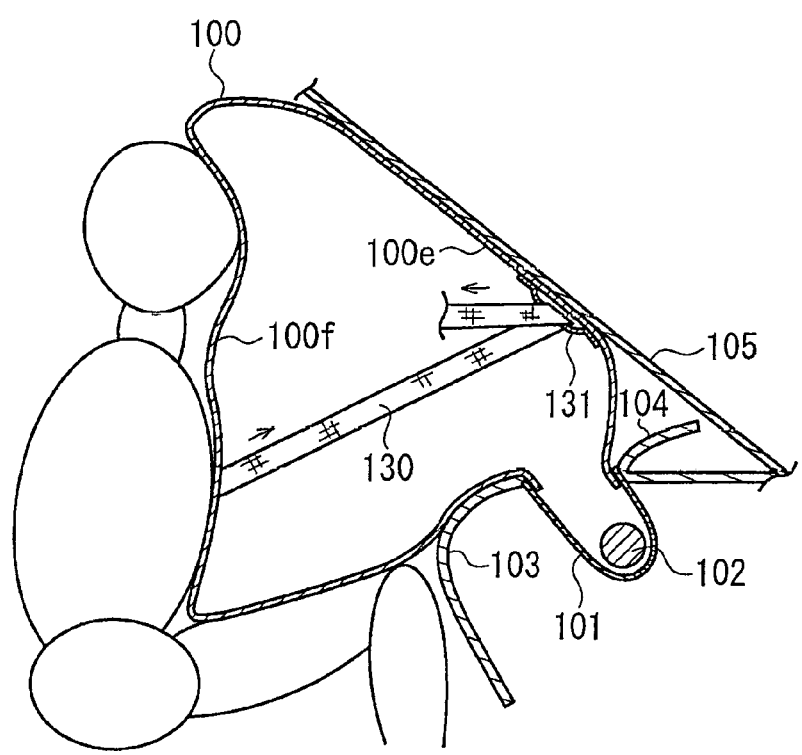
Figure 23:
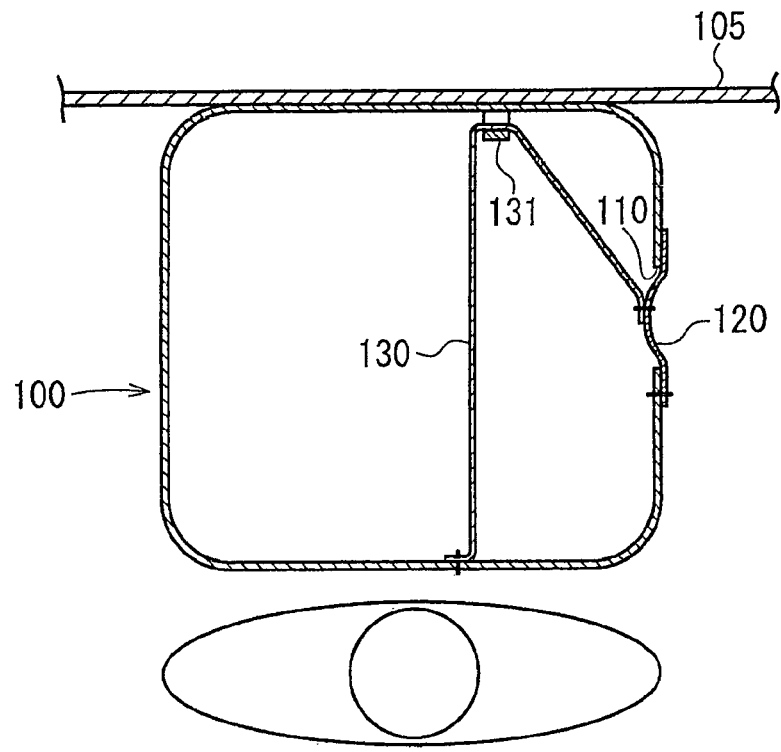
FIG. 23(a) is a horizontal cross-sectional view of the passenger airbag according to the embodiment.
FIG. 23(b) is a horizontal cross-sectional view of the passenger airbag receiving a passenger according to the embodiment.
Figure 23:
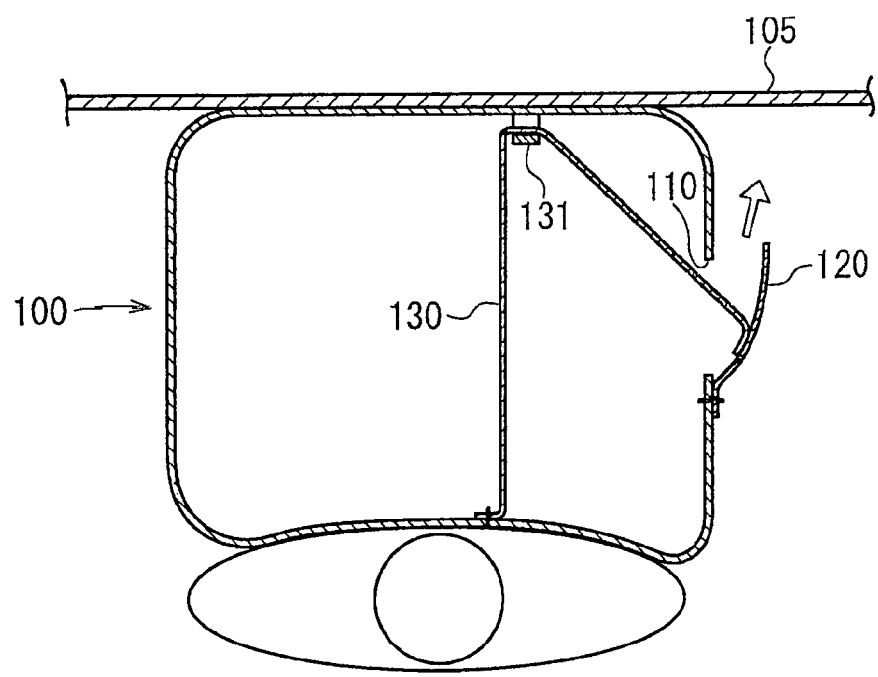

In the case of the airbag apparatus provided with this airbag 100, when the inflator 102 is activated to inject gas and the airbag 100 is inflated upon vehicle collision or the like, as shown in FIG. 22(a) and FIG. 23(a), the lid member 120 is pulled inwardly of the airbag 100 via the tether 130 and is superimposed on the vent hole 110 in association with protrusion of the passenger-facing surface 100f toward the passenger, and hence the vent hole 110 is closed. Accordingly, the inner pressure of the airbag 100 is quickly increased to a high pressure, and earlier inflation and deployment of the airbag 100 is ensured.

Subsequently, when the passenger crashes into the inflated airbag 100, as shown in FIG. 22(b) and FIG. 23(b), the passenger-facing surface 100f is pressed by the passenger and is moved backward, a force to pull the lid member 120 inwardly of the airbag 100 is released. Accordingly, the lid member 120 is moved apart from the vent hole 110 by the gas pressure in the airbag 100, and the vent hole 110 is opened. Consequently, the gas is flowed out from the vent hole 110 to the outside of the airbag 100, and an impact to be applied to the passenger is absorbed.

In this embodiment, as shown in FIG. 23(b), since the space between the lid member 120 and the airbag 100 is opened toward the windshield 105, gas passed through the vent hole 110 is discharged toward the windshield 105.

Figure 24:
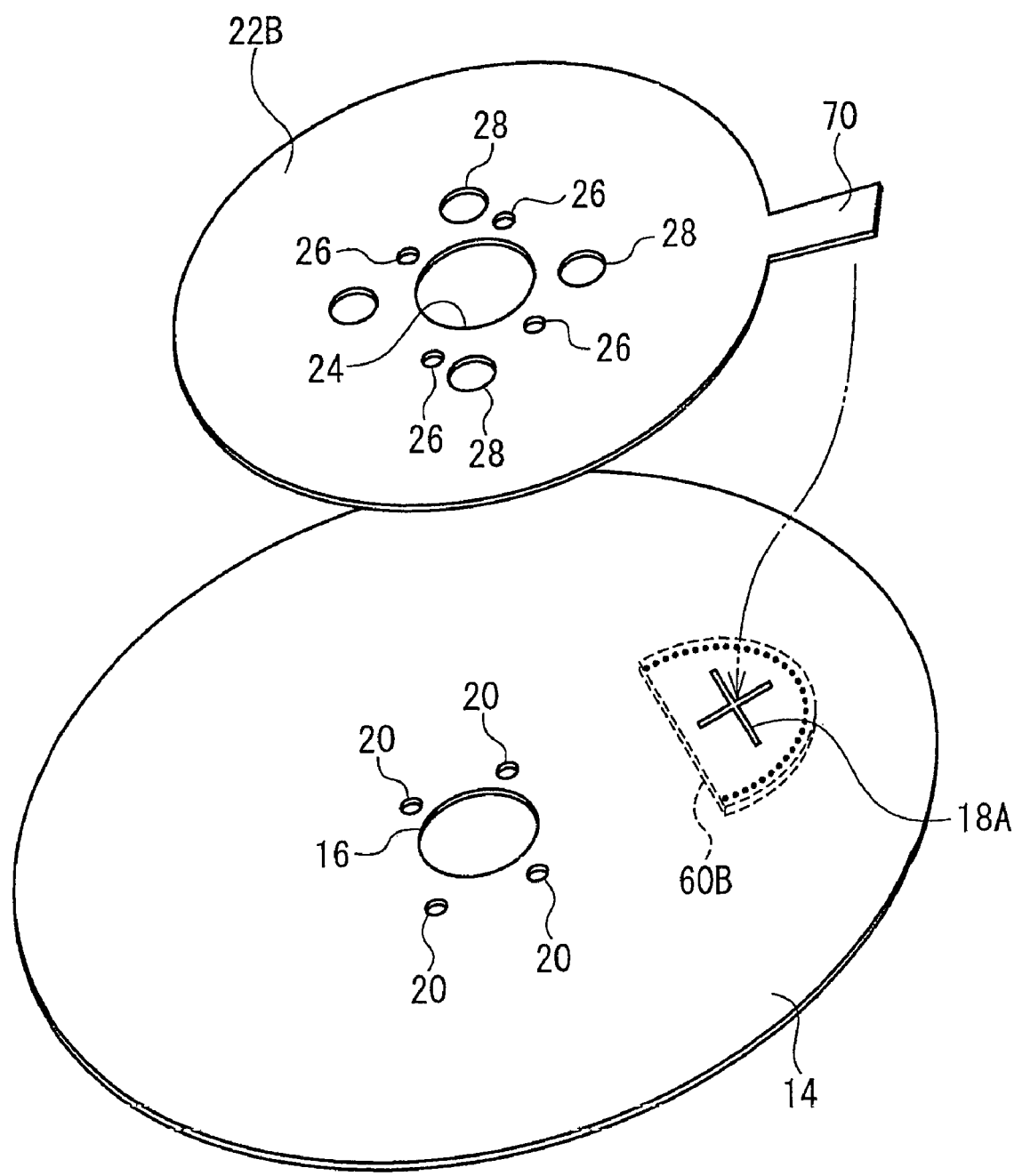
FIG. 24 is an exploded perspective view of the principal portion of the airbag according to the embodiment.

In the present invention, the vent hole may be configured into a slit shape. FIG. 24 is an exploded perspective view of a principal portion which shows an example of the airbag configured in this manner.

In the embodiment shown in FIG. 24, a slit-shaped vent hole 18a is provided on the rear panel 14 of the airbag 10 instead of providing the vent hole 18 of a circular opening shape thereon in the embodiment shown in FIG. 12 and FIG. 13 described above. As shown in the drawing, the vent hole 18a in this embodiment has a substantially cross-slit shape in which two lines of slits are intersected at a right angle. However, the shape of the slit of the vent hole is not limited thereto, and it may be various shapes such as a linear shape, a radial shape in which slits extend radially from the center in a plurality of directions, C-shape, L-shape or the like.

The lid member 60b covers the slit-shaped vent hole 18a from the outside of the airbag. The tether 70 as a joint member is passed through the slit-shaped vent hole 18a, and the lid member 60B and the inner panel 22b inside the airbag is connected via the tether 70.

Other configurations of this embodiment are the same as those in the embodiment shown in FIG. 12 and FIG. 13, and the same parts in FIG. 24 as in FIG. 12 and FIG. 13 are represented by the same reference numerals.

In this manner, with the employment of the slit-shaped vent hole 18A, gas leakage from the vent hole 18A in a state in which the vent hole 18A is covered by the lid member 60B when the airbag is inflated can be significantly constrained or prevented.

In other words, the slit-shaped vent hole 18A is in a state in which the surface area of the opening is very small or almost no opening exists as shown in the drawing unless the lid member 60B comes apart from the rear panel 14 and the peripheral portion of the vent hole 18A is projected between the lid member 60B and the rear panel 14, gas leakage from the vent hole 18A is significantly constrained.

When the passenger crashes into the inflated airbag, the airbag gets crushed, thereby generating a force pulling the lid member 60B inwardly of the airbag, whereby the lid member 60B comes apart from the rear panel 14 positioning the peripheral portion of the vent hole 18A between the lid member 60B and the rear panel 14. Therefore the surface area of the opening of the vent hole 18A when being opened is substantially the same as the vent hole 18 in the shape of a circular opening, so that gas is quickly discharged from the vent hole 18A.

In this embodiment, since the space between the lid member 60B and the rear panel 14 is opened toward the center of the rear panel 14, gas passed through the vent hole 18A is discharged through this space toward the center of the rear panel 14.

As a matter of course, in the respective embodiments other than the one shown in FIG. 12 and FIG. 13, the vent hole may be formed into a slit shape. However, in the present invention, the shape of the vent hole is not limited to the circular opening shape or the slit shape, and may be of other shape other than the one shown in the drawings.

Figure 25:
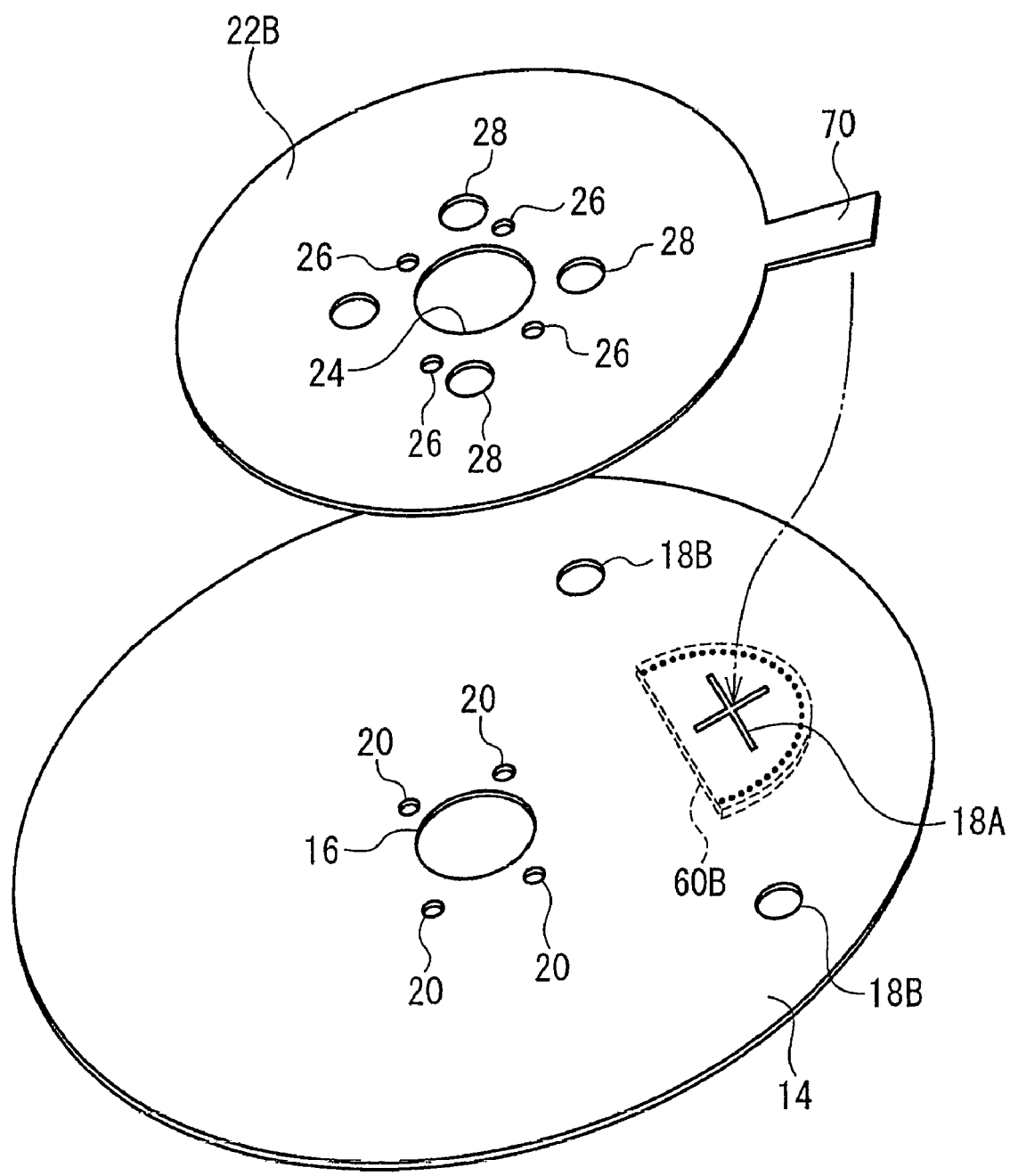
FIG. 25 is an exploded perspective view of the principal portion of the airbag according to the embodiment.

In the present invention, a vent hole on which the lid member is not mounted may be provided in addition to the vent hole with the lid member. FIG. 25 is an exploded perspective view of a principal portion of the airbag configured in this manner as an example.

In the above-described embodiment in FIG. 24, implementation of FIG. 25 is based on a configuration in which a constantly opened vent holes 18B which are not covered by the lid member (which communicates the inside and the outside of the airbag in a constantly opened state, in other words) are provided on the rear panel 14 separately from the slit-shaped vent hole 18A covered by the lid member 60B. In this embodiment, the constantly opened vent holes 18B are formed into a circular opening, and are provided on both side of the vent hole 18A with the lid member so as to interposed the same therebetween. However, the shape, the number and the arrangement of the constantly opened vent hole 18B are not limited thereto.

Other configurations of this embodiment are the same as those in the embodiment shown in FIG. 24.

In this manner, in the airbag provided with the constantly opened vent hole 18B, even in the course of inflation of the airbag, gas in the airbag is discharged to the outside of the airbag through the constantly opened vent holes 18B. Thereafter, when the passenger crashes into the inflated airbag and the airbag gets crushed, a force which has been pulling the lid member 60B toward the inside of the airbag is released, and the lid member 60B comes apart from the vent hole 18A, so that the vent hole 18A is opened. Consequently, gas is quickly discharged from the airbag through both of the opened vent hole 18A provided with the lid member 60B and the constantly opened vent holes 18B.

In the respective embodiments other than the one shown in FIG. 24 as well, the constantly opened vent hole may be provided separately from the vent hole with the lid member.

Figure 26:
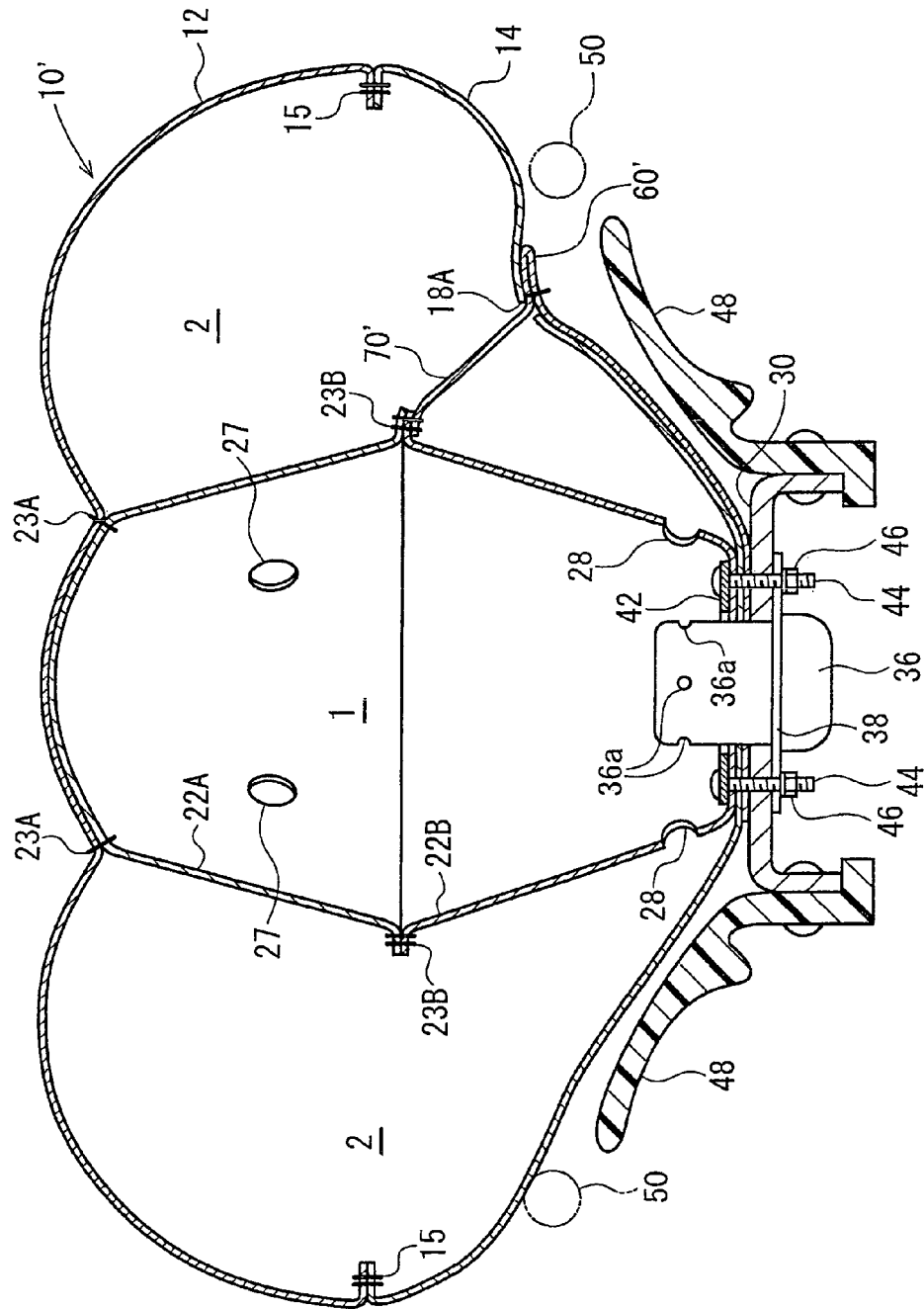
FIG. 26 is a cross-sectional view of the airbag and the airbag apparatus according to the embodiment.
Figure 27:
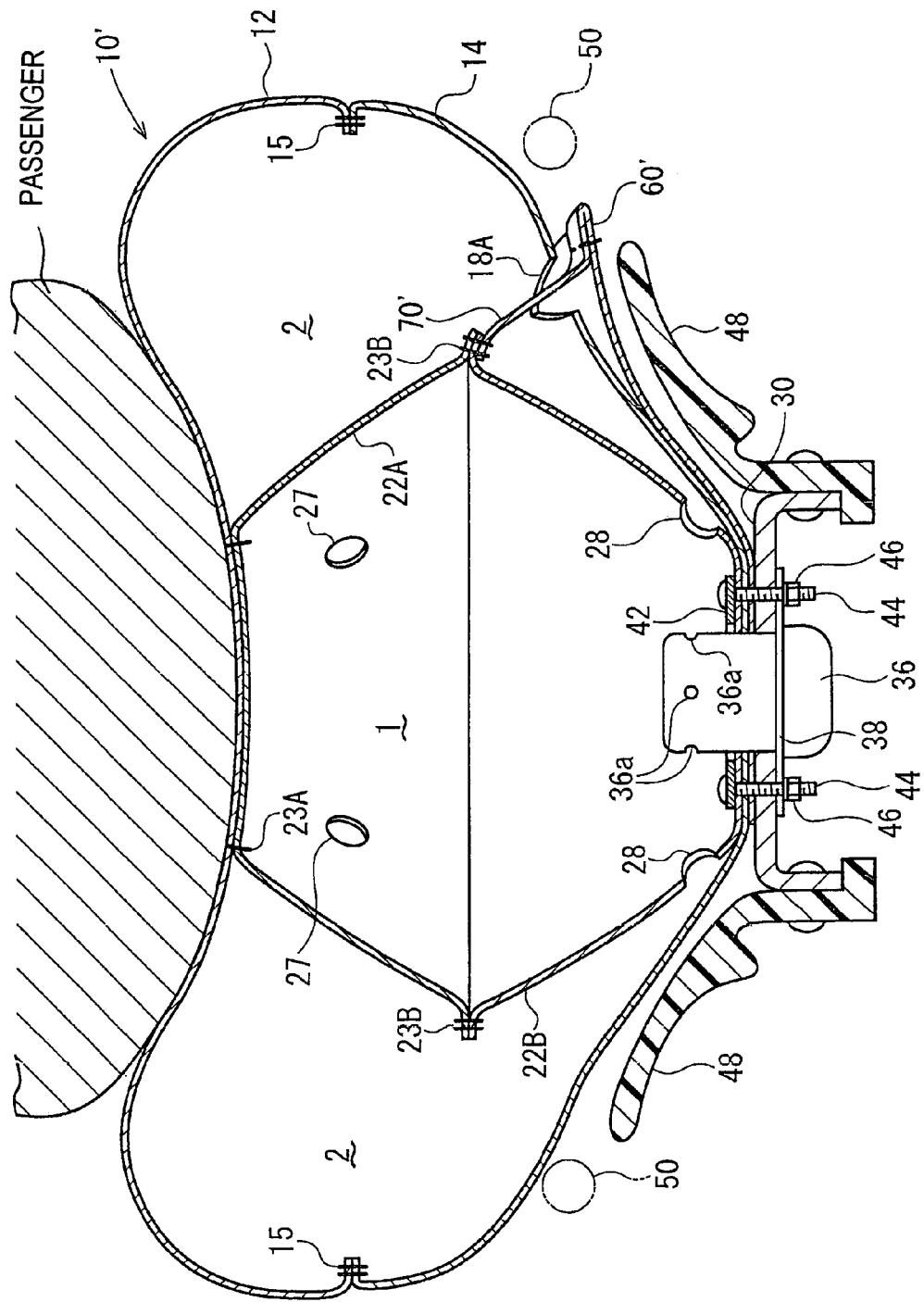
FIG. 27 is a cross-sectional view of the airbag and the airbag apparatus shown in FIG. 26 when the passenger is received.

In the present invention, the lid member and the joint member for connecting the lid member with the interior of the airbag may be integrated. FIG. 26 and FIG. 27 are cross-sectional views of the airbag apparatus provided with an airbag 10' configured in this manner. FIG. 26 shows a state before the passenger is received, and FIG. 27 shows a state after the passenger is received.

In the embodiment shown in FIG. 1 to FIG. 4(b), the tether 70 as the joint member is integrally provided on the inner panel 22B in the interior of the airbag, and the distal end of the tether 70 is stitched to the lid member 60 so that the inner panel 22B and the lid member 60 are connected. However, in the airbag 10' of the embodiment shown in FIGS. 26 and 27, lid member 60' with tether 70' is provided and the distal end of the tether 70' is stitched to the inner panels 22A, 22B whereby the inner panels 22A, 22B and the lid member 60' are connected.

In this embodiment as well, the slit-shaped vent hole 18A as in the respective embodiments shown in FIGS. 24 and 25 is provided on the rear panel 14 of the air bag 10', and the vent hole 18A is covered by the lid member 60' from the outside of the airbag.

In this embodiment, the lid member 60' and the tether 70' are configured from a length of base cloth, and the tether 70' extends from the outer edge of the lid member 60'. The tether 70' is folded on the proximal side back to a portion of the lid member 60' which is superimposed on the vent hole 18A and is fixed to this portion with a seam (reference numeral is omitted).

The tether 70' is pulled into the interior of the airbag 10' through the vent hole 18A, and the distal end is stitched to the inner panels 22A, 22B. In this embodiment, the tether 70' is stitched together with the peripheral edges of the inner panels 22A, 22B by the seam 23B which stitches them together. However, the stitching position of the tether 70' is not limited thereto.

Other configurations of the airbag 10' are the same as those of the airbag 10 in FIGS. 1 to 4(*b*), and the mode of operation is also the same.

In this manner, with the configuration in which the lid member 60' and the tether 70' are integrated, the manufacturing process for the respective members of the airbag 10' and the stitching process for the entire airbag 10' can be simplified.

As a matter of course, in the respective embodiments other than those shown in FIGS. 1 to 4(*b*), the lid member and the joint member (tether) may be formed integrally.

In the present invention, the integrating structure of the lid member and the joint member (tether) is arbitrary, and is not limited to a specific mode. For example, in the embodiment shown in FIGS. 26 and 27, the tether 70' extended from the outer edge of the lid member 60' is folded back to the portion of the lid member 60' which is superimposed on the vent hole 18A and is passed through the vent hole 18A. However, a configuration in which the tether is directly extended from a position to be superimposed on the vent hole of the lid member may be employed.

Figure 28:
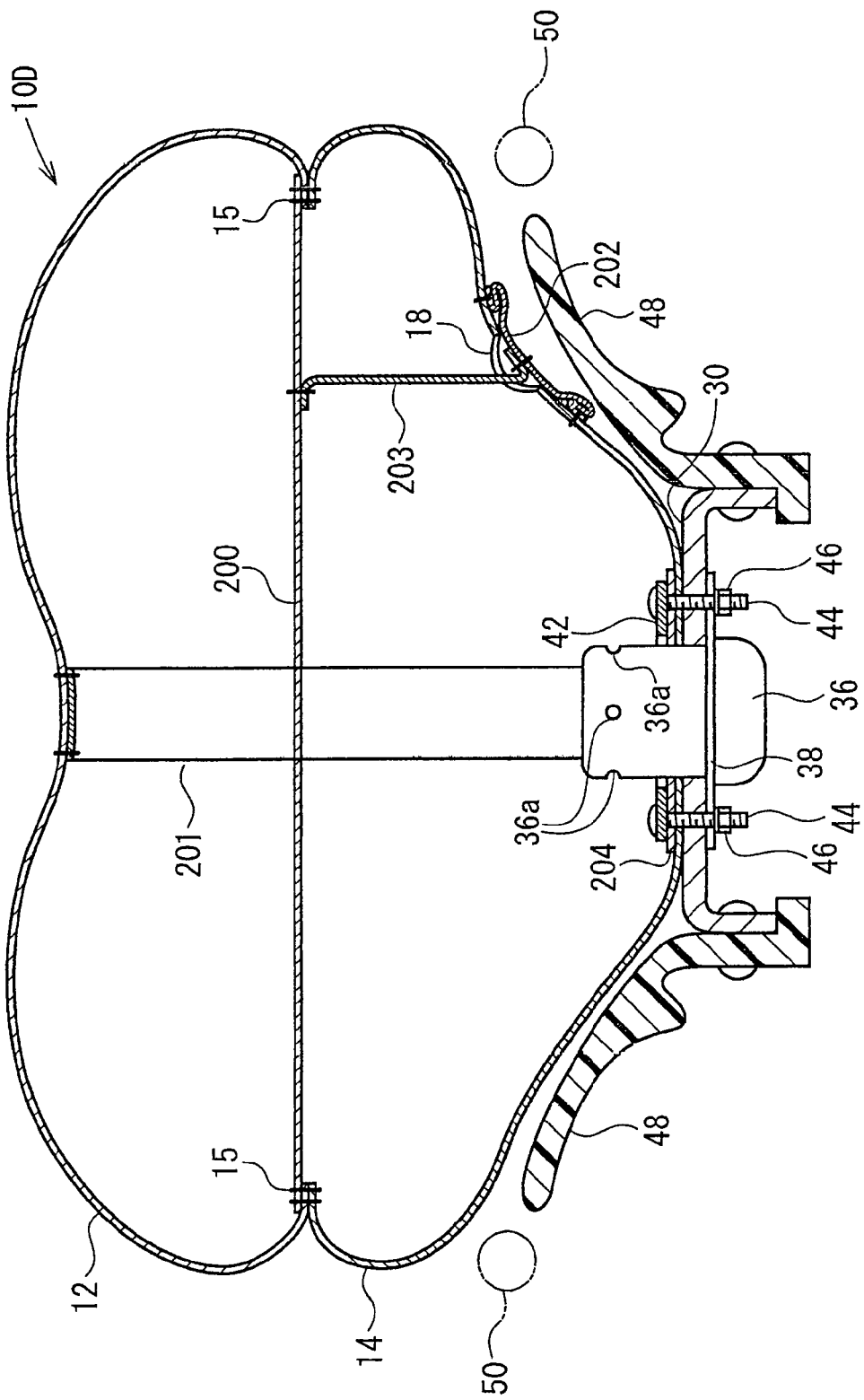
FIG. 28 is a cross-sectional view of the airbag and the airbag apparatus according to the embodiment.
Figure 29:
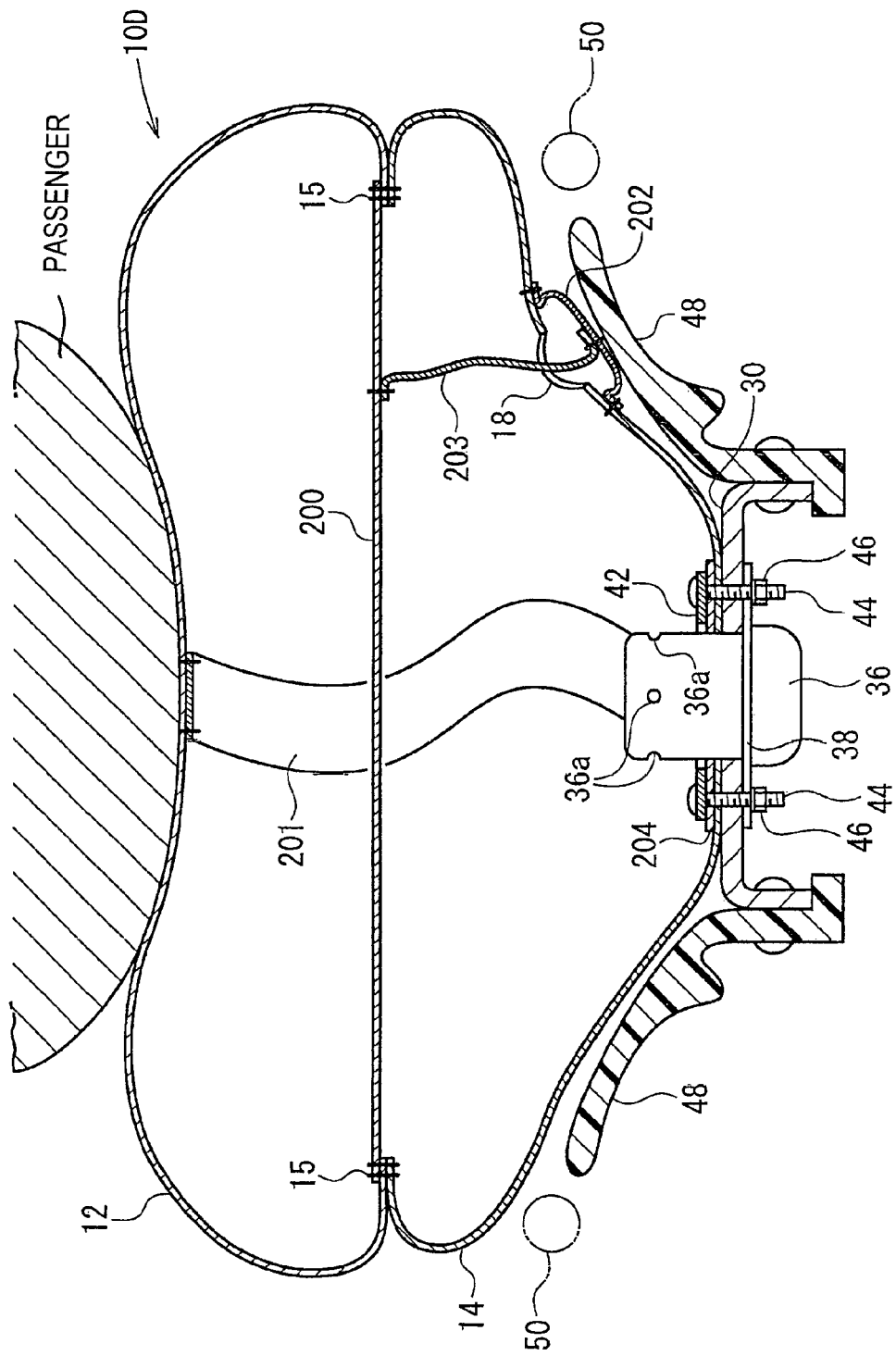
FIG. 29 is a cross-sectional view of the airbag and the airbag apparatus in FIG. 28 when the passenger is received.

FIG. 28 and FIG. 29 are cross-sectional views of the airbag apparatus according to still another embodiment. FIG. 28 shows a state before receiving the passenger, and FIG. 29 shows a state in which the passenger is received.

An airbag 10D in this embodiment includes a front panel 12 which constitutes a passenger-facing surface, a rear panel 14 which constitutes an outer surface on the opposite side from the passenger-facing surface, a suspension belt 200 as an internal member which extends across the interior of the airbag 10D and connects the side portions of the airbag 10D. Airbag 10D further comprises a suspension belt 201 for connecting the front panel 12 and the rear panel 14, a vent hole 18 for connecting the inside and the outside of the airbag 10D, a lid member 202 for constraining gas from flowing out from the vent hole 18, and a tether 203 as a joint member for connecting the lid member 202 to the suspension belt 200.

In this embodiment as well, the outer shell of the bag-shaped airbag 10D is formed by stitching the outer peripheral edges of the front panel 12 and the rear panel 14 with respect to each other by the seam 15. The suspension belt 200 extends in the radial direction of the airbag 10D, and both ends thereof are stitched respectively to the outer peripheral edges of the front panel 12 and the rear panel 14 by the seam 15. The suspension belt 200 prevents or constrains the airbag 10D from being protruded to the lateral sides more than a predetermined extent when the airbag 10D is inflated.

The suspension belt 201 is connected to a patch cloth 204 which is stitched at one end thereof to the peripheral edge of an opening (reference numeral is omitted) for an inflator formed on the rear panel 14, and at the other end thereof to a portion of the front panel 12 near the center thereof by a seam (reference numeral is omitted). The suspension belt 201 prevents or constrains the airbag 10D from being protruded to toward the passenger more than the predetermined extent.

Although the vent hole 18 is formed into a circular opening in this embodiment, the shape of the opening of the vent hole is not limited thereto. The vent hole 18 is arranged at a position which does not overlap with a steering wheel 50.

The lid member 202 which covers the vent hole 18 is configured in such a manner that a tuck (reference numeral is omitted) is formed along a pair of opposed sides which are stitched to the rear panel 14 as in the case of the lid member 67 in the embodiment shown in FIGS. 17(*a*) to 18(*b*) shown above, and the lid member 202 moves apart from the vent hole 18 while stretching the tuck upon the opening operation of the vent hole 18.

The tether 203 is stitched at one end thereof to the lid member 202 via the vent hole 18, and at the other end thereof to a midsection of the suspension belt 200 in the extending direction (that is, in the radial direction of the airbag 10D).

Other configurations of the airbag apparatus provided with the airbag 10D are the same as those in the respective embodiments described above.

When the airbag 10D is inflated, the suspension belt 200 is tensioned across the interior of the airbag 10D, whereby excessive protrusion of the airbag 10D toward the lateral sides is constrained as shown in FIG. 28. In addition, the suspension belt 201 is tensioned between the front panel 12 and the rear panel 14, whereby the excessive protrusion of the airbag 10D toward the passenger is constrained. As shown in the drawing, the lid member 202 is pulled inwardly of the airbag 10D via the tether 203 in association with the tension of the suspension belt 200, and the vent hole 18 is closed by the lid member 202. Accordingly, the inner pressure of the airbag 10D is quickly increased to a high pressure, and earlier inflation of the airbag is ensured.

Subsequently, when the passenger crashes into the inflated airbag 10D, the front panel 12 of the airbag 10D is pressed by the passenger, and is moved toward the rear panel 14, and the suspension belt 200 is moved backward correspondingly, whereby the force to pull the lid member 202 inwardly of the airbag 10D is released. Accordingly, the lid member 202 comes apart from the vent hole 18 by a gas pressure in the airbag 10D, and the vent hole 18 is opened. Consequently, gas is discharged from the airbag 10D through the vent hole 18, and an impact to be applied to the passenger is absorbed.

In the airbag 10D, crushing (backward movement of the front panel 12) can be sensed over a relatively wide range of the front panel 12. In other words, not only when the passenger crashes into a center portion of the front panel 12 of the inflated airbag 10D as a matter of course, but also when he or she moves a portion of the front panel 12 on the relatively outer peripheral side thereof backward, the suspension belt 200 which connects the side portions of the airbag 10D across the interior of the airbag 10D can move backward in association with the backward movement of the front panel 12, and release the force to pull the lid member 202 inwardly of the airbag to open the vent hole 18.

In the airbag 10D, since the suspension belt 200 is disposed so as to connect the side portions of the airbag 10D across the interior of the airbag 10D, the flexibility in arrangement of the vent hole 18 is high.

In this embodiment, the suspension belt 200 extends linearly across the airbag 10D. However, it may be configured in such a manner as to be branched en route and extend across the airbag in a plurality of directions. Two or more suspension belts may be arranged so as to extend across the airbag. The internal member to be disposed so as to extend across the interior of the airbag is not limited to a specific mode, and may be such that, for example, an inner panel which extends across the airbag and partitions the interior of the airbag into a passenger side and an opposite side instead of the suspension belt and the lid member may be connected to the inner panel via a tether (joint member).

Figure 30:
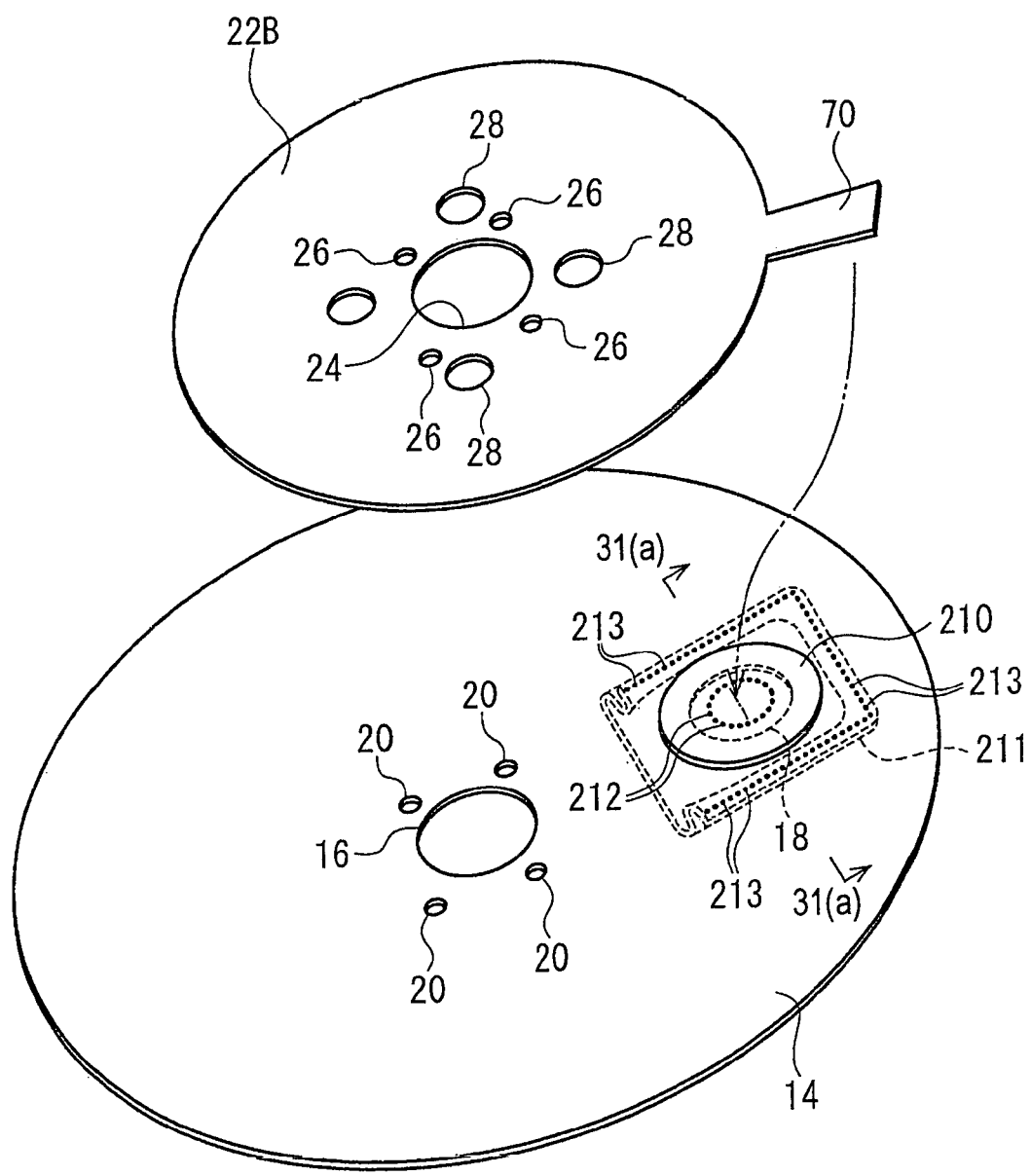
FIG. 30 is an exploded perspective view of the principal portion of the airbag according to the embodiment.
Figure 31:
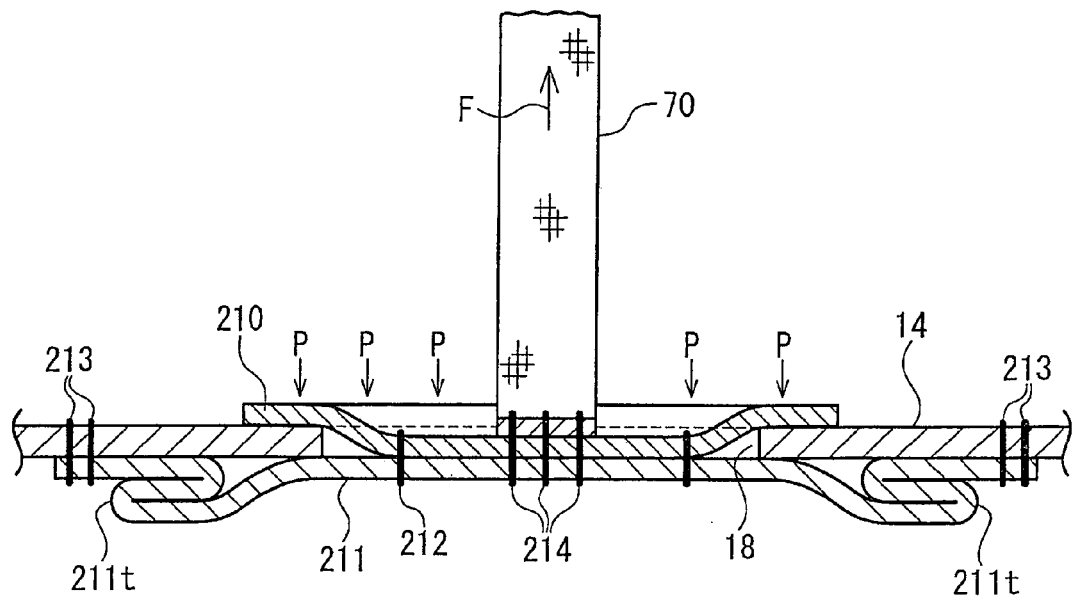
FIG. 31(a) is a cross-sectional view showing the vent hole opening of the airbag before, opening taken along the line 31(a)-31(a) in FIG. 30.
FIG. 31(b) is a cross-sectional view showing the vent hole opening of the airbag after opening shown in FIG. 31(a).
Figure 31:
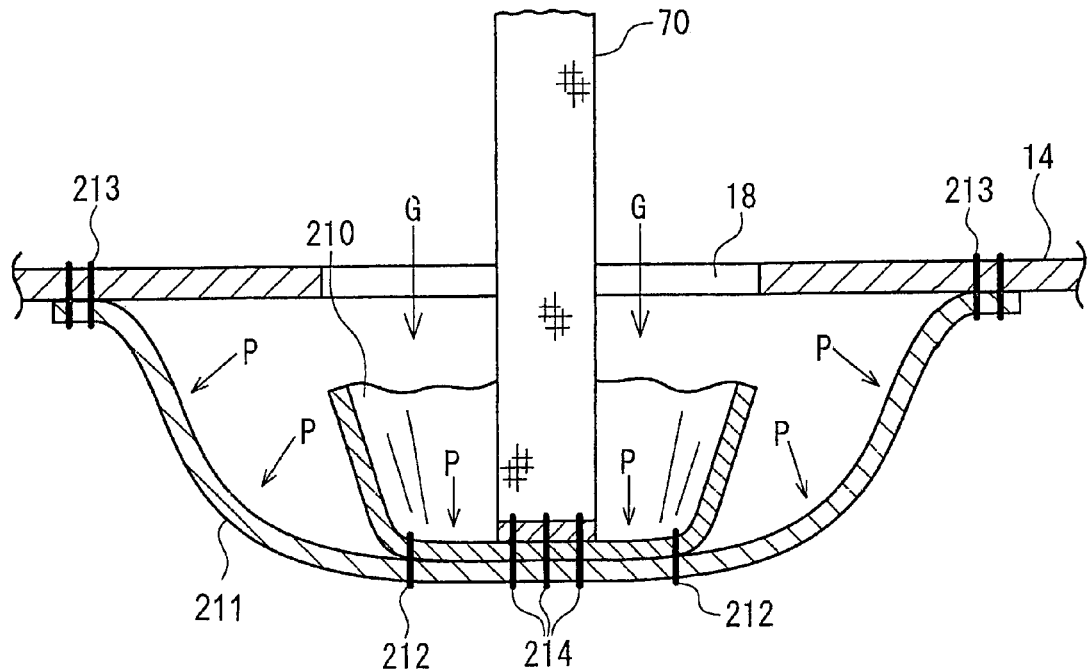

FIG. 30 is an exploded perspective view of a principal portion of an airbag according to still another embodiment. FIGS. 31(a) and 31(b) are cross-sectional views taken along the line 31(a)-31(a) in FIG. 30 schematically showing a vent hole opening operation of this airbag. FIG. 31(a) shows a state before opening the vent hole, and FIG. 31(b) shows a state after the vent hole is opened.

In this embodiment, an auxiliary lid member 210 for covering the vent hole 18 formed on the rear panel 14 of the airbag from the inside of the airbag is provided. A lid member 211 covers the vent hole 18 from the outside of the airbag. In this embodiment, the vent hole 18 is formed into a circular opening.

In this embodiment, the auxiliary lid member 210 is formed of a circular sheet having a diameter larger than the vent hole 18. This auxiliary lid member 210 is superimposed on the vent hole 18 in substantially concentrically from the inside of the airbag and is stitched to the lid member 211 on the outside of the airbag via a seam 212. The auxiliary lid member 210 and the rear panel 14 are not connected.

The material of the auxiliary lid member 210 is not specifically limited. However, it is preferable to form the auxiliary lid member 210 of soft material such as cloth of the same type as or a different type of the base cloth of the airbag, silicon, rubber paper or the like.

The lid member 211 is formed of a substantially square sheet in this embodiment, and is stitched to the rear panel 14 (peripheral portion of the vent hole 18) between a pair of opposed sides and a side intersecting thereto via a seam 213. A remaining side of the lid member 211 is not stitched to the rear panel 14, and kept free. This free side is located on the side of the center of the rear panel 14.

In this embodiment, the lid member 211 is loosened when the lid member 211 is stitched to the rear panel 14 by the seam 213 in the same manner as lid members 67, 202 in the respective embodiments in FIGS. 17 and 18, and FIGS. 28 and 29, described above, and a tuck 211t (See FIG. 31(a), in which only a tuck 211t which is formed along the pair of opposed sides is shown) is formed along the three sides to be stitched by the seam 213.

The distal end of the tether 70 passes through the vent hole 18 and is joined to the lid member 211 via the auxiliary lid member 210 and the vent hole 18. Accordingly, the lid member 211 and the inner panel 22B, on the side of the interior of the airbag, are connected via the tether 70.

In this embodiment, the seam 212 for connecting the auxiliary lid member 210 and the lid member 211 are extended so as to draw a circle having a diameter smaller than the vent hole 18 substantially concentrically with the vent hole 18, and the tether 70 is stitched to the position near the center thereof by a seam 214. The seam 214 connects the distal end of the tether 70, the central portion of the auxiliary lid member 210 and the central portion of the lid member 211 together.

Other configurations of this embodiment are the same as the embodiment in FIGS. 12 and 13, and the same parts are represented by the same reference numerals.

In this embodiment, when the airbag is inflated, the lid member 211 is pulled inwardly of the airbag by the inner panel 22B via the tether 70 so as to superimposed on the vent hole 18 from the outside of the airbag, and the auxiliary lid member 210 is superimposed on the vent hole 18 from the inside of the airbag as shown in FIG. 31(a). Since the auxiliary lid member 210 is supported by the lid member 211 via the vent hole 18 from the outside of the airbag, it is not pushed out of the airbag through the vent hole 18 by the gas pressure in the airbag, and is tightly adhered to the peripheral edge of the vent hole 18. Accordingly, the desirable closure of the vent hole 18 is achieved.

Reference sign F in FIG. 31(a) designates a tensile force (a force to pull the lid member 211 inwardly of the airbag) acting on the tether 70, and reference sign P designates a gas pressure in the airbag acting on the auxiliary lid member 210 and the lid member 211.

When the passenger crashes into the inflated airbag and hence the airbag gets crushed, and the force F to pull the lid member 211 inwardly of the airbag is released correspondingly, as shown in FIG. 31(b), the lid member 211 comes apart from the vent hole 18 and the auxiliary lid member 210 gets relief from support by the lid member 211 from the outside of the airbag and is pushed out of the airbag through the vent hole 18 by the gas pressure within the airbag. Accordingly, the vent hole 18 is brought into an opened state, and gas is discharged from the airbag through the vent hole 18. Reference sign G of FIG. 31(b) designates gas flow discharged from the airbag through the vent hole 18.

In this case, the lid member 211 starts to swell so as to stretch the tuck 211t. Therefore, not only the flow of the gas from the vent hole 18, but also the movement of the auxiliary lid member 210 out of the airbag is carried out smoothly.

In this embodiment, the vent hole 18 is formed into a circular opening shape. However, it may be of other shapes such as a slit-shape or a square shape. The auxiliary lid member 210 is not limited to the circle, but may be of various shapes corresponding to the shape of the vent hole. The shape of the lid member 211 is also not limited to the square shape, but may be various shapes.

The configuration of this embodiment is such that the auxiliary lid member 210 covers the vent hole 18 from the inside of the airbag, and is connected to the lid member 211 outside of the airbag via the vent hole 18. However, the configuration of the auxiliary lid member in the present invention is not limited thereto. (For example, the auxiliary lid member in the present invention may be arranged between the lid member and the outer surface of the airbag, and may be arranged both inside the airbag and between the lid member and the outer surface of the airbag.).

Figure 32:
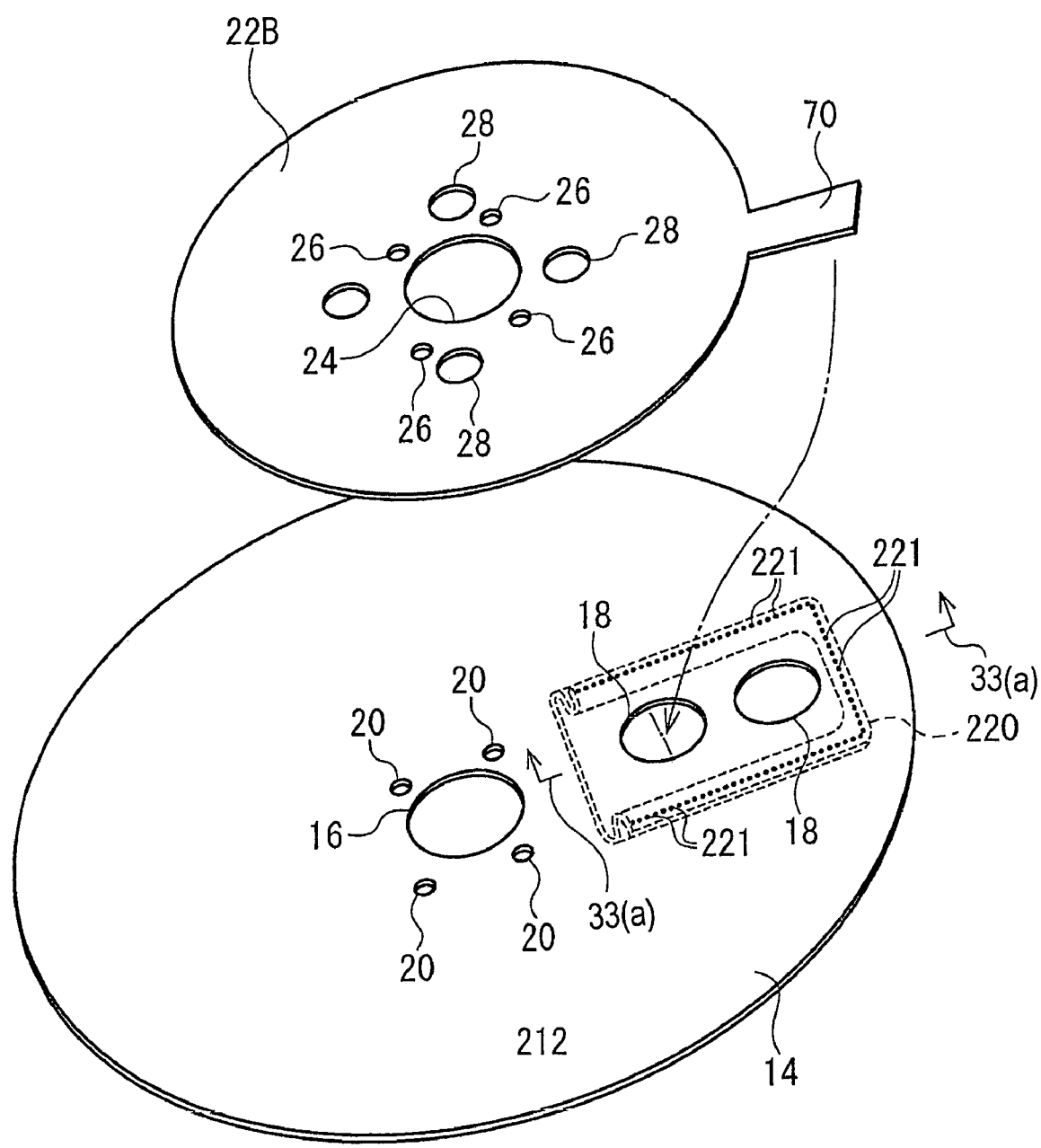
FIG. 32 is an exploded perspective view of the principal portion of the airbag according to the embodiment.
Figure 33:
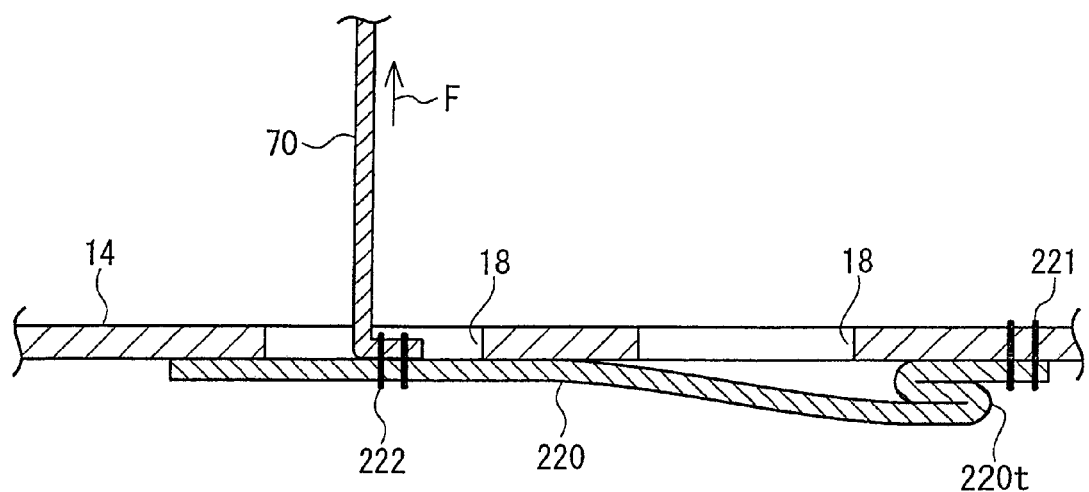
FIG. 33(a) is a cross-sectional view of the vent hole opening prior to opening taken along the line 33(a)-33(a) in FIG. 32.
FIG. 33(b) is a cross-sectional view of the vent hole opening after opening shown in FIG. 33(a).
Figure 33:
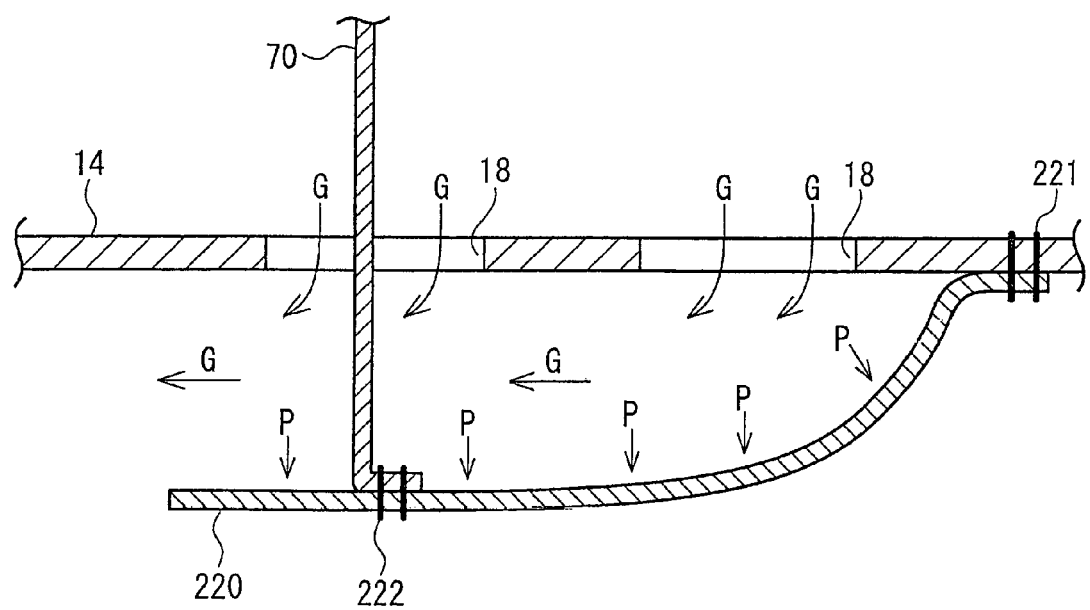

FIG. 32 is an exploded perspective view of the airbag according to still another embodiment, and FIGS. 33(a) and 33(b) are cross-sectional views showing a vent hole opening action of the airbag taken along the line 33(a)-33(a) in FIG. 32. FIG. 33(a) shows a state before the vent hole is opened, and FIG. 33(b) shows a state after the vent hole is opened.

In this embodiment, a plurality of vent holes 18 are provided on the rear panel 14 of the airbag, and are covered by a common lid member 220 from the outside of the airbag.

More specifically, in this embodiment, two vent holes 18 are provided on the rear panel 14. These vent holes 18, 18 are arranged adjacently on the rear panel 14 at positions different from each other on the outer peripheral side and the center side as shown in FIG. 32. The vent holes 18, 18 in this embodiment are both formed into a circular opening shape.

The lid member 220 is a sheet of a substantially rectangular shape in this embodiment, is arranged with the longitudinal direction thereof oriented in the radial direction of the rear panel 14, covers one of the vent holes 18 by a half portion of the longitudinal direction, and covers the other vent hole 18 with the other half portion thereof. A pair of the long sides of the lid member 220 and the short side of the rear panel 14 on the outer peripheral side thereof are stitched to the rear panel 14 by a seam 221, and the short side of the rear panel 14 on the center side is not stitched to the rear panel 14 and is kept free. In other words, in this embodiment as well, a space between the lid member 220 and the rear panel 14 is opened toward the center of the rear panel 14.

In this embodiment as well, a tuck 220t (See FIG. 33(a), in which only the tuck 220t provided along the short side of the rear panel on the outer peripheral side is shown in the drawing) is formed along the three sides stitched by the seam 221 by loosening the lid member 220 when stitching the lid member 220 to the rear panel 14 by the seam 221.

In this embodiment, the distal end of the tether 70 is connected to the lid member 220 through the vent hole 18 positioned on the center side of the rear panel 14, that is, the vent hole 18 which is located closer to the opened portion of the lid member 220, and the lid member 220 and the inner panel 22B on the inner side of the airbag are connected via the tether 70. Reference numeral 222 designates a seam which connects the tether 70 to the lid member 220.

Other configurations in this embodiment are the same as those in the above-described embodiment in FIGS. 12, 13, and the same parts are represented by the same reference numerals.

In this embodiment, when the airbag is inflated, the lid member 220 is pulled inwardly of the airbag by the inner panel 22B via the tether 70 and is superimposed on the rear panel 14 from the outside of the airbag, thereby closing the both vent holes 18, 18. In this case, since the tether 70 pulls a portion of the lid member 220 near the opening, the portion of the lid member near the opening comes into tight contact with the rear panel 14. Accordingly, the desirable closure of the opening by the lid member 220 is achieved.

When the passenger crashes into the inflated airbag and hence the airbag gets crushed, and the force F to pull the lid member 220 inwardly of the airbag is released correspondingly, the lid member 220 comes apart from the rear panel 14 by the gas pressure in the airbag as shown in FIG. 33B to bring both vent holes 18, 18 into an opened state, whereby the gas is discharged from the airbag.

In this embodiment, since the lid member 220 starts to be swelled so as to stretch the tuck 220t, the gas is discharged from the vent hole 18 smoothly.

In this embodiment, since the two vent holes 18, 18 are covered by a single lid member 220, the number of components can be reduced, and simplification of the airbag sewing operation and reduction of the cost of the members can be achieved.

In this embodiment, two vent holes are provided. However, three or more vent holes may be provided. In this case, the number of the vent holes to be covered by a single lid member is not limited. As described above, the shape of the vent hole or the lid member is not limited to the one shown in the drawing.

Figure 34:
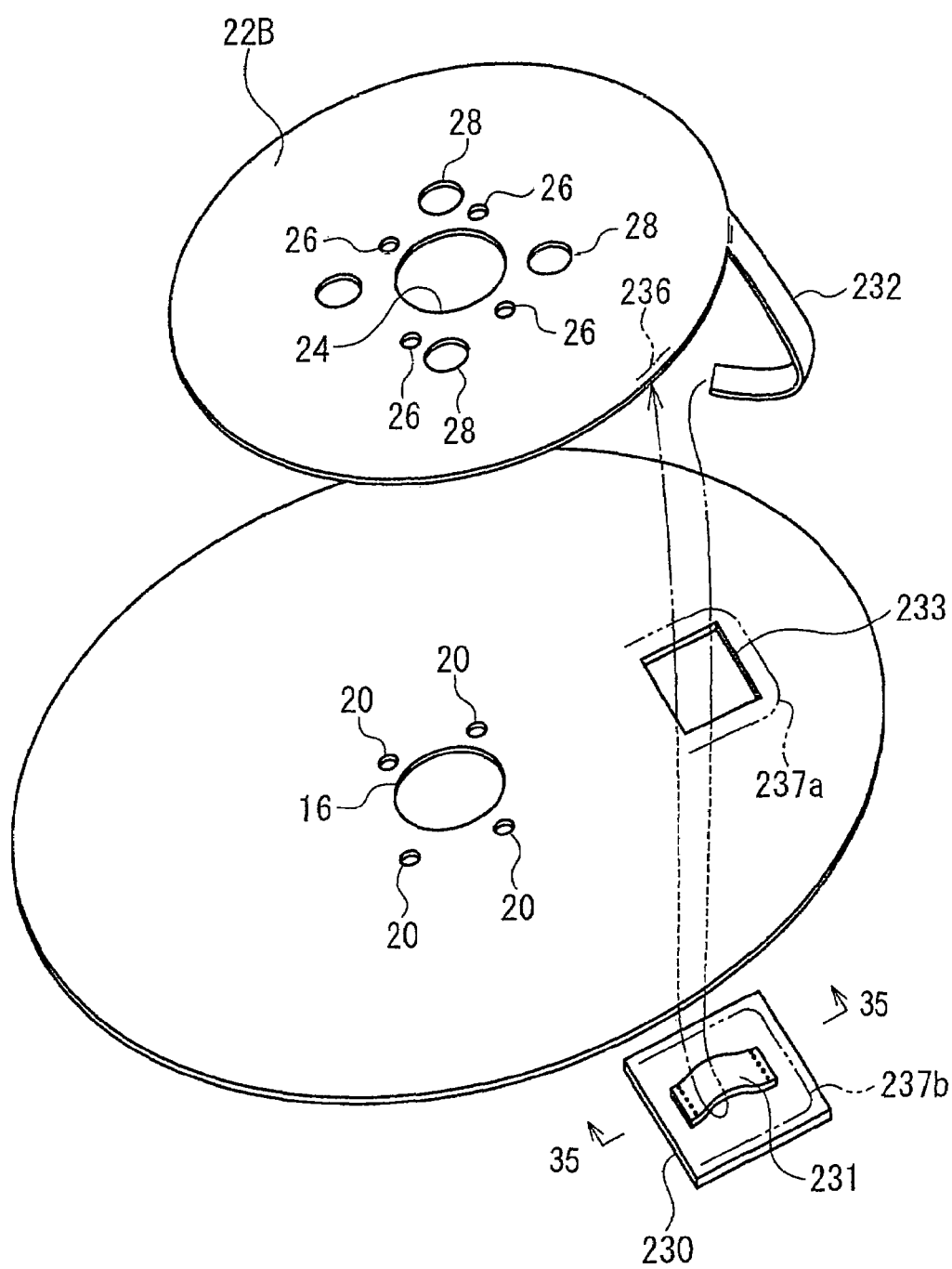
FIG. 34 is an exploded perspective view of the principal portion of the airbag according to the embodiment.
Figure 35:
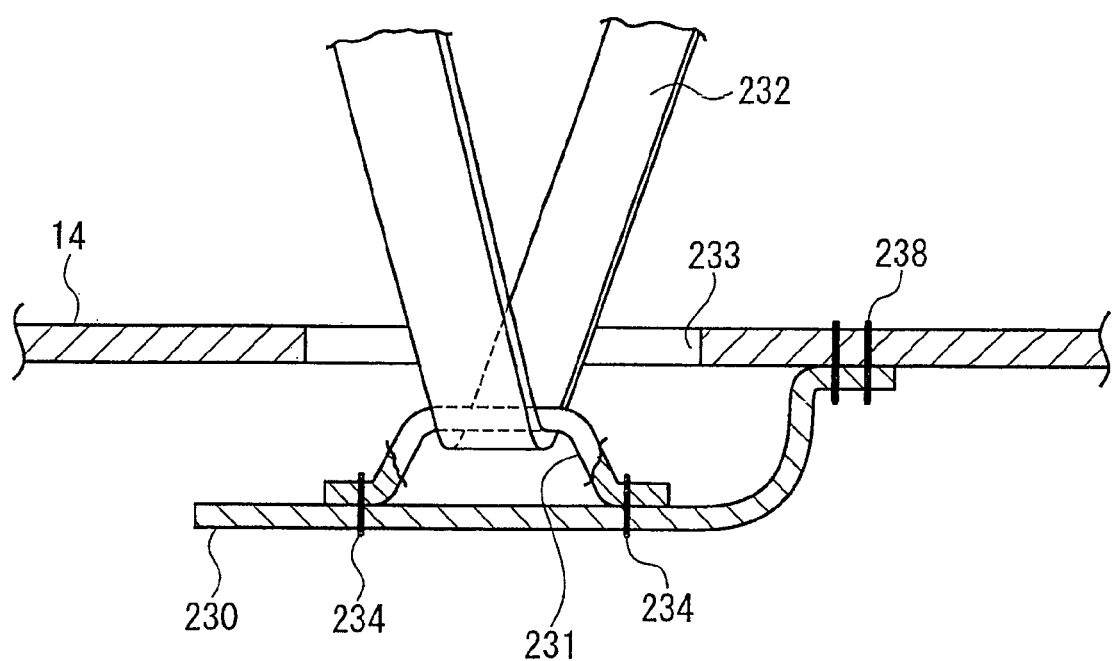
FIG. 35 is a cross-sectional view taken along the line 35-35 in FIG. 34.

FIG. 34 is an exploded perspective view of a principal portion of the airbag according to still another embodiment, and FIG. 35 is a cross-sectional view schematically showing a connecting structure between the lid member and the tether taken along the line 35-35 in FIG. 34. FIG. 35 shows a state in which the vent hole is opened.

In this embodiment, a tether run-through member 231 is provided on a portion of the lid member 230 opposing the vent hole and the midsection of the tether 232 which is connected to the inner panel 22B on the inner side of the airbag is inserted into the tether run-through member 231 via a vent hole 233. Accordingly, the lid member 230 and the inner panel 22B are connected via the tether 232. In this embodiment, although the lid member 230 and the vent hole 233 are formed into the substantially square shape respectively, the shape of these members is not limited thereto.

The tether run-through member 231 in this embodiment is formed of a small cloth of a substantially rectangular shape. A pair of sides of the small cloth of the rectangular shape are stitched to the lid member 230. Reference numeral 234 (FIG. 35) represents a seam which stitches the cloth to the lid member 230. The tether 232 is passed from a remaining pair of sides of the cloth between the cloth and the lid member 230.

The tether 232 is integrally formed with the inner panel 22B and one end thereof is connected to the inner panel 22B in this embodiment. The tether 232 is slidably inserted into the tether run-through member 231 and then is folded back and stitched at the extremity to the inner panel 22B. Reference numeral (double-dashed line) 236 in FIG. 34 designates the stitched position at the extremity of the tether 232.

Reference numerals (double-dashed lines) 237a, 237a in FIG. 34 designate a predetermined stitching line between the lid member 230 and the rear panel 14, and reference numeral 238 in FIG. 35 designates a seam stitching the lid member 230 and the rear panel 14. The mounting method of the lid member 230 with respect to the rear panel 14 is the same as the mounting method of the lid member 211 to the rear panel 14 in the embodiment shown in FIGS. 30 to 31(b).

Other configurations of this embodiment are the same as those in the embodiment shown in FIGS. 12 and 13, and the same parts are represented by the same reference numerals. The operation of the airbag apparatus in this embodiment is also the same as the one in the embodiment shown in FIGS. 12 and 13. In this embodiment, since the tether 232 is slidably connected to the lid member 230 via the tether run-through member 231, an application of an excessive force to a joint portion between the tether 232 and the lid member 230 is prevented or constrained.

Figure 36:
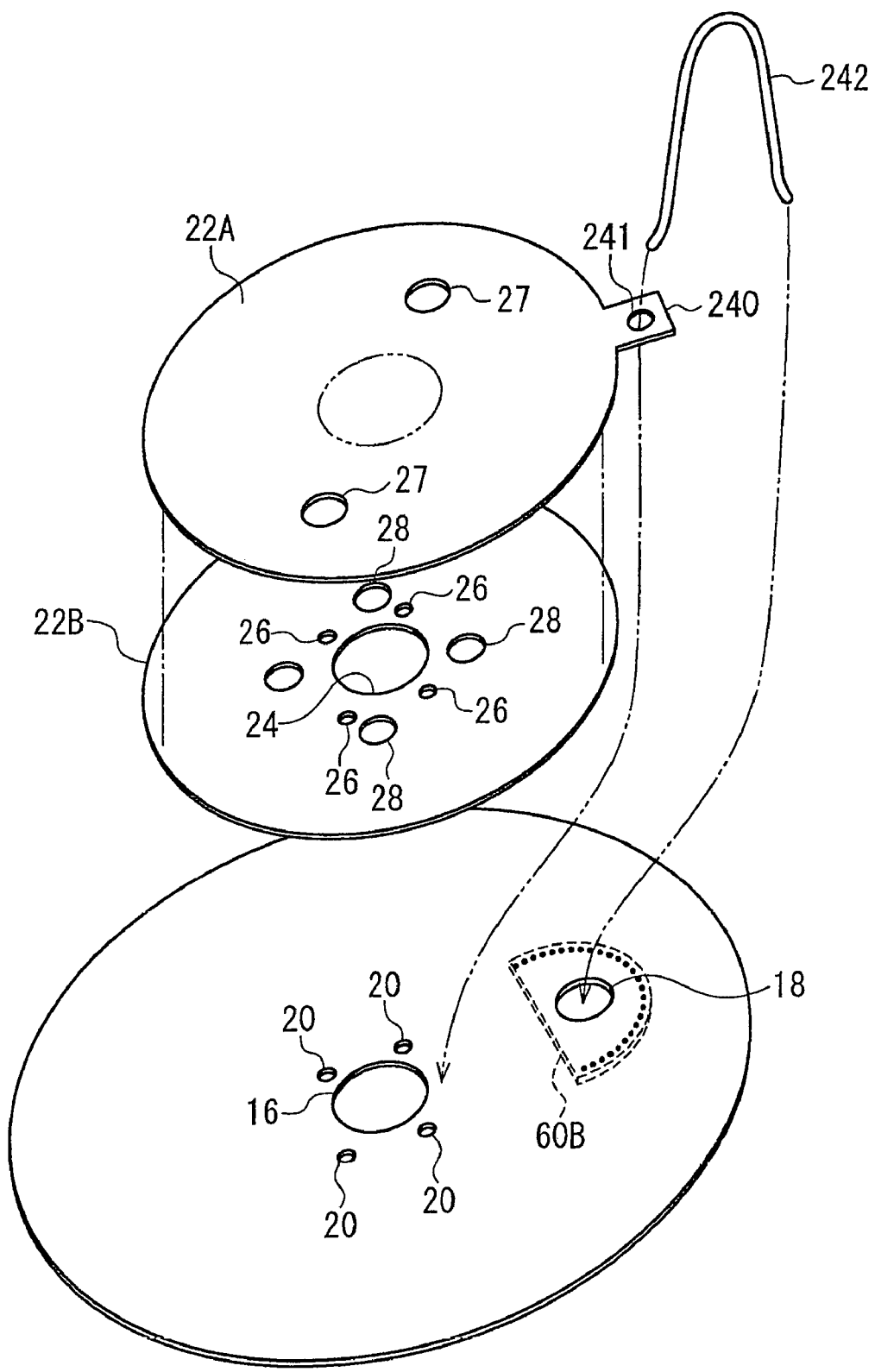
FIG. 36 is an exploded perspective view of the principal portion of the airbag according to the embodiment.
Figure 37:
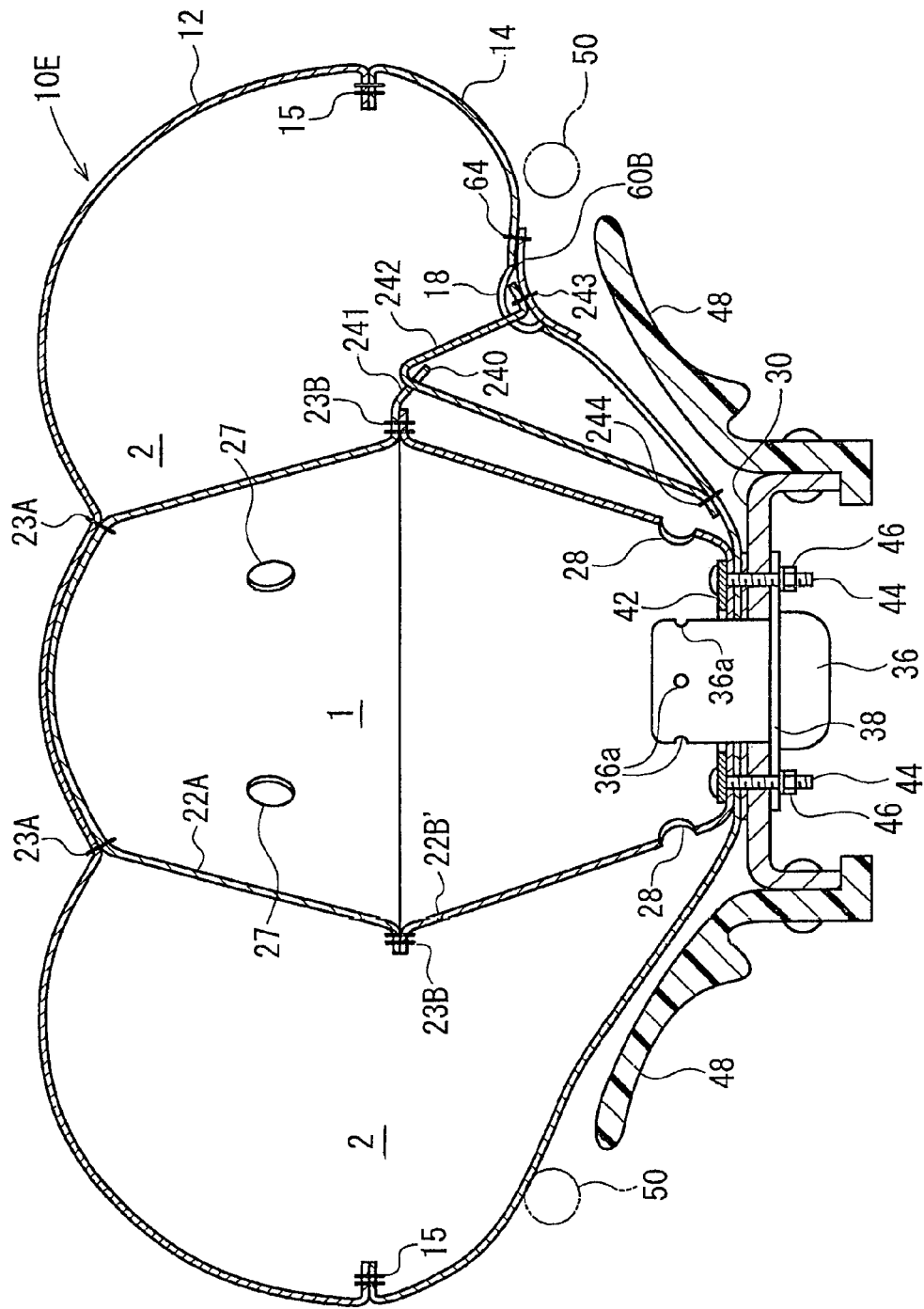
FIG. 37 is a vertical cross-sectional view of the airbag apparatus provided with the airbag shown in FIG. 36.

FIG. 36 is an exploded perspective view of a principal portion of an airbag according to still another embodiment, and FIG. 37 is a vertical cross-sectional view of the airbag apparatus provided with this airbag.

An airbag 10E in this embodiment is similar to the airbag 10B' in the above described embodiment shown in FIGS. 12 and 13, but it is configured in such a manner that a tether run-through member 240 is provided on the peripheral edge of the first inner panel 22A, the midsection of the tether 242 is slidably passed through an insertion hole 241 of the tether run-through member 240, and one end of the tether 242 is stitched to the lid member 60B and the other end is stitched to the position near the center of the rear panel 14. Reference numeral 243 in FIG. 35 shows a seam stitching the one end of the tether 242 to the lid member 60B, and reference numeral 244 is a seam stitching one end of the tether 242 to the lid member 60B.

In this embodiment, the tether run-through member 240 has a tongue-shape extending integrally from the first inner panel 22A, and is configured to be provided with the insertion hole 241 on the midsection thereof (near the center). However, the configuration of the tether run-through member is not limited. For example, it is also possible to form the tether run-through member by mounting the small cloth to the side surface of the inner panel 22A as in the case of the tether run-through member 231 in the embodiment shown in FIGS. 34 and 35 described above. Alternatively, the tether run-through member 240 may be provided on the second inner panel 22B.

Other configurations of this embodiment are the same as those in the embodiment shown in FIGS. 12 and 13 described above, and the same parts are represented by the same reference numerals.

In this embodiment as well, when the airbag 10E is inflated, the inner panels 22A, 22B are extended toward the passenger, and pull the midsection of the tether 242 in association with initiation of inflation of the front panel 12 toward the passenger as shown in FIG. 37. Accordingly, the lid member 60B is pulled inwardly of the airbag 10E by the inner panel 22A via the tether 242, and is superimposed on the vent hole 18, whereby the vent hole 18 is closed.

Subsequently, when the passenger crashes into the inflated airbag 10E and the front panel is moved backward toward the rear panel 14, the inner panels 22A, 22B are loosened, and hence a force to pull the lid member 60B inwardly of the airbag 10E is released, and the lid member 60B is moved apart from the vent hole 18, whereby the vent hole 18 is opened.

In the airbag 10E, when the inner panels 22A and 22B are loosened, a portion of the tether 242 extending between the tether run-through member 240 and the rear panel 14 passes through the insertion hole 241, and is supplied toward the lid member 60B with respect to the tether run-through member 240. Therefore, even when the amount of loosening of the inner panels 22A, 22B is small, the amount of moving apart of the lid member 60B can be increased.

The respective embodiments described above are presented simply for illustration of the present invention, and the present invention is not limited to the respective embodiments shown above.

According to the present invention, in case that a plurality of vent holes is provided and is covered by a common lid member, joining members may be inserted through two or more of the vent holes and the lid member may be connected to a passenger-facing surface of the airbag by the joining members.

Figure 38:
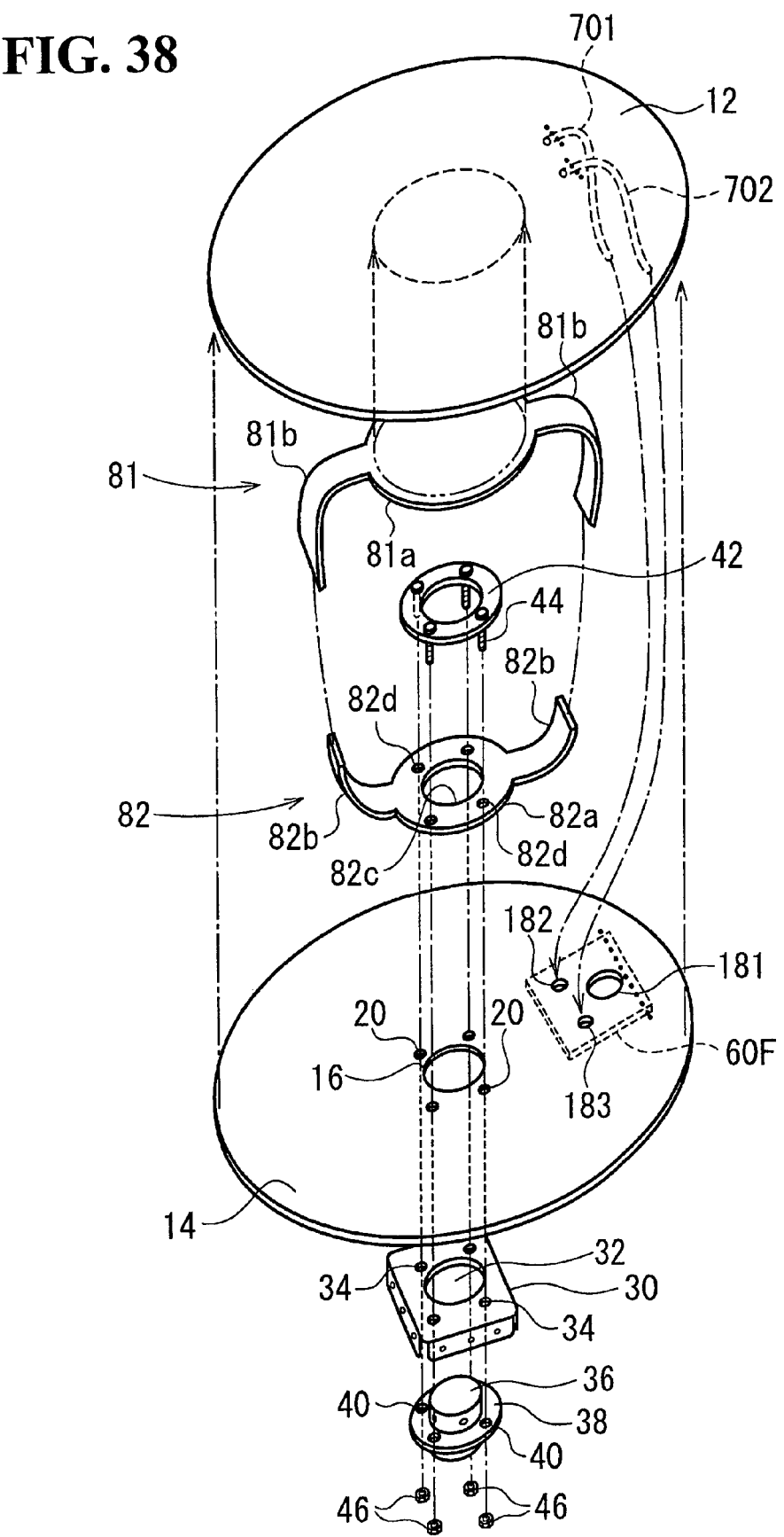
FIG. 38 is an exploded perspective view of an airbag and airbag apparatus according to an embodiment.
Figure 39:
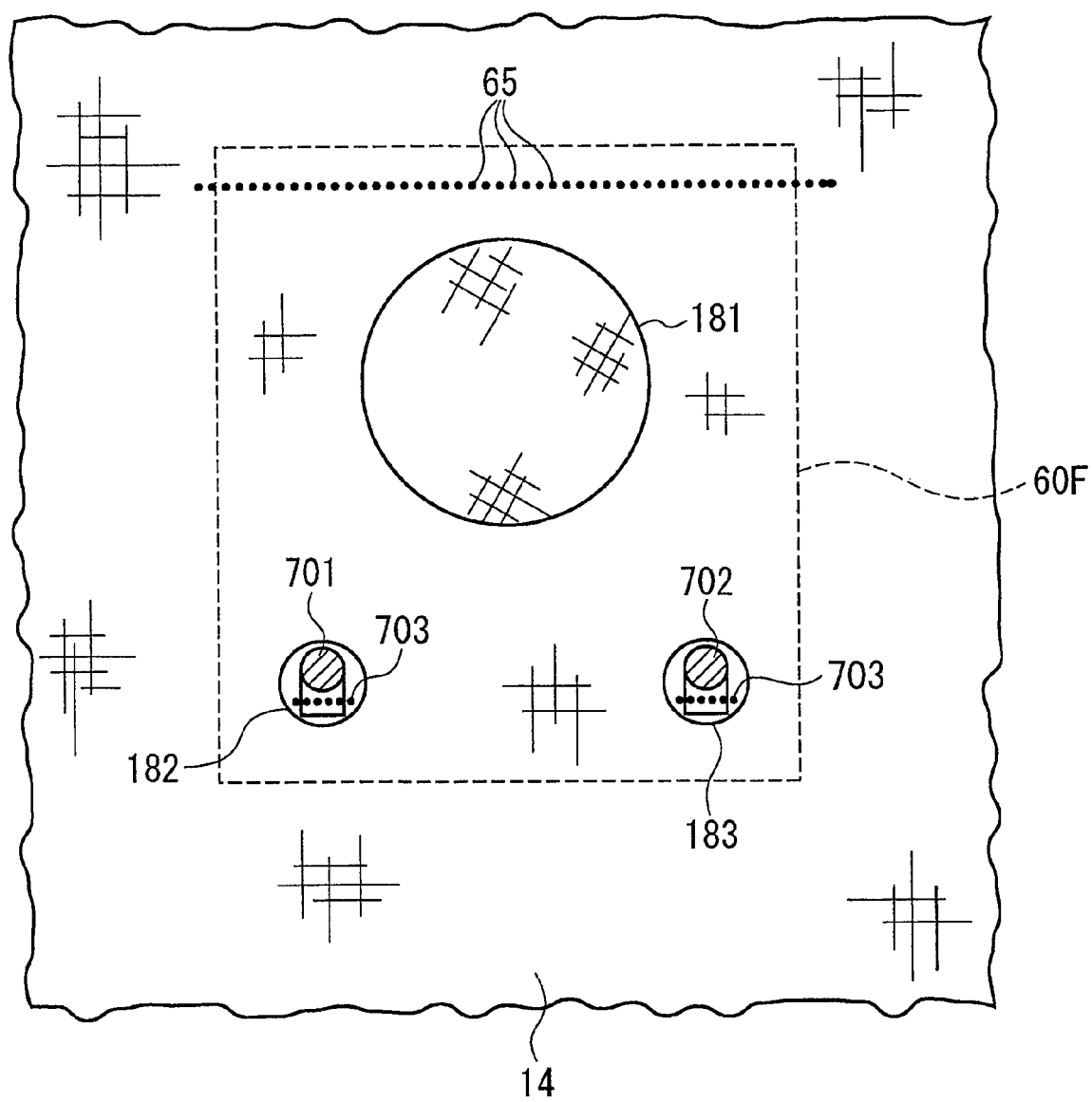
FIG. 39 shows the section around the vent holes in the airbag viewed from the inside of the airbag.
Figure 40:
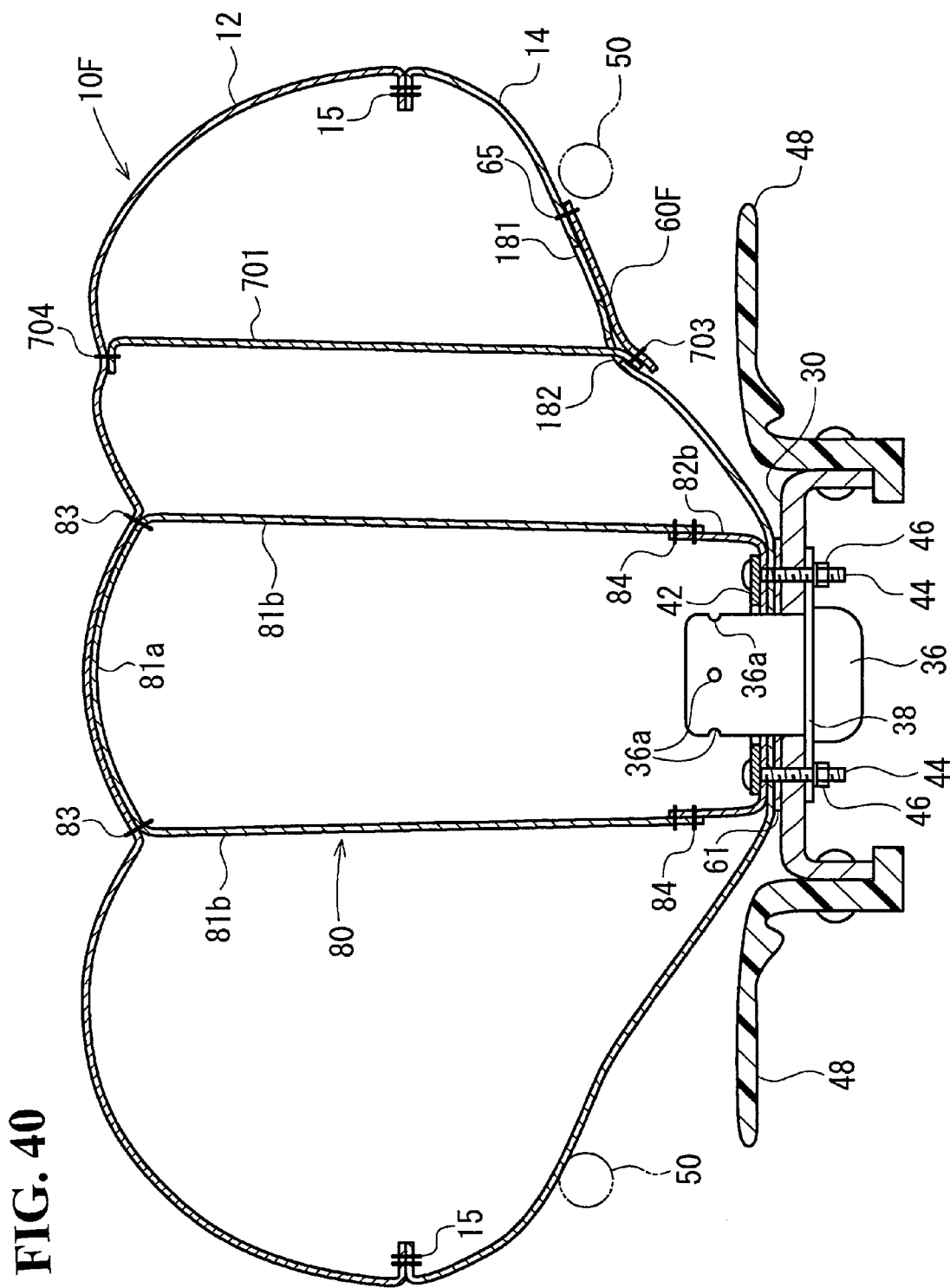
FIG. 40 is a cross-sectional view of the airbag and the airbag apparatus shown in FIG. 38.
Figure 41:
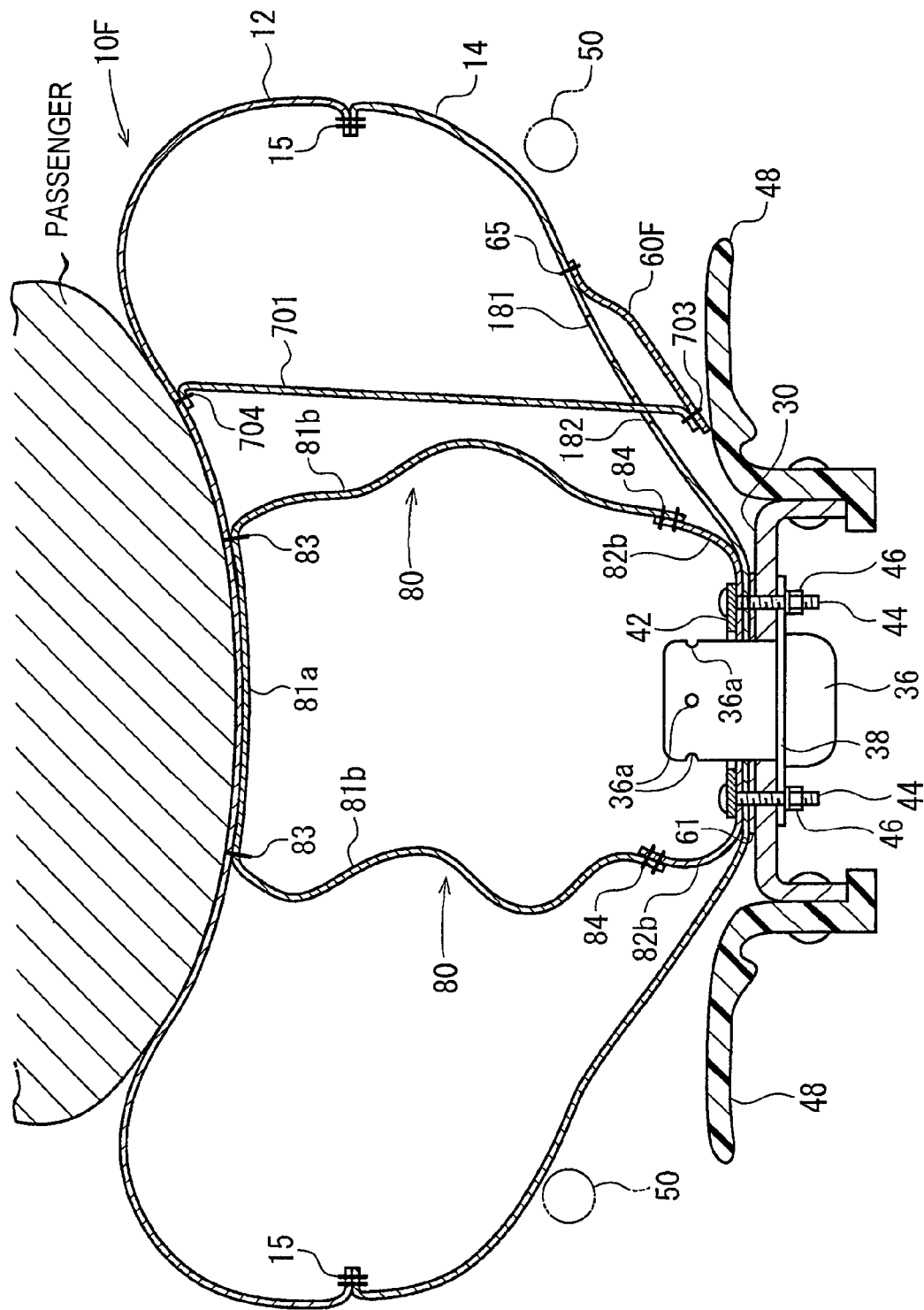
FIG. 41 is a cross-sectional view of the airbag and the airbag apparatus shown in FIG. 38 when the passenger is received.

FIG. 38 is an exploded perspective view of an airbag and an airbag apparatus having such a structure. FIG. 39 shows the section around the vent holes in the airbag viewed from the inside of the airbag. FIGS. 40 and 41 are cross-sectional views of the airbag apparatus, wherein FIG. 40 shows the state before a passenger is received by the airbag and FIG. 41 shows the state after the passenger is received by the airbag.

An airbag 10F according to the present embodiment has a structure similar to the above-described airbag 10A shown in FIGS. 5 to 7 except three vent holes 181, 182, 183 are formed in a rear panel 14 and are covered by a common lid member 60F. In addition, among the vent holes 181, 182, 183, two vent holes 182, 183 are provided with respective tethers 701, 702, which function as joining members, extending therethrough and the lid member 60F is connected to a front panel 12 with the two tethers 701, 702.

As shown in FIGS. 38 and 39, according to the present embodiment, the vent holes 182, 183 are positioned closer to the inner periphery of the rear panel 14 than the vent holes 181. The vent holes 182, 183 are arranged adjacent to each other in the circumferential direction of the rear panel 14 and the vent hole 181 is positioned near the middle point between the vent holes 182, 183 in the circumferential direction. In the present embodiment, the vent holes 181 to 183 are all circular.

According to the present embodiment, the lid member 60F is composed of a rectangular panel. As shown in the figure, among the sides of the lid member 60F, the side opposite to the vent holes 182, 183 across the vent hole 181 (that is, the side closer to the outer periphery of the rear panel 14 than the vent hole 181) is attached to the rear panel 14 with a seam 65.

In the present embodiment, as shown in FIG. 39, the tethers 701, 702 comprise string-shaped members having a circular cross section. The tethers 701, 702 are respectively inserted through the vent holes 182, 183 and are attached at one end to a surface of the lid member 60F that faces the vent holes 182, 183 by seams 703. In addition, the tethers 701, 702 are attached at the other end to the inner face of the front panel 12 with seams 704.

In the present invention, the vent holes 182, 183 through which the tethers 701, 702 are inserted are preferably smaller than the vent hole 181 that is free from the tethers. More specifically, the opening area of the vent holes 182, 183 is preferably 710 mm$^2$ or less, and more preferably, 80 mm$^2$ or less. In such a case, the effect of closing the vent holes 181 to 183 with the lid member 60F can be increased.

Other configurations of the present embodiment are similar to those of the embodiment shown in FIGS. 5 to 7. In FIGS. 38 to 41, parts similar to those shown in FIGS. 5 to 7 are denoted by the same reference numerals.

As shown in FIG. 40, when the airbag 10F inflates and the front panel 12 projects toward the passenger, the lid member 60F is pulled inwardly of the airbag 10F by the tethers 701, 702 and is superimposed over the vent holes 181 to 183, thereby closing the vent holes 181 to 183. Accordingly, the internal pressure of the airbag 10F is quickly brought into a high pressure, and earlier inflation of the airbag 10F is ensured.

In the present embodiment, the lid member 60F is attached to the rear panel 14 by the seam 65 at only one side thereof. However, the opposite side of the lid member 60F across the vent hole 181 is pulled inwardly of the airbag by the tethers 701, 702 extending through the two vent holes 182, 183 positioned near the opposite side of the lid member 60F. Therefore, the lid member 60F reliably comes into contact with the outer surface of the rear panel 14 over a large area extending from the one side to the opposite side.

Then, when the passenger is crashed into the inflated airbag 10F, the front panel 12 of the airbag 10F is pressed by the passenger and is moved backward toward the rear panel 14, as shown in FIG. 41. Accordingly, the tethers 701, 702 are also moved backward, and a force to pull the lid member 60F inwardly of the airbag 10F is released. Therefore, the lid member 60F is moved apart from the vent holes 181 to 183 by the gas pressure in the airbag 10F, and the vent holes 181 to 183 are opened. As a result, the gas is discharged from the vent holes 181 to 183 to the outside of the airbag 10F, and hence an impact applied to the passenger is absorbed.

Although the tethers 701, 702 are directly connected to the front panel 12 in the above-described airbag 10F, the tethers 701, 702 may also be connected to an intermediate portion of the suspension belt 80.

Similar to the airbag 10A show in FIGS. 5 to 7, the above-described airbag 10F includes the suspension belt 80 as an internal member for connecting the front panel 12 to the rear panel 14. However, a structure similar to that of the airbag 10F may also be applied to an airbag similar to the airbag 10 shown in FIGS. 1 to 4(*b*) in which inner panels 22A, 22B are provided as internal members for partitioning the interior of the airbag into a first chamber and a second chamber surrounding the first chamber.

Figure 42:
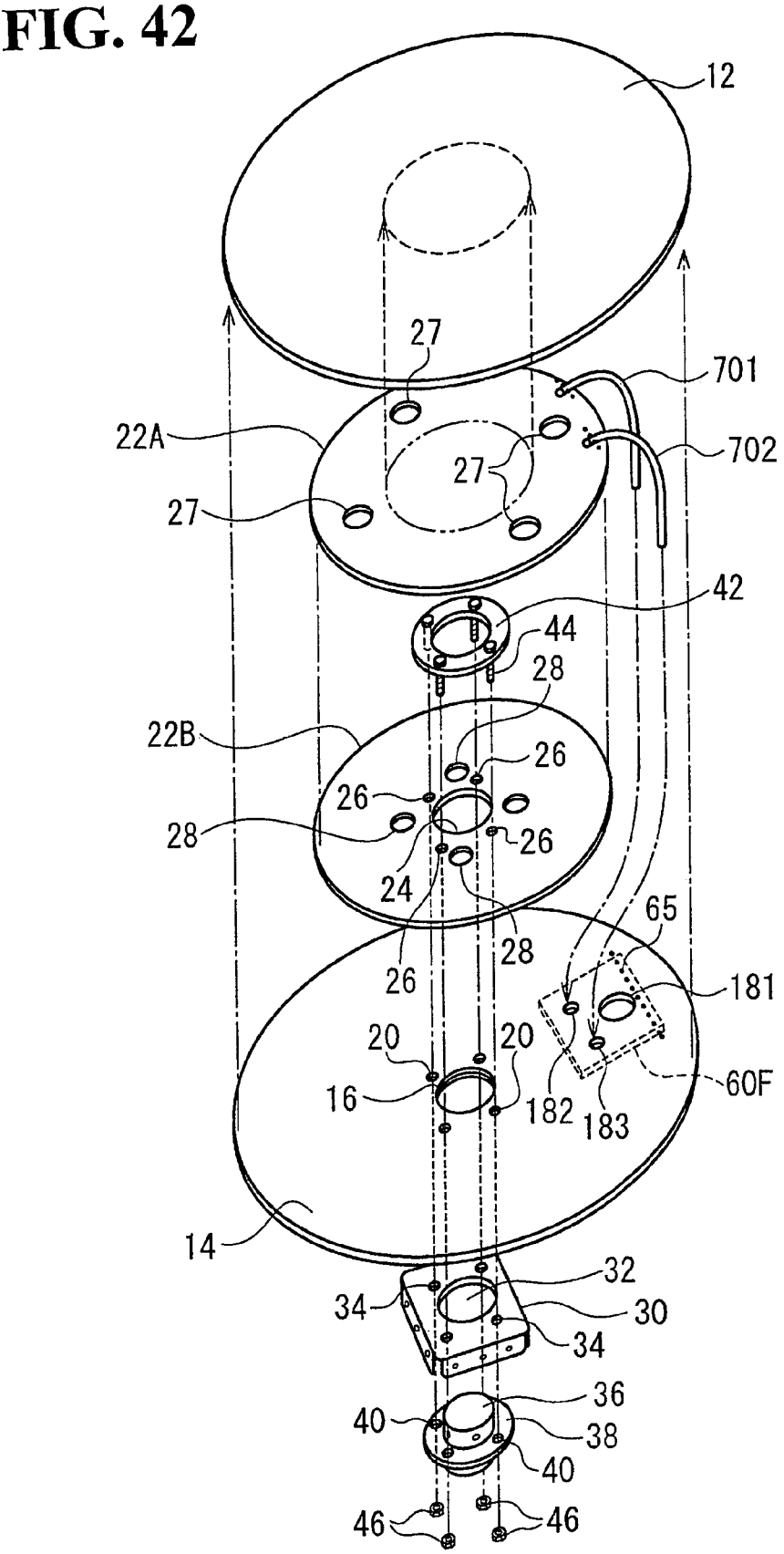
FIG. 42 is an exploded perspective view of an airbag and airbag apparatus according to an embodiment.

FIG. 42 is an exploded perspective view of the airbag and the airbag apparatus having such a structure.

The airbag (reference numeral is omitted) according to the present embodiment has a structure similar to the above-described airbag 10 shown in FIGS. 1 to 4(*b*) except three vent holes 181, 182, 183 are formed in a rear panel 14 and are covered by a common lid member 60F. In addition, among the vent holes 181, 182, 183, two vent holes 182, 183 are provided with respective tethers 701, 702, which function as joining members, extending therethrough and the lid member 60F is connected to inner panels 22A, 22B with the two tethers 701, 702.

The arrangement of the vent holes 181 to 183 in the present embodiment and the position at which the lid member 60F is attached to the rear panel 14 with a seam 65 are similar to those in the embodiment shown in FIGS. 38 to 41.

Also in this embodiment, the tethers 701, 702 respectively pass through the vent holes 182, 183 and are stitched at one end to a surface of the lid member 60F that faces the vent holes 182, 183.

In the present embodiment, the tethers 701, 702 are stitched at the other end to the inner panel 22A at positions near the outer periphery of the inner panel 22A. However, the positions at which the tethers 701, 702 are stitched are not limited to this. The tethers 701, 702 may also be stitched to the inner panel 22B. Alternatively, the tethers 701, 702 may also be formed integrally with the inner panels 22A, 22B or the lid member 60F.

Other configurations of the present embodiment are similar to those of the embodiment shown in FIGS. 1 to 4(b). In FIG. 42, parts similar to those shown in FIGS. 1 to 4(b) are denoted by the same reference numerals.

The operations of the airbag and the airbag apparatus according to the present embodiment are similar to those of the embodiment shown in FIGS. 1 to 4(b). The processes in which the vent holes 181 to 183 are closed and opened by the lid member 60F are similar to those in the embodiment shown in FIGS. 38 to 41.

In the present invention, when a plurality of vent holes is formed, the lid member may be connected to the passenger-facing surface of the airbag while passing the joining members (tethers) through all of the vent holes.

Figure 43:
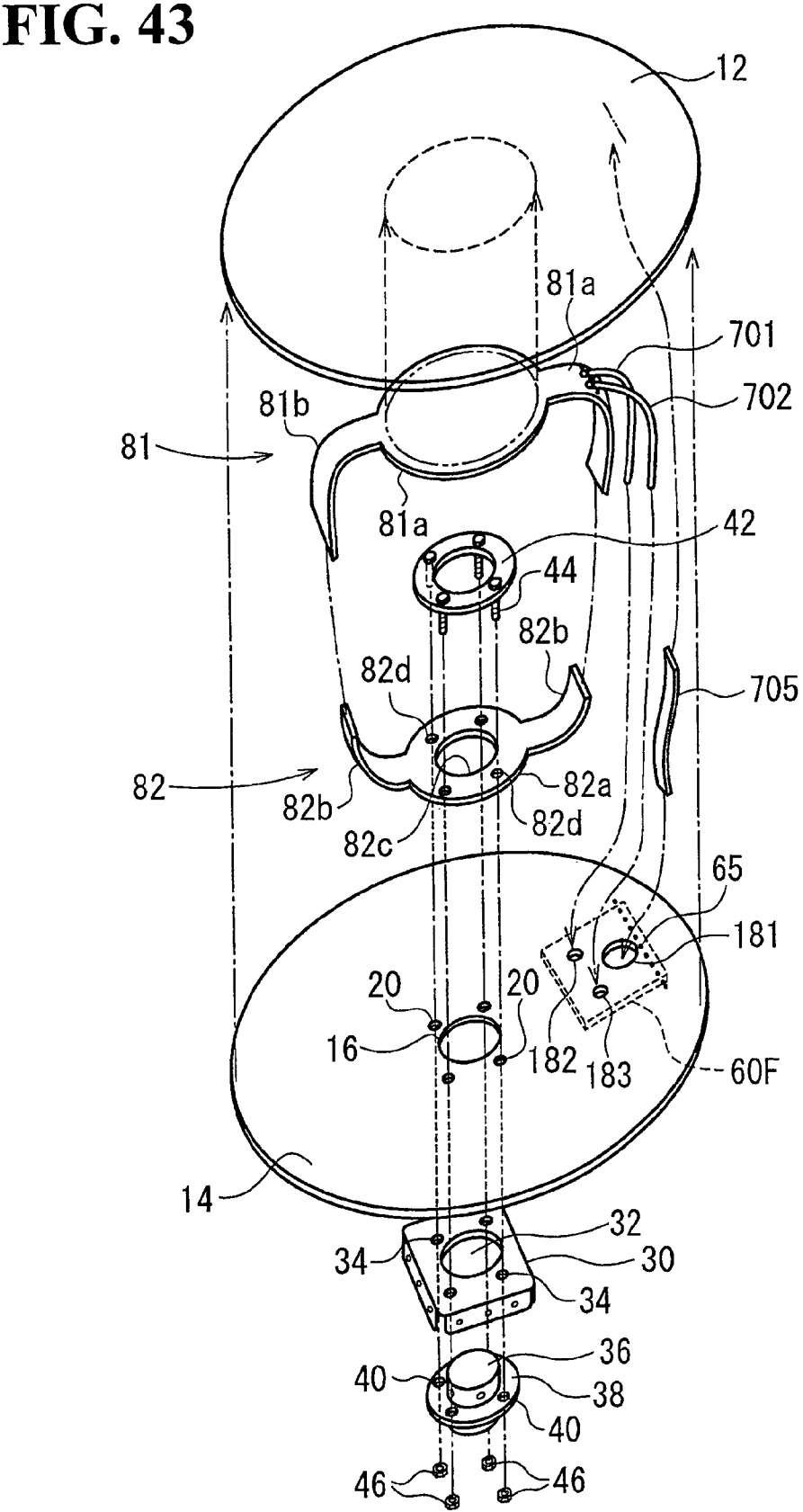
FIG. 43 is an exploded perspective view of an airbag and airbag apparatus according to an embodiment.

FIG. 43 is an exploded perspective view of the airbag and the airbag apparatus having such a structure.

The airbag (reference numeral is omitted) according to the present embodiment has a structure similar to the above-described airbag 10A shown in FIGS. 5 to 7 except three vent holes 181, 182, 183 are formed in a rear panel 14 and are covered by a common lid member 60F. In addition, the vent holes 181, 182, 183 are provided with respective tethers 705, 701, 702, which function as joining members, extending therethrough and the lid member 60F is connected to a front panel 12 with the three tethers 705, 701, 702.

The arrangement of the vent holes 181 to 183 in the present embodiment and the position at which the lid member 60F is attached to the rear panel 14 with the seam 65 are similar to those in the embodiment shown in FIGS. 38 to 41.

In the present embodiment, the tether 705 passes through the vent hole 181 and is attached at one end to a surface of the lid member 60F that faces the vent hole 181. In addition, the tether 705 is stitched at the other end to the inner surface of the front panel 12.

The tethers 701, 702 pass respectively through the vent holes 182, 183 and are stitched at one end to a surface of the lid member 60F that faces the vent holes 182, 183. In addition, the tethers 701, 702 are stitched at the other end to an intermediate portion of a suspension belt 80 (string-shaped member 81b) that connects the front panel 12 to the rear panel 14.

However, the positions at which the tethers 705, 701, 702 are stitched are not limited to this. For example, all of the tethers 705, 701, 702 may be stitched at the other end to the front panel 12 or to the intermediate portion of the suspension belt 80.

Other configurations of the present embodiment are similar to those of the embodiment shown in FIGS. 5 to 7. In FIG. 43, parts similar to those shown in FIGS. 5 to 7 are denoted by the same reference numerals.

In this airbag, all of the three vent holes 181 to 183 are provided with the respective tethers 705, 701, 702 extending therethrough, and the lid member 60F is connected to the front panel 12 and to the suspension belt 80 by the three tethers 705, 701, 702. Therefore, the lid member 60F reliably closes all of the vent holes 181 to 183 when the airbag inflates. Thus, the lid member 60F provides high closing effect.

The number of vent holes may, of course, be four or more. In addition, the lid member may be connected to the passenger-facing surface of the airbag with joining members that pass through some of the vent holes. Alternatively, the lid member may be connected to the passenger-facing surface of the airbag by joining members that pass through all of the vent holes.

In the passenger airbag 100 shown in FIGS. 22(a) and 22(b) described above, a tether run-through member 131 is provided on a windshield opposing surface 100e of the airbag 100 and the midsection of the tether 130 which connects the passenger-facing surface 100f of the airbag 100 and the lid member 120 passes through the run-through member 131. However, it is also possible to omit the run-through member 131 and allow the tether 130 to extend straightly between the passenger-facing surface 100f and the lid member 120.

Figure 44:
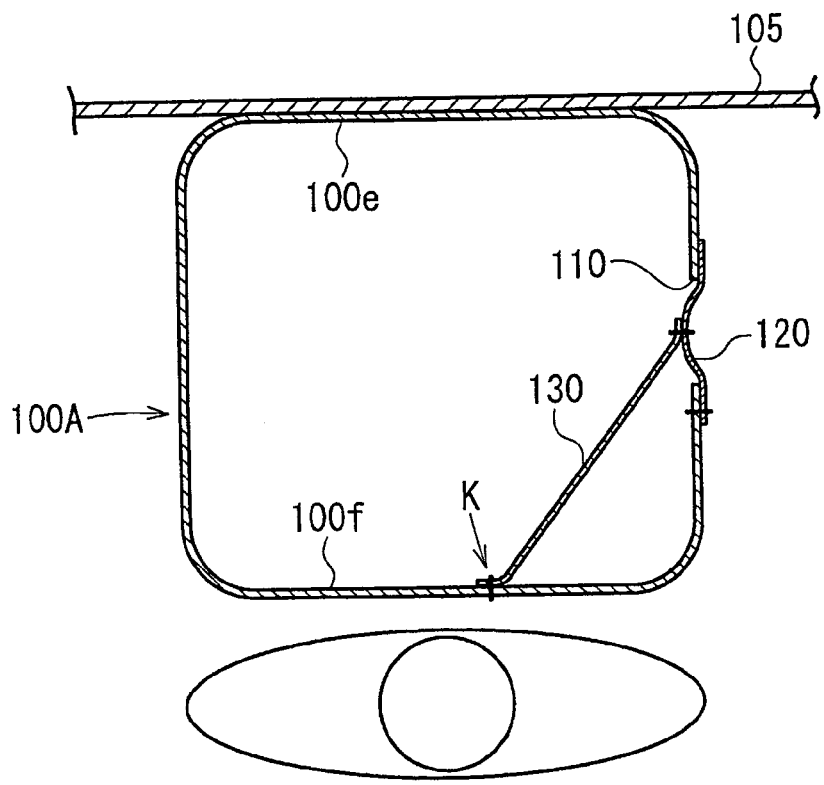
FIGS. 44(a) and 44(b) are cross-sectional views of an airbag according to an embodiment.
Figure 44:
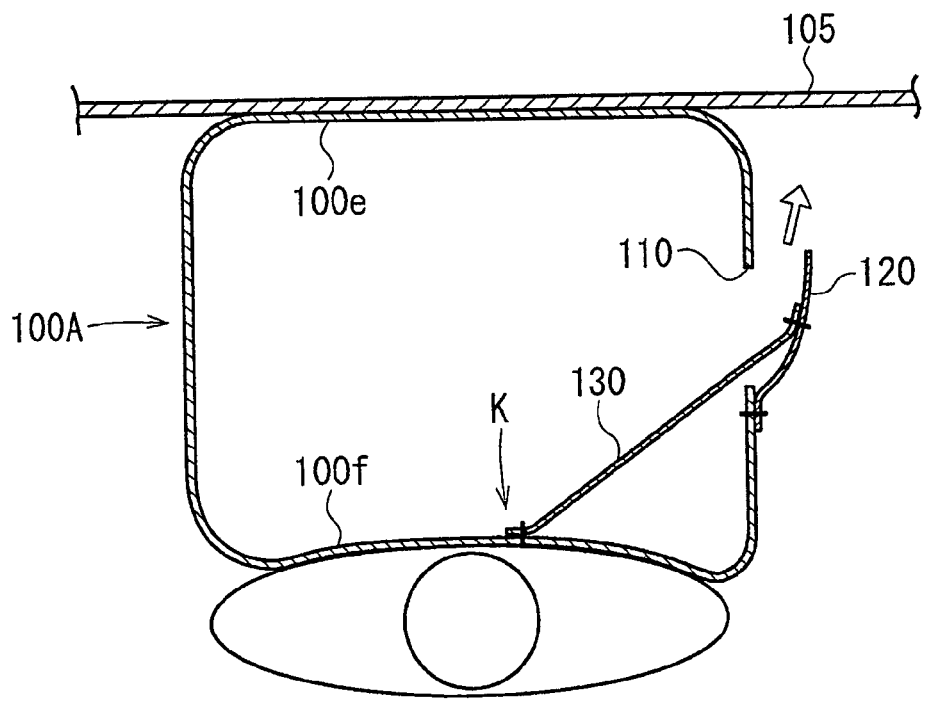
Figure 45:
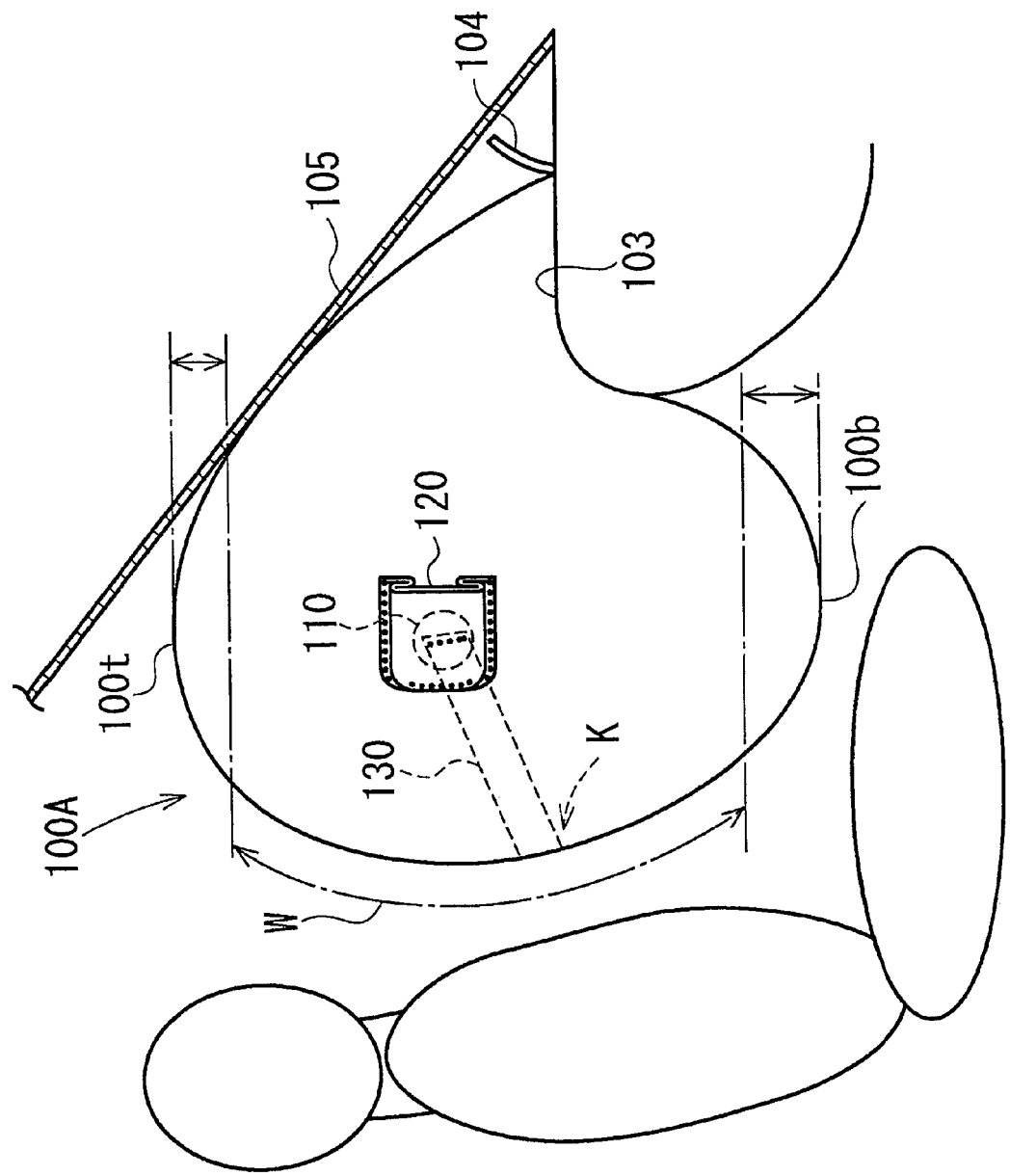
FIG. 45 is a side view of the airbag shown in FIG. 44(a).

FIGS. 44(a) and 44(b) are cross-sectional views of the passenger airbag 100A configured in this manner, and FIG. 45 is a side view of the airbag 100A in the inflated state. FIG. 44(a) shows a state before the passenger crashes into the airbag 100A and FIG. 44(b) shows a state after the passenger has crashed into the airbag 100A.

In the airbag 100A of the present invention, a connected position K of the tether 130 on the passenger-facing surface 100f is preferably at least 50 mm lower than the upper end 100t of the inflated airbag 100A and at least 100 mm higher than the lower end 100b of the airbag 100A, and within a range W of 200 mm in the lateral direction from a lateral center of the passenger-facing surface 100f.

By setting the connected position K of the tether 130 with respect to the passenger-facing surface 100f as described above, even when the seated height or the sitting position of the passenger is varied to some extent, when the passenger presses the passenger-facing surface 100f of the inflated airbag 100A, any portion of the passenger from the belly to the head comes into abutment with the connected position K between the passenger-facing surface 100f and the tether 130. Thus, the tether 130 is pressed toward the lid member 120 and the lid member is moved to open.

Other configurations of this embodiment are the same as the airbag 100 in FIGS. 22(a) and 22(b) described above, and the same reference numerals as FIGS. 22(a) and 22(b) represent the same parts.

In the passenger airbag 100 in FIGS. 22(a) and 22(b), the tether run-through member 131 is directly mounted to the windshield-opposing surface 100e of the airbag 100. However, it may be separated from the windshield-opposing surface 100e.

Figure 46:
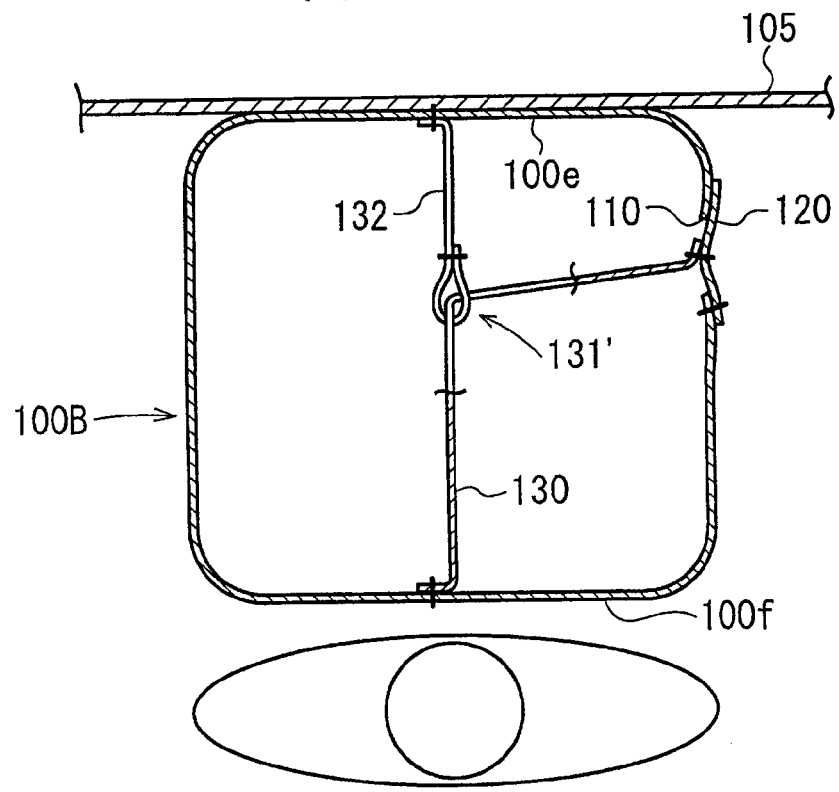
FIGS. 46(a) and 46(b) are cross-sectional views of an airbag according to an embodiment.
Figure 46:
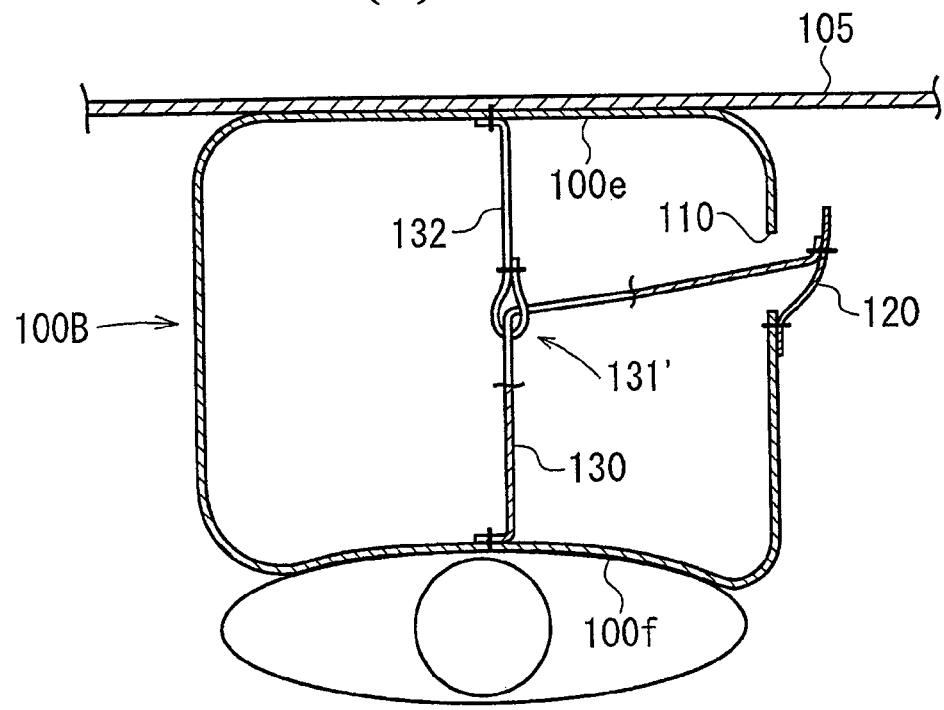

FIGS. 46(a) and 46(b) are cross-sectional views of the passenger airbag 100B configured in this manner. FIG. 46(a) shows a state before the passenger crashes into the airbag 100B, and FIG. 46(b) shows a state after the passenger has crashed into the airbag 100B.

In the airbag 100B, the tether run-through member 131' is provided at one end of the intermediate panel 132 which is connected at the other end to the windshield-opposing surface 100e of the airbag 100.

The disclosures of Japanese Patent Applications No. 2005-242897 filed on Aug. 24, 2005, No. 2005-284683 filed on Sep. 29, 2005, No. 2005-346313 filed on Nov. 30, 2005, No. 2006-012804 filed on Jan. 20, 2006 and No. 2006-211108 filed on Aug. 2, 2006 are incorporated herein.

While the invention has been explained with reference to the specific embodiments of the invention, the explanation is illustrative, and the invention is limited only by the appended claims.

What is claimed is:

1. An airbag comprising:
   an airbag panel for constituting the airbag;
   a first vent hole disposed in at least one surface of the airbag panel on a side opposite to a passenger-facing surface and a side surface of the airbag panel when the airbag is inflated;
   a plurality of second vent holes disposed in the airbag panel adjacent to the first vent hole, said second vent holes having a size smaller than that of the first vent hole, and
   a constraining device for constraining discharge of gas from the first and second vent holes, the constraining device comprising a lid member arranged outside the airbag panel and connected to the airbag panel at one side thereof at a position close to the first vent hole away from the second vent holes to cover the first and second vent holes, and a plurality of joint members which passes through the second vent holes and an interior of the airbag and connects the lid member and the passenger-facing surface;
   wherein the first and second vent holes are configured to be closed or opened to a small extent by the lid member superposed on the first and second vent holes and pulled toward the interior of the airbag by the joint members passing through the second vent holes when the airbag is inflated; and the first and second vent holes are configured to be fully opened or opened to a large extent by the lid member being moved apart from the first and second vent holes when the passenger contacts the inflated airbag thereby moving the passenger-facing surface backward.

2. The airbag according to claim 1, wherein the constraining device further includes another joint member connected at one end to the lid member and at the other end to the passenger-facing surface, said another joint member passing through the first vent hole.

3. The airbag according to claim 1, further comprising an internal member disposed in the airbag and connects the passenger-facing surface of the airbag and the surface on the opposite side therefrom, the joint members being connected to the internal member.

4. The airbag according to claim 3, wherein
   the internal member comprises an inner panel partitioning an interior of the airbag into a first chamber at a center and a second chamber surrounding the first chamber, and having a communicating section operable to communicate the first and second chambers;
   the airbag is configured such that the first chamber is inflated first by the gas introduced into the first chamber and then the second chamber is inflated by the gas flowing from the first chamber to the second chamber via the communicating section; and
   the first and second vent holes operate to communicate the second chamber to an outside of the airbag.

5. The airbag according to claim 3, wherein the internal member is a suspension belt comprising a first end connected to the passenger-facing surface of the airbag and a second end connected to a surface of the opposite side of the passenger-facing surface.

6. The airbag according to claim 3, wherein the joint members and the internal member are integrally connected.

7. The airbag according to claim 1, further comprising an internal member operable to extend across an interior of the airbag to connect side portions of the airbag in the inflated state, the joint members being connected to the internal member.

8. The airbag according to claim 1, wherein the joint member and the lid member are integrally configured.

9. An airbag apparatus comprising the airbag according to claim 1, and a gas generator operable to supply gas to the airbag.

10. The airbag apparatus according to claim 1, wherein two second vent holes are spaced apart from each other and are arranged to be substantially equally spaced from the first vent hole so that first vent hole is sandwiched between the second vent holes and a connecting portion of the lid member to the airbag panel.

11. The airbag apparatus according to claim 10, further comprising an internal belt member disposed in the airbag and connecting the passenger-facing surface of the airbag and the surface on the opposite side therefrom, the joint members being connected to the internal belt member.

12. The airbag apparatus according to claim 11, further comprising another joint member having a width greater than that of the joint member, said another joint member being directly connected at one end to the lid member passing through the first vent hole and at the other end to the passenger-facing surface.

13. The airbag according to claim 1, further comprising an open vent hole that communicates the interior and an exterior of the airbag.

* * * * *